(12) United States Patent
Ammanamanchi Venkata et al.

(10) Patent No.: US 11,518,262 B2
(45) Date of Patent: Dec. 6, 2022

(54) WIDE-OUTPUT VOLTAGE RANGE ON-BOARD BATTERY CHARGER FOR ELECTRIC VEHICLES

(71) Applicant: University of Ontario Institute of Technology, Oshawa (CA)

(72) Inventors: Jaya Sai Praneeth Ammanamanchi Venkata, Lamadelaine (LU); Lalit Patnaik, Graz (AT); Najath Abdul Azeez, Chatham (CA); Sheldon S. Williamson, Whitby (CA)

(73) Assignee: University of Ontario Institute of Technology, Ottawa (CA)

( * ) Notice: Subject to any disclaimer, the term of this patent is extended or adjusted under 35 U.S.C. 154(b) by 321 days.

(21) Appl. No.: 16/530,461

(22) Filed: Aug. 2, 2019

(65) Prior Publication Data
US 2020/0039375 A1    Feb. 6, 2020

Related U.S. Application Data

(60) Provisional application No. 62/714,187, filed on Aug. 3, 2018.

(51) Int. Cl.
*B60L 53/62*    (2019.01)
*H02M 1/42*    (2007.01)
(Continued)

(52) U.S. Cl.
CPC ............... *B60L 53/62* (2019.02); *H02J 7/00* (2013.01); *H02J 7/022* (2013.01); *H02M 1/08* (2013.01);
(Continued)

(58) Field of Classification Search
CPC .. B60L 53/62; B60L 2210/12; B60L 2210/14; B60L 2210/30; H02M 1/42;
(Continued)

(56) References Cited

U.S. PATENT DOCUMENTS 5,463,294 A * 10/1995 Valdivia .............. B60L 15/2045
318/432
6,166,527 A    12/2000 Dwelley et al.
(Continued)

OTHER PUBLICATIONS

Zane et al., "Nonlinear-carrier control for high power-factor rectifiers based on up-down switching converters," IEEE Transactions on Power Electronics, Mar. 1998, vol. 13, No. 2, pp. 213-221.
(Continued)

*Primary Examiner* — Drew A Dunn
*Assistant Examiner* — Dung V Bui
(74) *Attorney, Agent, or Firm* — Bereskin & Parr LLP/S.E.N.C.R.L., s.r.l.; Tony Orsi

(57) ABSTRACT

Various embodiments of a two-stage on-board battery charger that can generate a wide range of output voltages is described herein. Generally, the battery charger employs a first stage buck and boost Power Factor Correction (PFC) converter, and a second stage DC-DC converter. The buck and boost PFC converter is capable of generating variable intermediate DC-link voltages which allow the on-board battery charger to efficiently generate the wider range of output voltages.

34 Claims, 56 Drawing Sheets

(51) Int. Cl.
    *H02J 7/00*           (2006.01)
    *H02J 7/02*           (2016.01)
    *H02M 1/08*         (2006.01)
    *H02M 3/158*        (2006.01)
    *H02M 1/44*         (2007.01)
    *B60K 6/28*          (2007.10)
    *H02M 3/335*       (2006.01)

(52) U.S. Cl.
    CPC ....... *H02M 1/4225* (2013.01); *H02M 3/1582* (2013.01); *B60K 6/28* (2013.01); *B60L 2210/12* (2013.01); *B60L 2210/14* (2013.01); *B60L 2210/30* (2013.01); *B60Y 2200/91* (2013.01); *B60Y 2300/91* (2013.01); *B60Y 2400/61* (2013.01); *H02J 2207/20* (2020.01); *H02M 1/44* (2013.01); *H02M 3/33573* (2021.05)

(58) Field of Classification Search
    CPC ........ H02M 1/44; H02M 1/08; H02M 1/4225; H02M 3/1582; H02M 3/158; H02M 3/33569; H02J 7/0052; H02J 7/00; H02J 7/02; H02J 7/022; H02J 2207/20; B60K 6/28; B60Y 2200/91; B60Y 2300/91; B60Y 2400/61
    USPC ........................................................ 320/140
    See application file for complete search history.

(56) References Cited

U.S. PATENT DOCUMENTS

| | | | | |
|---|---|---|---|---|
| 6,252,373 | B1* | 6/2001 | Stefansson | H02J 7/00711 320/106 |
| 6,348,781 | B1* | 2/2002 | Midya | H03F 1/0227 323/283 |
| 8,569,963 | B2* | 10/2013 | Walters | H05B 45/375 315/200 R |
| 8,723,487 | B2 | 5/2014 | Pahlevaninezhad et al. | |
| 10,135,340 | B1* | 11/2018 | Megaw | H02M 3/1582 |
| 2008/0048619 | A1* | 2/2008 | Yoshida | B60L 3/0038 320/134 |
| 2010/0270980 | A1* | 10/2010 | Newhouse | H02J 7/007194 320/152 |
| 2012/0250363 | A1* | 10/2012 | Skinner | H02M 3/1584 363/21.12 |
| 2014/0163853 | A1* | 6/2014 | Mousseau | G01R 31/382 701/123 |
| 2015/0069953 | A1* | 3/2015 | Seong | H02J 7/00 320/107 |
| 2015/0244165 | A1* | 8/2015 | Roesner | H02J 7/0026 361/79 |
| 2017/0087998 | A1* | 3/2017 | Minamii | H02J 7/1423 |
| 2017/0305283 | A1* | 10/2017 | Huh | B60L 53/22 |
| 2018/0141443 | A1* | 5/2018 | Lee | H02J 7/02 |
| 2018/0166005 | A1* | 6/2018 | Lee | G09G 3/3406 |

OTHER PUBLICATIONS

Chen et al., "Buck-boost pwm converters having two independently controlled switches," in 2001 IEEE 32nd Annual Power Electronics Specialists Conference (IEEE Cat. No. 01CH37230), 2001, vol. 2, pp. 736-741.

Midya et al., "Buck or boost tracking power converter," IEEE Power Electronics Letters, Dec. 2004, vol. 2, No. 4, pp. 131-134.

Andersen et al., "Current programmed control of a single-phase two-switch buck-boost power factor correction circuit," IEEE Transactions on Industrial Electronics, Feb. 2005, vol. 53, No. 1, pp. 263-271.

Chen et al., "Analysis and design of a low-stress buck-boost converter in universal-input PFC applications," IEEE Transactions on Power Electronics, Mar. 2006, vol. 21, No. 2, pp. 320-329.

Lee et al., "A compensation technique for smooth transitions in non-inverting buck-boost converter,"in 2009 Twenty-Fourth Annual IEEE Applied Power Electronics Conference and Exposition, Feb. 2009, pp. 608-614.

Gautam et al., "An automotive onboard 3.3-kw battery charger for PHEV application," IEEE Transactions on Vehicular Technology, Oct. 2012, vol. 61, No. 8, pp. 3466-3474.

He et al., "High-efficiency two-switch tri-state buck-boost power factor correction converter with fast dynamic response and low-inductor current ripple," IET Power Electronics, Sep. 2013, vol. 6, No. 8, pp. 1544-1554.

Williamson et al., "Industrial electronics for electric transporlation: Current state-of-the-art and future challenges," IEEE Transactions on Industrial Electronics, May 2015, vol. 62, No. 5, pp. 3021-3032.

Bang et al., "Development of a zvt-pwm buck cascaded buck 8211;boost pfc converter of 2 kw with the widest range of input voltage," IEEE Transactions on Industrial Electronics, Mar. 2018, vol. 65, No. 3, pp. 2090-2099.

Badawy et al., "A novel control for a cascaded buck-boost PFC converter operating in discontinuous capacitor voltage mode," IEEE Transactions on Industrial Electronics, Jul. 2016, vol. 63, No. 7, pp. 4198-4210.

* cited by examiner

WIDE-OUTPUT VOLTAGE RANGE ON-BOARD BATTERY CHARGER FOR ELECTRIC VEHICLES

CROSS REFERENCE TO RELATED PATENT APPLICATION

This application claims the benefit of U.S. Provisional Patent Application No. 62/714,187, filed Aug. 3, 2018, entitled "WIDE-OUTPUT VOLTAGE RANGE ON-BOARD BATTERY CHARGER FOR ELECTRIC VEHICLES". The entire contents of U.S. Provisional Patent Application No. 62/714,187 is hereby incorporated by reference.

FIELD

Various embodiments are described herein that generally relate to on-board battery chargers and, in particular, to an on-board battery charger for electrical vehicles with a wide-output voltage range.

BACKGROUND

On-board battery-chargers in electric vehicles allow for overnight charging of electrical vehicles from wall outlets. Commercially available on-board battery chargers have an output voltage that generally falls in one of three possible ranges: 36-72 V, 72-150 V, and 200-450 V, depending on the type of electric vehicle being charged. For example, electrical vehicles, including golf carts, Plug-in Hybrid Electric Vehicles (PHEVs), neighborhood electric vehicles, e-buses, and e-bikes, may have different voltage input requirements and, accordingly, may require on-board battery chargers providing different output voltage ranges.

To achieve these output ranges, conventional battery chargers employ a two-stage power conversion structure. A common first stage topology for battery chargers is a boost Power Factor Correction (PFC) converter, which typically generates a high fixed "intermediate" output DC voltage ("DC-link voltage"). The DC-link voltage is subsequently passed through a second stage DC-DC converter to generate the battery-charger output voltage. The first stage maintains input power quality and the second stage provides galvanic isolation and charge control.

A common challenge faced by current battery chargers is the high DC-link voltage, which is generated by the boost PFC converter, results in increased size and weight of magnetic components in the second stage, especially at lower output battery-charger voltages (i.e., 36-72 V and 72-150 V). Accordingly, the operation of the second stage may be less efficient at these lower voltage ranges. Additionally, and as discussed above, current battery chargers limit the output voltages to discrete ranges (i.e., 36-72 V, 72-150 V, and 200-450 V), which results in separate battery chargers being required for electric vehicles with different voltage input requirements.

SUMMARY OF VARIOUS EMBODIMENTS

In one broad aspect of at least one embodiment of the invention, there is provided a battery charger for providing a wide-output voltage range for charging batteries at different voltages, wherein the battery charger comprises: a power factor correction converter configured to receive a rectified alternating-current (AC) input voltage and generate a direct-current (DC) output voltage, the power factor correction converter comprising: a boost circuit having at least one boost switch; a buck circuit, cascaded with the boost circuit, and having a buck switch; a controller configured to: generate a reference output voltage for the power factor correction converter, wherein the reference output voltage is determined from a given battery that requires charging; generate an upper reference voltage and a lower reference voltage based on the reference output voltage; and control the at least one boost switch and the buck switch to dynamically operate the power factor correction converter in a buck mode, a boost mode, or an intermediate buck and boost mode based on comparing an instantaneous value of the rectified AC input voltage with the upper reference voltage and the lower reference voltage; and DC-DC converter coupled to an output of the power factor correction converter and configured to generate a battery voltage for charging the given battery.

In at least one embodiment, the intermediate buck and boost mode provides a smooth crossover transition between the buck mode and the boost mode.

In at least one embodiment, the controller comprises: a voltage-current controller that is configured to generate a buck error signal and a boost error signal; a boost comparator unit that is configured to generate one or more boost PWM signals by comparing the boost error signal with a leading edge ramp modulated signal having a magnitude between zero and one; a buck comparator unit that is configured to generate a buck PWM signal by comparing the buck error signal with a trailing edge ramp modulated signal having a magnitude between zero and one; and a switch logic circuit that is configured to determine the mode of operation of the power factor correction converter, and based on the determination, to selectively apply the one or more boost PWM signals and the buck PWM signal to the at least one boost switch and the buck switch, respectively.

In at least one embodiment, the controller is configured to determine the mode of operation to be the boost mode when the instantaneous value of the rectified AC voltage is lower than the lower reference voltage; and in the boost mode, the controller is configured to apply the at least one boost PWM signal to the at least one boost switch, and sets the buck switch to a continuous ON state.

In at least one embodiment, the controller determines the mode of operation to be a buck mode when the instantaneous value of the rectified AC voltage is higher than the upper reference voltage, and in the buck mode, the controller is configured to apply the buck PWM signal to the buck switch, and the controller sets the at least one boost switch to a continuous OFF state.

In at least one embodiment, the controller is configured to determine the mode of operation to be the intermediate buck and boost mode when the instantaneous value of the rectified AC voltage is between the upper threshold voltage and the lower threshold voltage, and in the intermediate buck and boost mode, the controller is configured to apply the at least one boost PWM signal to the at least one boost switch, and the buck PWM signal to the buck switch.

In at least one embodiment, the reference output voltage is determined based on a sensed battery voltage of the battery.

In at least one embodiment, reference output voltage is determined to be substantially 200 volts when the sensed battery voltage is less than or equal to 200 volts.

In at least one embodiment, the reference output voltage is determined to be substantially 250 volts when the sensed battery voltage is between 200 volts and 250 volts.

In at least one embodiment, the reference output voltage is determined to be substantially 350 volts when the sensed battery pack voltage is between 250 volts and 350 volts.

In at least one embodiment, the reference output voltage is determined to be substantially 400 volts when the sensed battery voltage is between 350 volts and 500 volts.

In at least one embodiment, the upper threshold voltage and the lower threshold voltage are determined according to the formulas: $Vu=Vref+V_B$ and $Vl=Vref-V_B$, where Vu is the upper threshold voltage, Vl is the lower voltage threshold, Vref is the reference output voltage, and $V_B$ is a predetermined band voltage.

In at least one embodiment, the predetermined band voltage is in a range between 1 volt and 10 volts.

In at least one embodiment, the predetermined band voltage is substantially 1 volt so as to generate a low input current ripple during a transition between the intermediate buck and boost mode and at least one of the buck mode and the boost mode.

In at least one embodiment, the boost circuit is an interleaved boost circuit; wherein the first boost switch and the second boost switch are 180 degrees out of phase; the at least one boost switch includes a first boost switch and a second boost switch; and the at least one boost PWM signal includes a first boost PWM signal for controlling the first boost switch, and a second phase-shifted boost PWM signal for controlling the second boost switch.

In at least one embodiment, the upper threshold voltage and the lower threshold voltage are determined according to the formulas: $Vu=Vref+V_B$ and $Vl=Vref-V_B$, where Vu is the upper threshold voltage, Vl is the lower voltage threshold, Vref is the reference output voltage, and $V_B$ is a predetermined band voltage; and the voltage-current controller includes a programmable buck current integrator and a programmable boost current integrator, wherein the programmable buck current integrator is configured to reset when it is determined that the difference between the instantaneous value of the rectified AC input voltage and the reference output voltage is less than the band voltage, and wherein the programmable boost current integrator is configured to reset when it is determined that the difference between the instantaneous value of the rectified AC input voltage and the reference output voltage is greater than the band voltage.

In at least one embodiment, the boost error signal comprises clipped regions defining a lower limit of the boost error signal, wherein the clipped regions result from re-setting the boost current integrator, and wherein the buck error signal comprises clamped regions defining an upper limit of the buck error signal, wherein the clamped regions result from the re-setting of the buck current integrator.

In another broad aspect of at least one embodiment of the invention, there is provided a method for controlling a battery charger to provide a wide-output voltage range for charging batteries at different voltages, wherein the method comprises: generating a reference output voltage for a power factor correction converter of the battery charger, wherein the reference output voltage is determined from a given battery that requires charging; generating an upper reference voltage and a lower reference voltage based on the reference output voltage; controlling at least one boost switch and a buck switch of the power factor correction converter of the battery charger to dynamically operate the power factor correction converter in a buck mode, a boost mode, or an intermediate buck and boost mode based on comparing an instantaneous value of a rectified input AC voltage with the upper reference voltage and the lower reference voltage; and generating a battery voltage for charging the given battery from an output voltage provided by the power factor correction converter.

In at least one embodiment, the method comprises using the intermediate buck and boost mode to provide a smooth crossover transition between the buck mode and the boost mode.

In at least one embodiment, the method further comprises: generating a buck error signal and a boost error signal; generating one or more boost PWM signals by comparing the boost error signal with a leading edge ramp modulated signal having a magnitude between zero and one; generating a buck PWM signal by comparing the buck error signal with a trailing edge ramp modulated signal having a magnitude between zero and one; and determining the mode of operation of the power factor correction converter, and based on the determination, to selectively apply the one or more boost PWM signals and the buck PWM signal to the at least one boost switch and the buck switch, respectively.

In at least one embodiment, the method comprises determining the mode of operation to be the boost mode when the instantaneous value of the rectified input AC voltage is lower than the lower reference voltage; and in the boost mode, applying the at least one boost PWM signal to the at least one boost switch, and setting the buck switch to a continuous ON state.

In at least one embodiment, the method comprises determining the mode of operation to be a buck mode when the instantaneous value of the rectified AC input voltage is higher than the upper reference voltage, and in the buck mode, applying the buck PWM signal to the buck switch, and setting the at least one boost switch to a continuous OFF state.

In at least one embodiment, the method comprises determining the mode of operation to be the intermediate buck and boost mode when the instantaneous value of the rectified input AC voltage is between the upper threshold voltage and the lower threshold voltage, and in the intermediate buck and boost mode, applying the at least one boost PWM signal to the at least one boost switch, and the buck PWM signal to the buck switch.

In at least one embodiment, the method comprises determining the reference output voltage based on a sensed battery voltage of the battery.

In at least one embodiment, method comprises determining the reference voltage to be substantially 200 volts when the sensed battery voltage is less than or equal to 200 volts.

In at least one embodiment, the method comprises determining the reference output voltage to be substantially 250 volts when the sensed battery voltage is between 200 volts and 250 volts.

In at least one embodiment, the method comprises determining the reference output voltage to be substantially 350 volts when the sensed battery pack voltage is between 250 volts and 350 volts.

In at least one embodiment, the method comprises determining the reference output voltage to be substantially 400 volts when the sensed battery voltage is between 350 volts and 500 volts.

In at least one embodiment, the method comprises determining the upper threshold voltage and the lower threshold voltage according to the formulas: $Vu=Vref+V_B$ and $Vl=Vref-V_B$, where Vu is the upper threshold voltage, Vl is the lower voltage threshold, Vref is the reference output voltage, and $V_B$ is a predetermined band voltage.

In at least one embodiment, the method comprises setting the predetermined band voltage in a range between 1 volt and 10 volts.

In at least one embodiment, the method comprises setting the predetermined band voltage to be substantially 1 volt so as to generate a low input current ripple during a transition between the intermediate buck and boost mode and at least one of the buck mode and the boost mode.

In at least one embodiment, the method comprises providing the at least one boost PWM signal with a first boost PWM signal for controlling a first boost switch, and a second phase-shifted boost PWM signal for controlling a second boost switch.

In at least one embodiment, the method comprises: determining the upper threshold voltage and the lower threshold voltage according to the formulas: $Vu=Vref+V_B$ and $Vl=Vref-V_B$, where Vu is the upper threshold voltage, Vl is the lower voltage threshold, Vref is the reference output voltage, and $V_B$ is a predetermined band voltage; resetting a programmable buck current integrator when it is determined that the difference between the instantaneous value of the rectified input AC input voltage and the reference output voltage is less than the band voltage; and resetting a programmable boost current integrator when it is determined that the difference between the instantaneous value of the rectified AC input voltage and the reference output voltage is greater than the band voltage.

In at least one embodiment, the method comprises generating the boost error signal with clipped regions defining a lower limit of the boost error signal, wherein the clipped regions result from re-setting the boost current integrator, and generating the buck error signal with clamped regions defining an upper limit of the buck error signal, wherein the clamped regions result from the re-setting of the buck current integrator.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1:
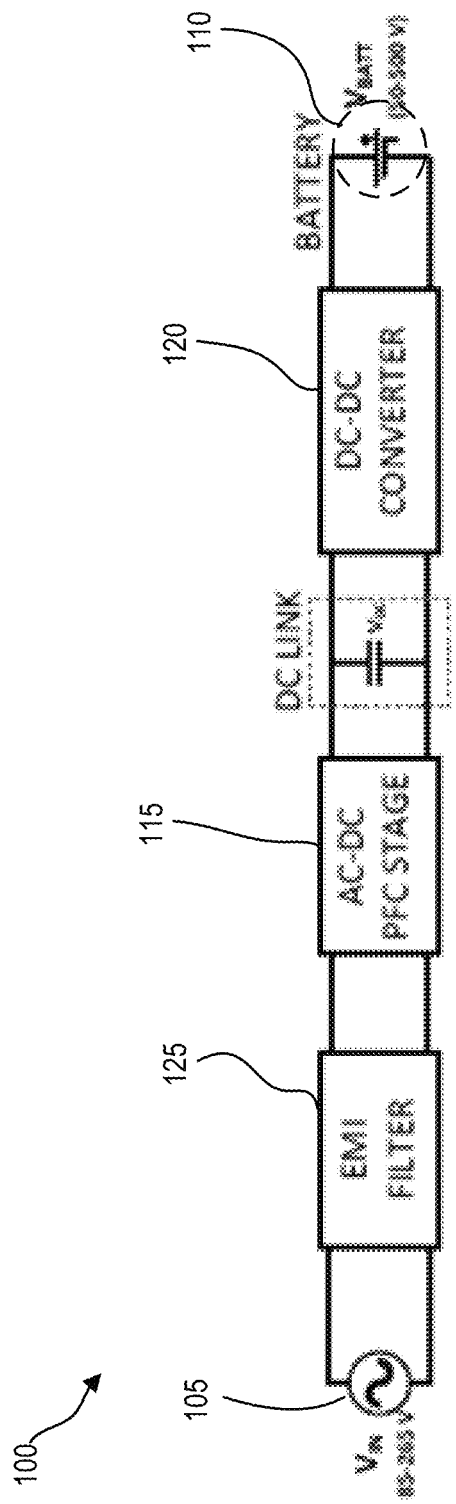
FIG. 1 is an example embodiment of a two-stage on-board battery charger, in accordance with the teachings herein.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems or methods having all of the features of any one of the devices, systems or methods described below or to features common to multiple or all of the devices, systems or methods described herein. It is possible that there may be a device, system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the example embodiments described herein.

It should also be noted that the terms "coupled" or "coupling" as used herein can have several different meanings depending in the context in which these terms are used. For example, the terms coupled or coupling can have a mechanical, fluidic or electrical connotation. For example, as used herein, the terms coupled or coupling can indicate that two elements or devices can be directly connected to one another or connected to one another through one or more intermediate elements or devices via an electrical or magnetic signal, electrical connection, an electrical element or a mechanical element depending on the particular context. Furthermore coupled electrical elements may send and/or receive data.

Unless the context requires otherwise, throughout the specification and claims which follow, the word "comprise" and variations thereof, such as, "comprises" and "comprising" are to be construed in an open, inclusive sense, that is, as "including, but not limited to".

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

Reference throughout this specification to "one embodiment", "an embodiment", "at least one embodiment" or "some embodiments" means that one or more particular features, structures, or characteristics may be combined in any suitable manner in one or more embodiments, unless otherwise specified to be not combinable or to be alternative options.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

Similarly, throughout this specification and the appended claims the term "communicative" as in "communicative pathway," "communicative coupling," and in variants such as "communicatively coupled," is generally used to refer to any engineered arrangement for transferring and/or exchanging information.

Exemplary communicative pathways include, but are not limited to, electrically conductive pathways (e.g., electrically conductive wires, electrically conductive traces), magnetic pathways (e.g., magnetic media), optical pathways (e.g., optical fiber), electromagnetically radiative pathways (e.g., radio waves), or any combination thereof. Exemplary communicative couplings include, but are not limited to, electrical couplings, magnetic couplings, optical couplings, radio couplings, or any combination thereof.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a keyboard, mouse, touchscreen, or the like), and at least one output device (e.g. a display screen, a printer, a wireless radio, or the like) depending on the nature of the device.

As mentioned in the background section, commercially available on-board battery chargers for electric vehicles generally have an output voltage that falls under one of three separate ranges: 36 to 72 V, 72 to 150 V, and 200 to 450 V. Accordingly, conventionally, different battery chargers are constructed to provide these different output ranges and these different battery chargers are needed for providing battery charging to different batteries operating in the different voltage ranges. This is due to the high and fixed DC-link voltage (i.e., typically 400 volts) that is conventionally generated by these battery chargers and which necessitate the use of different magnetic components in order to generate different output voltage ranges. The use of different magnetic components to achieve different output voltage ranges may accordingly result in reduced charging efficiency. Furthermore, the variation in size of the magnetic components of conventional DC-DC converters for attaining these different voltage ranges varies the size and weight of these chargers for different voltage levels while generating limited ranges in output voltage, as explained above.

In accordance with the teachings herein, there is provided a universal on-board battery charger that has a wide output voltage capability (e.g. 50 to 500 V) so that the same battery charger can be used to charge different batteries that provide an output voltage in the three separate voltage ranges. Accordingly, the on-board battery charger in accordance with the teachings herein can be used across several electric mobility applications such as cars, buses, golf karts, neighborhood electric vehicles, and Plug-in Hybrid Electric Vehicles (PHEVs).

In accordance with the teachings herein, the universal on-board battery charger employs a first stage buck-boost PFC converter that is capable of generating lower DC-link voltages which accommodates lower battery-charger output voltages (i.e., 50 V to 200 V). This allows for the battery-charger to generate lower output voltages without appreciable impact on the size or weight of the magnetic components at the second stage.

In particular, the buck-boost PFC converter generates DC-link voltages which are lower than the peak of the input AC voltage by dynamically operating in one of three modes of operation: a boost mode, a buck mode, and an intermediate buck and boost mode. The intermediate buck and boost mode helps to overcome prior challenges faced in effecting smooth transitions between the buck and boost mode of operations, which is necessary for achieving lower DC-link voltages. More specifically, and as explained in further detail herein, the intermediate buck and boost mode allows the PFC converter to transition out of one operational mode (i.e., the buck or boost mode), and into the next operational mode, without sudden distortions in the input current during the transition process. Accordingly, the intermediate buck and boost mode improves the input current waveform, and by extension, maximizes the power quality at the input.

The transition between the various modes of operation for the power factor correction (PFC) converter may be achieved by using a control scheme, in accordance with the teachings herein, which employs a novel pulse-width modulation (PWM) scheme to transition between trailing-edge PWM for buck mode and leading-edge PWM for boost mode. The modulation scheme generates error signals based on a decision block, which controls transistors differently in the buck and boost modes, by switching one of them off when the corresponding operation is not required.

In another aspect, the proposed controller varies the DC link voltage based on the output (battery) voltage which allows a wider output voltage range (e.g. 50-500 V) to be achieved compared to the conventional scenario (e.g. 200-450 V) using the same DC-DC converter while also maximizing power quality at the input in accordance with the teachings herein. Furthermore, a variable DC link voltage allows the same DC-DC converter to operate with a smaller range of duty ratios for a particular application that needs a smaller output voltage range. This increases the efficiency of the DC-DC converter as buck topologies are known to have low efficiency at low duty ratios.

Accordingly, a universal battery charger implemented in accordance with the teachings herein is able to efficiently generate a wide range of output voltages, such as, but not limited to a range of about 50 volts to 500 volts, for example. The upper and lower limits of this range may be varied by changing, via the PFC controller, the DC-link voltage generated by the PFC converter.

Referring now to FIG. 1, there is shown an example embodiment of a two-stage battery charger 100, in accordance with the teachings herein. The battery charger 100 receives an input AC voltage $V_{IN}$, supplied by a voltage source 105, and generates an output battery voltage $V_{BATT}$ for charging an electric battery 110.

In various cases, the electric battery 110 may power, for example, an electric vehicle, such as an electric car, electric bus, electric golf kart, or a Plug-in Hybrid Electric Vehicle (PHEV).

As described in further detail herein, the battery charger 100 is capable of converting a wide range of input voltages from the voltage source 105, to a wide range of output battery voltages $V_{BATT}$ for charging the battery 110. For example, the battery voltage $V_{BATT}$ may be in a range of between 50 volts to 500 volts depending on the requirements of the battery 110.

The voltage source 105 may be a wall-outlet located, for example, in a garage or a parking lot for parked electrical vehicles. In other cases, the voltage source 105 can be a stand-alone power system which is configured to generate an AC voltage.

The two-stage battery charger 100 includes an AC-DC power factor correction (PFC) converter stage 115, coupled to a DC-DC converter stage 120. In at least some embodiments, the charger 100 can include an electromagnetic interference (EMI) filter 125 to both remove common and differential mode noise from the input AC voltage $V_{IN}$, as well as act as a surge arrester. In various cases where the input voltage $V_{IN}$ is generated by a controlled AC voltage source, or is otherwise provided by a charging cable having external voltage protections, the EMI filter 125 may not be necessary.

The PFC converter stage 115 is responsible for converting the input AC voltage $V_{IN}$ (filtered or unfiltered) to an "intermediate" output DC link voltage $V_{DC}$ ("DC-link voltage"). The DC link voltage $V_{DC}$ is then passed through the DC-DC converter stage 120 to generate the battery voltage $V_{BATT}$.

As discussed further below, the magnitude of the DC link voltage $V_{DC}$ is varied based on the requirements of the battery voltage $V_{BATT}$ of battery 110. This is in contrast to prior conventional PFC converters which only generate a fixed DC link voltage $V_{DC}$ whose value is higher than the peak of the AC input voltage. However, in accordance with the teachings herein, the DC link voltage $V_{DC}$ may be greater than, less than, or equal to the peak of the AC input voltage, which makes it possible to achieve a wide output voltage range.

In another aspect, the selected DC link voltage $V_{DC}$ is compared to the peak of the input voltage to operate the AC/DC PFC stage 115 in different modes of operation. For example, if the selected DC link voltage $V_{DC}$ is greater than the peak input voltage, the AC/DC PFC stage 115 operates in boost mode. Alternatively, if the selected DC link voltage $V_{DC}$ is less than or equal to peak of input voltage, the controller toggles between the boost and buck modes based on an instantaneous value of the AC input voltage. This is an improvement over the conventional boost PFC that only operates in the boost mode of operation because the DC link voltage $V_{DC}$ is always selected to be greater than then the peak of the input voltage.

Figure 2:
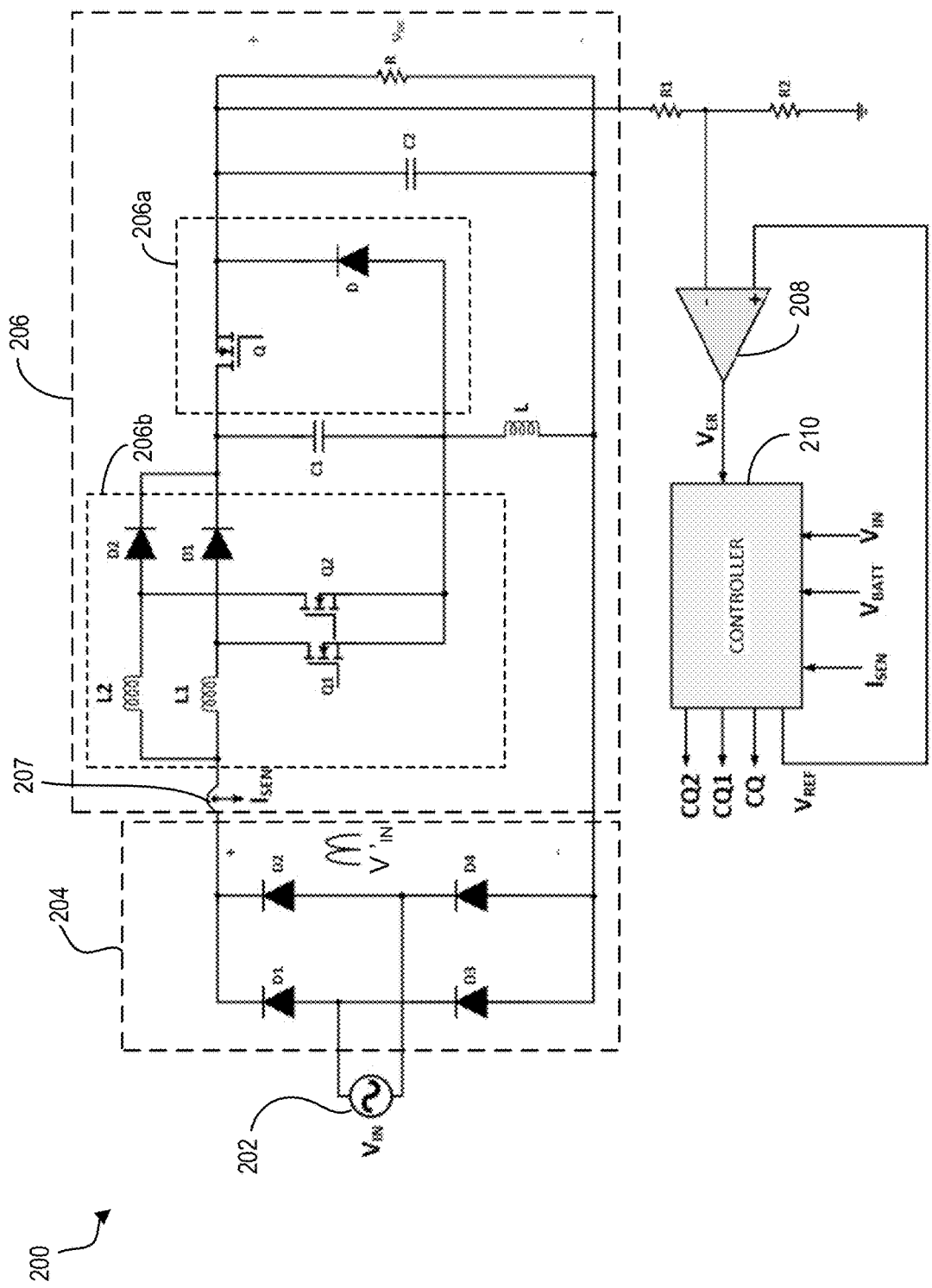
FIG. 2 is an example embodiment of a circuit schematic for a Power Factor Correction (PFC) converter for the on-board battery charger of FIG. 1.

Referring now to FIG. 2, there is shown a circuit diagram of an example embodiment of a PFC converter 200 in accordance with the teachings herein. The PFC converter 200 is analogous to the PFC converter stage 115 of FIG. 1. The PFC converter 200 includes a rectifier unit 204, a converter unit 206, an error unit 208, and a controller 210.

The rectifier unit 204 transforms the input AC voltage $V_{IN}$, from a voltage source 202, to a rectified input AC voltage $V'_{IN}$. To this end, the rectifier unit 204 may include diodes D1, D2, D3, and D4 arranged in a bridge circuit configuration.

The converter unit 206 is coupled to an output of the rectifier unit 204. The converter unit 206 is responsible for receiving the rectified input voltage $V'_{IN}$ and generating the output DC link voltage $V_{DC}$. The converter unit 206 is also configured to operate in one of three modes of operation to generate variable DC link voltages $V_{DC}$: a buck mode, a boost mode, and an intermediate buck and boost mode. This is done by sending certain control signals to the transistors Q, Q1 and Q2. In the buck mode, the converter unit 206 generates an output voltage $V_{DC}$ with a magnitude that is lower than the peak magnitude of the rectified input voltage $V'_{IN}$. In the boost mode, the converter unit 206 generates an output voltage $V_{DC}$ with a magnitude which is greater than the peak magnitude of the rectified input voltage $V'_{IN}$. In the intermediate buck and boost mode, the converter unit 206 generates an output voltage $V_{DC}$ having a magnitude that is equivalent to an instantaneous value of the rectified input voltage $V'_{IN}$. As explained in further detail herein, the intermediate buck and boost mode results in a continuous and stable flow of input current through the converter unit 206 which, in turn, facilitates the transition of the converter unit 206 between the buck and boost modes.

Figure 3A:
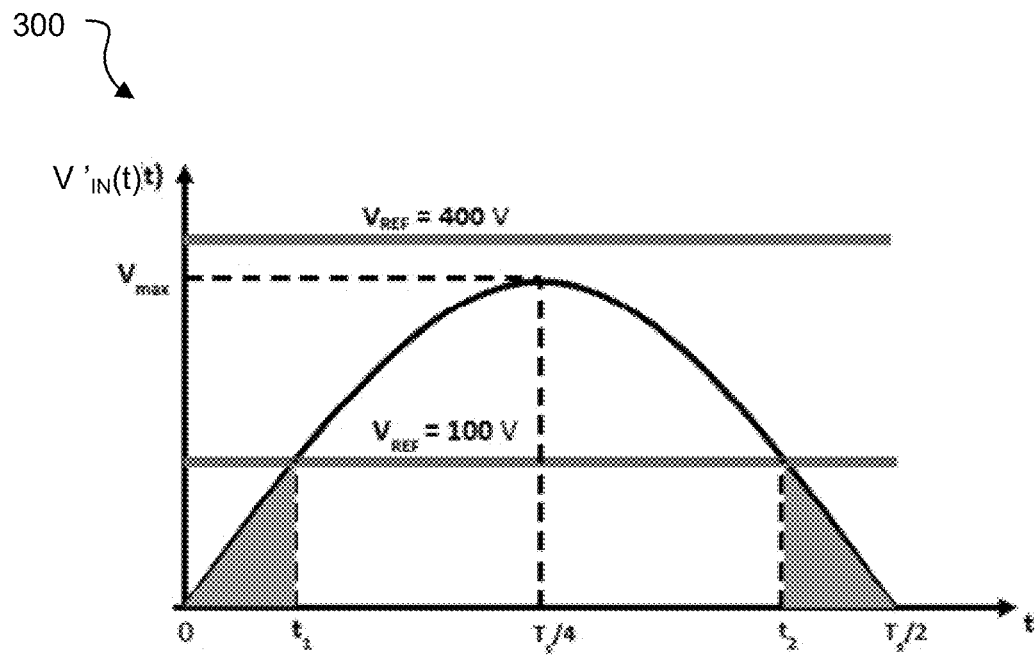
FIG. 3A is an example voltage plot showing one half-cycle of a rectified alternating-current (AC) voltage signal received by the PFC converter of FIG. 2.

Referring now briefly to FIG. 3A, and with continued reference to FIG. 2, there is illustrated a voltage plot 300 showing a single half-cycle of the rectified input voltage $V'_{IN}$. As shown, the half-cycle spans a time interval of $T_s/2$ (i.e., half of the wavelength period $T_s$), where the peak input voltage $V_{max}$ occurs at the mid-point $T_s/4$. The output voltage reference $V_{REF}$ is the desired output DC-link voltage $V_{DC}$. As explained in further detail herein, the voltage reference $V_{REF}$ is determined based on the battery voltage $V_{BATT}$. The mode of operation of the converter unit 206 will depend on the magnitude of the voltage reference $V_{REF}$ in relation to the rectified input voltage $V'_{IN}$.

For a conventional converter unit, the voltage reference $V_{REF}$ (representing the desired output DC-link voltage $V_{DC}$) is a fixed value that is selected to be greater than the peak input voltage $V_{max}$. Accordingly, the conventional converter unit will operate in a continuous boost mode. When, however, the voltage reference $V_{REF}$ is selected to be below the peak input voltage $V_{max}$ (i.e., to generate lower DC-link voltages $V_{DC}$), a converter unit will, in these cases, need to dynamically operate between the buck and boost modes of operation.

More particularly, the converter unit will operate in boost mode in the time interval between 0 to $t_1$ seconds, and $t_2$ to $T_s/2$ seconds, where the input voltage $V'_{IN}$ is below the reference voltage. The converter unit will also operate in buck mode between $t_1$ and $t_2$ seconds where the input voltage $V'_{IN}$ is above the reference voltage $V_{REF}$. In accordance with teachings provided herein, the controller 210 is configured to vary the reference output voltage $V_{REF}$ to below or above the peak input voltage $V'_{IN}$ in order to generate a wide range of output DC-link voltages $V_{DC}$ (i.e., in a range of 100 volts to 400 volts).

Figure 3B:
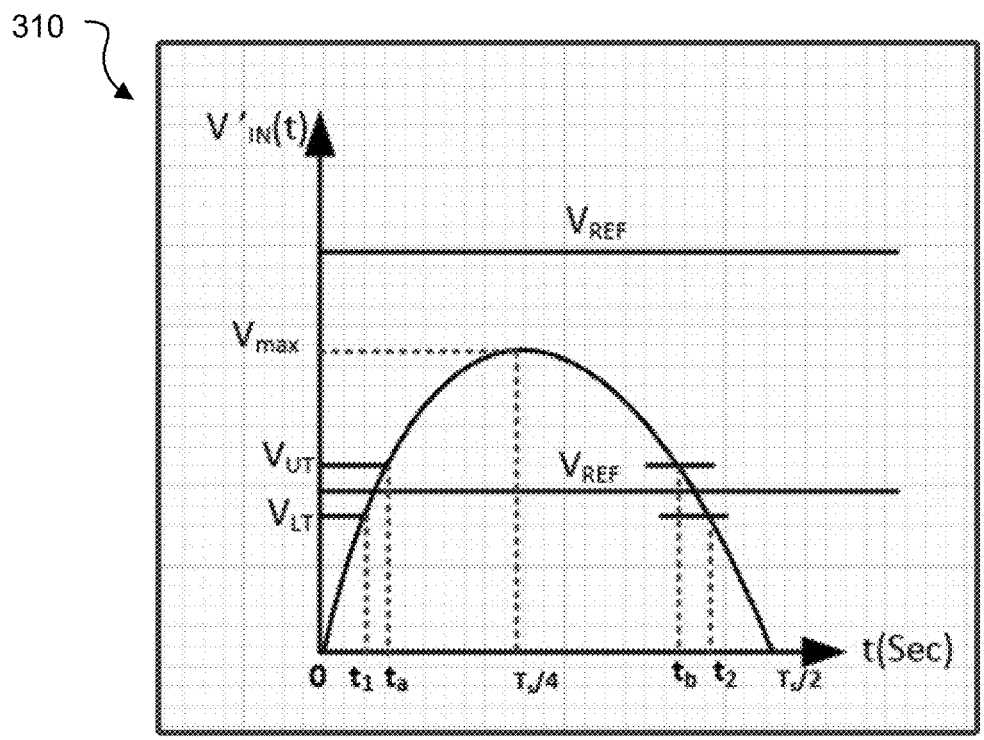
FIG. 3B is a further example of a voltage plot showing one half-cycle of a rectified AC voltage signal received by the PFC converter of FIG. 2 with upper and lower reference voltages defined around a voltage threshold.

Referring now to FIG. 3B, and with continued reference to FIG. 2, there is shown a modified voltage plot 310 for a single half-cycle of the rectified input voltage $V'_{IN}$. The voltage plot 310 has been modified to show an additional mode of operation of the converter unit 206 where there is a smooth transition for the buck mode to the boost mode and a smooth transition from the boost mode to the buck mode. Therefore, the convertor unit 206 operates in a buck mode, a boost mode or an intermediate buck and boost mode.

In the example of FIG. 3B, the controller 206 generates an additional upper reference threshold $V_{UT}$, and lower reference threshold $V_{LT}$ which are used so that the convertor unit 206 can operate in the intermediate buck and boost mode of operation.

In particular, and as explained above, in the intermediate buck and boost mode of operation, the input voltage $V'_{IN}$ terminal of the converter unit 206 is connected to the output DC-link voltage $V_{DC}$ terminal. By connecting the input and output terminals, minimal current flows through the convert unit 206 for a short duration of time. With the current flow being minimized, the converter unit 206 may be re-configured to operate in the buck or boost mode of operation without significant distortions to the input current flow.

Accordingly, the intermediate buck and boost mode provides for smooth crossover transition in input current waveform from the boost to the buck mode of operation and vice versa, which maximizes power quality at the input.

The values of the thresholds $V_{UT}$ and $V_{LT}$ can be pre-defined. For example, the relationship between the reference voltage $V_{REF}$, and the upper and lower reference thresholds $V_{UT}$ and $V_{LT}$, may be given by Equations (1) and (2):

$$V_{UT}=V_{REF}+V_B \quad (1)$$

$$V_{LT}=V_{REF}-V_B \quad (2)$$

where $V_B$ is a predetermined band voltage. In various embodiments, the band voltage $V_B$ may be varied in a range between 1 volt and 10 volts in order to vary the upper and lower reference thresholds $V_{UT}$ and $V_{LT}$, respectively.

In at least some embodiments, the band voltage $V_B$ may be defined to be substantially 1 volt in order to minimize input current ripple. In particular, and as previously mentioned, the input current is minimized during the intermediate buck-and-boost mode. When the band voltage is greater than 1 volt, a widened gap (proportionate to the band voltage) results between: (a) the input voltage $V'_{IN}$, and (b) the reference voltage $V_{REF}$, at the transition point between the 'intermediate buck-and-boost mode', and the 'buck' or 'boost' mode of operation (i.e., the widened gap results because the output voltage follows the input voltage during the intermediate buck-and-boost mode of operation, and as such, deviates further away from the reference voltage). Accordingly, the converter unit 206 requires a larger input current, at the transition point, to reduce the gap between the input voltage and the reference voltage (i.e., by bucking or boosting the input voltage). This results in larger input current ripples at the transition point.

As shown in FIG. 3B, between $t_1$ and $t_a$ seconds, and $t_b$ and $t_2$ seconds, the input voltage $V'_{IN}$ is between the upper and lower reference thresholds $V_{UT}$, $V_{LT}$. In these cases, the converter unit 206 operates in the intermediate buck and boost mode.

Accordingly, the operation of the converter unit 206 in the intermediate buck and boost mode helps to provide for smooth crossover transitions between the boost mode of operation and the buck mode operation. In this manner, the intermediate buck and boost mode helps to overcomes prior challenges faced in generating DC-link voltages which are below the peak input voltage $V_{max}$.

Referring now back to FIG. 2, the converter unit 206 will be discussed herein in further detail. In particular, the converter unit 206 includes a buck converter circuit 206a cascaded with a boost converter circuit 206b.

The buck converter circuit 206a includes a buck switch Q in series arrangement with a diode D. The buck switch Q controls the flow of current through the diode D. The buck switch Q is a MOSFET transistor, wherein the gate of the buck switch Q receives a control signal CQ from the controller 210. The drain of the buck switch Q is coupled to an output node of the diode D.

The boost converter circuit 206b includes a first branch having an inductor L1 in series arrangement with a diode D1, and a second branch having a second inductor L2 in series with a second diode D2, wherein the first and second branches are in parallel with one another. The inductors L1 and L2 have a first node coupled to one another and to a first input node of the converter unit 206. The second nodes of the inductors L1 and L2 are coupled to first (i.e. input) nodes of the diodes D1 and D2 respectively. The second (i.e. output) nodes of the diodes D1 and D2 are coupled to one another.

The flow of current through the first inductor L1, and the first diode D1 is controlled by a first boost switch Q1. Similarly, the flow of current through the second inductor L2 and second diode D2 is controlled by a second boost switch Q2. The switches Q1 and Q2 are also MOSFET transistors that have their drains coupled to the midpoints of the first and second branches, respectively, at a node between the output of the inductor and the input of the diode in each respective branch. The source nodes of the transistors Q1 and Q2 are coupled to one another. The gates of the transistors Q2 and Q2 receive control signals CQ1 and CQ2 from the controller 210.

The arrangement of the inductors L1, L2 and diodes D1, D2 form a two-phase interleaved boost circuit, which may reduce input current ripple. In other cases, the boost converter circuit can include any number of interleaved phases (i.e., any number of parallel arrangements of inductors and diodes with complementary switches). For example, in some cases, the boost circuit may only include a single inductor L1 in series with a diode D1, wherein the current flow is controlled by a single boost switch Q1.

In various embodiments, the buck switch Q, and the boost switches Q1 and Q2 are operable to be varied between three states or modes: (1) a continuous ON state, (2) a continuous OFF state, and (3) an ACTIVE mode. In the ACTIVE mode, the switches dynamically change between the ON and OFF states according to a pre-determined switching frequency. The pre-determined switching frequency is reflected in the pulse width modulated (PWM) signals CQ, CQ1 and CQ2 that control switches Q, Q1, and Q2, respectively.

In at least some embodiments, non-MOSFTET switching elements may also be used to provide the same functionality of the switches Q, Q1, and Q2.

The converter unit 206 further comprises a capacitor C1 and inductor L in series. The first node of the capacitor C1 is coupled to the output of the diodes D1 and D2, and a second node of the capacitor C1 is coupled to a first node of the inductor L. A second node of the inductor L is coupled to a second input node of the converter unit 206. The transistor Q also has a drain node that is coupled to a second (i.e. output) node of the diode D. The first (i.e. input) node of the D is coupled between the capacitor C1 and the inductor L.

The converter unit 206 also comprises a parallel combination of a load resistor R and a capacitor C2. The capacitor C2 and load resistor R are coupled to the output of the boost and buck converter circuits. In particular, the first nodes of the capacitor C and the load resistor R are coupled to the drain of the transistor Q. Second nodes of the capacitor C and the load resistor R are coupled to the second node of the inductor L and the second input node of the converter unit 206. The capacitor C2 ensures that a constant DC link voltage $V_{DC}$ is generated across the load R. The load resistor R represents the DC-DC converter 120 of FIG. 1.

The inductor L1, L2 values for the boost converter circuit 206b may be selected to satisfy Equations (3) and (4):

$$L_{L1,L2} = L1 = L2 \tag{3}$$

$$L_{L1,L2} = \frac{T_s}{2}\left(1 - \frac{V'_{IN(Min)}}{V_{DC(Max)}}\right)R_{input} \tag{4}$$

where $T_s$ is the pre-determined switching period for all switches Q, Q1, and Q2 during their respective ACTIVE mode, $R_{input}$ is the input resistance for the converter unit 206 at a particular output power and voltage, $V'_{IN}$ (min) is the minimum input voltage into the converter unit 206, and $V_{DC}$ (Max) is the maximum output DC-link voltage generated by the converter unit 206. Accordingly, $V'_{IN\ (min)}$ and $V_{DC\ (Max)}$ are selected for the worst-case scenario where a large output DC-link voltage is generated from a low input voltage. In at least some cases, the switching period $T_s$ may be selected to be 50 μs (corresponding to a switching frequency $F_s$ of 20 kHz), $V'_{IN\ (Min)}$ may be selected to be 85 volts, and $V_{DC\ (Max)}$ may be selected to be 400 volts.

Similarly, the inductor L, interposed between the buck converter circuit 206a and the boost converter circuit 206b, may be selected to satisfy Equations (5) and (6):

$$L = \left(\frac{1}{L_B} - \frac{1}{L_{L1,L2}}\right)^{-1} \tag{5}$$

$$L_B = \frac{(V'_{IN(Min)} - V_{DC(Max)}) \times V^2_{DC(Max)} \times R_{input} \times T_S}{2(V'_{IN(Min)})^3} \tag{6}$$

where $T_s$, $R_{input}$, $V'_{IN\ (min)}$, and $V_{DC\ (Max)}$ are defined similar to Equations (3) and (4) above.

In at least some embodiments, where the converter unit 206 is configured to generate an output power of 1 kW, the values of the circuit components of the converter unit 206 may be selected such that $L_1$=2 mH, $L_2$=2 mH, L=1.5 mH, $L_0$=560 μF, $C_1$=8 μF, $C_2$=470 μF, and $C_0$=2×47 μF.

A current sensor 207 may also be positioned at the input of the converter unit 206 to measure an input current $I_{SEN}$ of the converter unit 206. The input current $I_{SEN}$ is then transmitted to the controller 210.

Figure 4A:
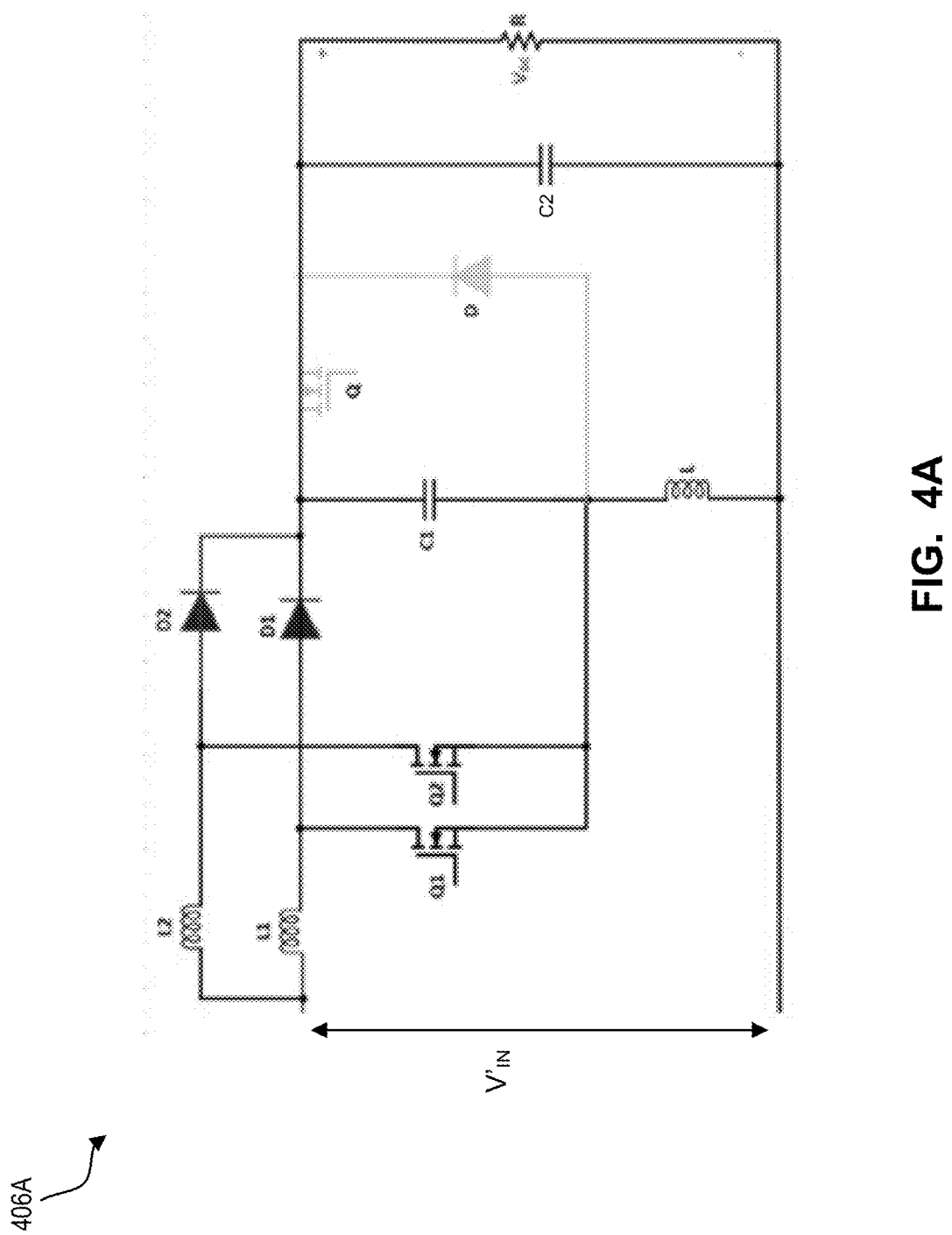
FIG. 4A is a circuit drawing of the converter unit of FIG. 2 in a boost mode of operation.

Referring now briefly to FIG. 4A, there is shown a circuit diagram of a converter unit 406A in a boost mode of operation. The converter unit 406A is analogous to the converter unit 206 of FIG. 2 in the boost mode of operation. In particular, in the boost mode of operation, the buck switch Q is set to a continuous ON state by the controller 210. This results in a short circuit which eliminates the flow of current through diode D (i.e., as the diode D is now reverse biased). The operational mode of the boost switches Q1 and Q2 are set to the ACTIVE mode, wherein the operating state of each switch is dynamically varied between the ON state and the OFF state according to a predetermined frequency reflected in the duty cycles of one or more boost PWM control signals CQ1 and CQ2 generated by the controller 210. As shown herein in FIGS. 4B to 4E, in the ACTVE mode, the dynamic switching of the boost switches Q1 and Q2 between the ON and OFF generates a boosted output DC link voltage $V_{DC}$ across the load resistor R.

Referring now briefly to FIGS. 4B, 4C, 4D, and 4E, there is shown circuit diagrams of the converter unit 406A in the boost mode of operation and illustrating, in more detail, the boost switches Q1 and Q2 in the ACTIVE mode. Specifically, each of FIGS. 4B, 4C, 4D, and 4E show different configurations of boost switches Q1 and Q2 during the ACTIVE mode.

Figure 4B:
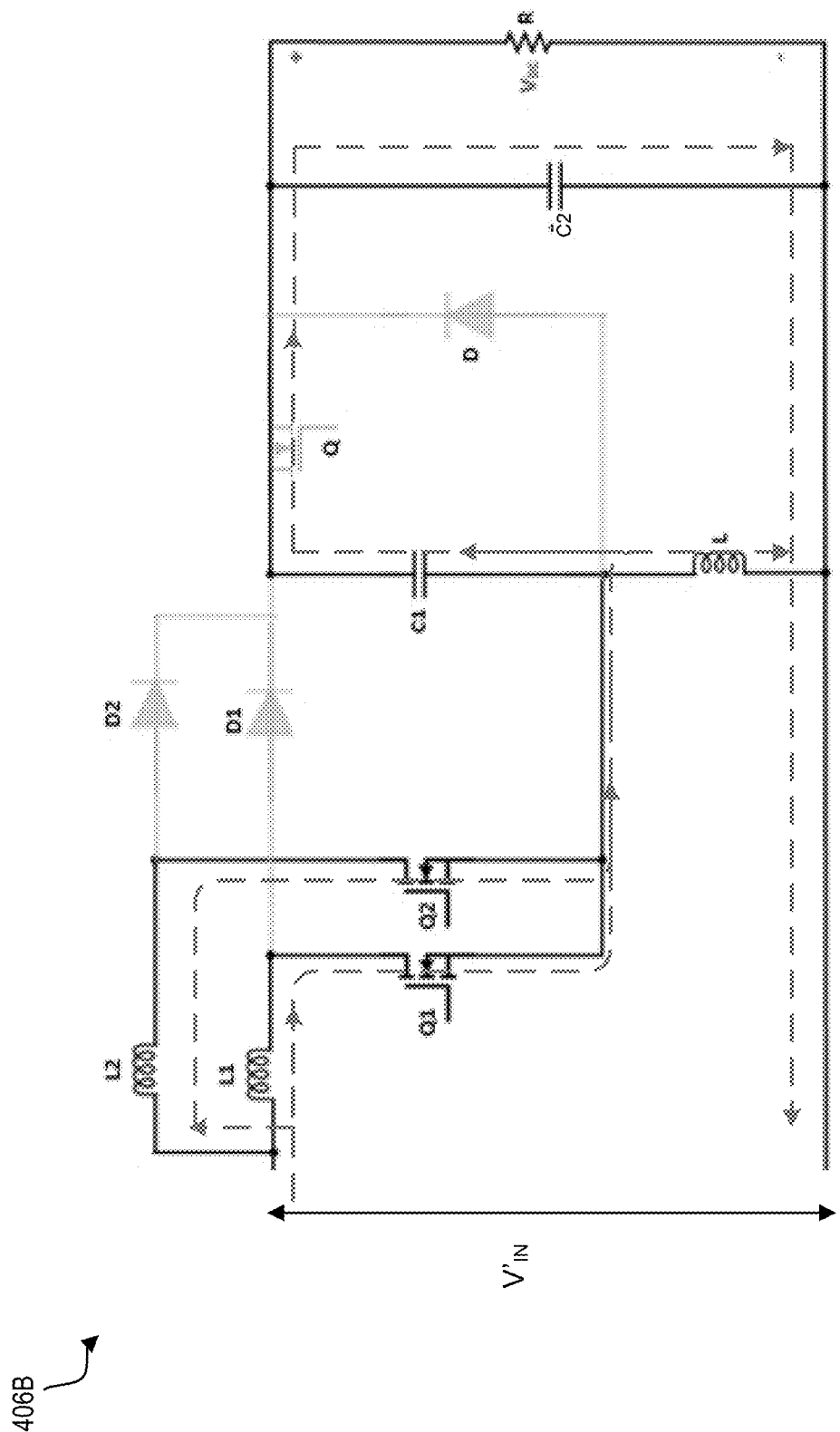
FIG. 4B is a circuit drawing of the converter unit of FIG. 4A in the boost mode of operation in accordance with some teachings herein.

Referring now first to FIG. 4B, there is shown a circuit diagram of a converter unit 406B, which is the converter unit 406A in the boost mode of operation. FIG. 4B shows the boost switches Q1 and Q2 momentarily turned to the ON state during the ACTIVE mode. As shown by the illustrated current flow arrows, turning ON the boost switches Q1 and Q2 momentarily results in a short circuit that eliminates the flow of current through diodes D1 and D2. The current is accordingly re-routed through switches Q1, Q2 before branching, on one hand, in the direction of capacitor C1 and the parallel arrangement of capacitor C2 and resistor R, and on the other hand, in the direction of inductor L.

Figure 4C:
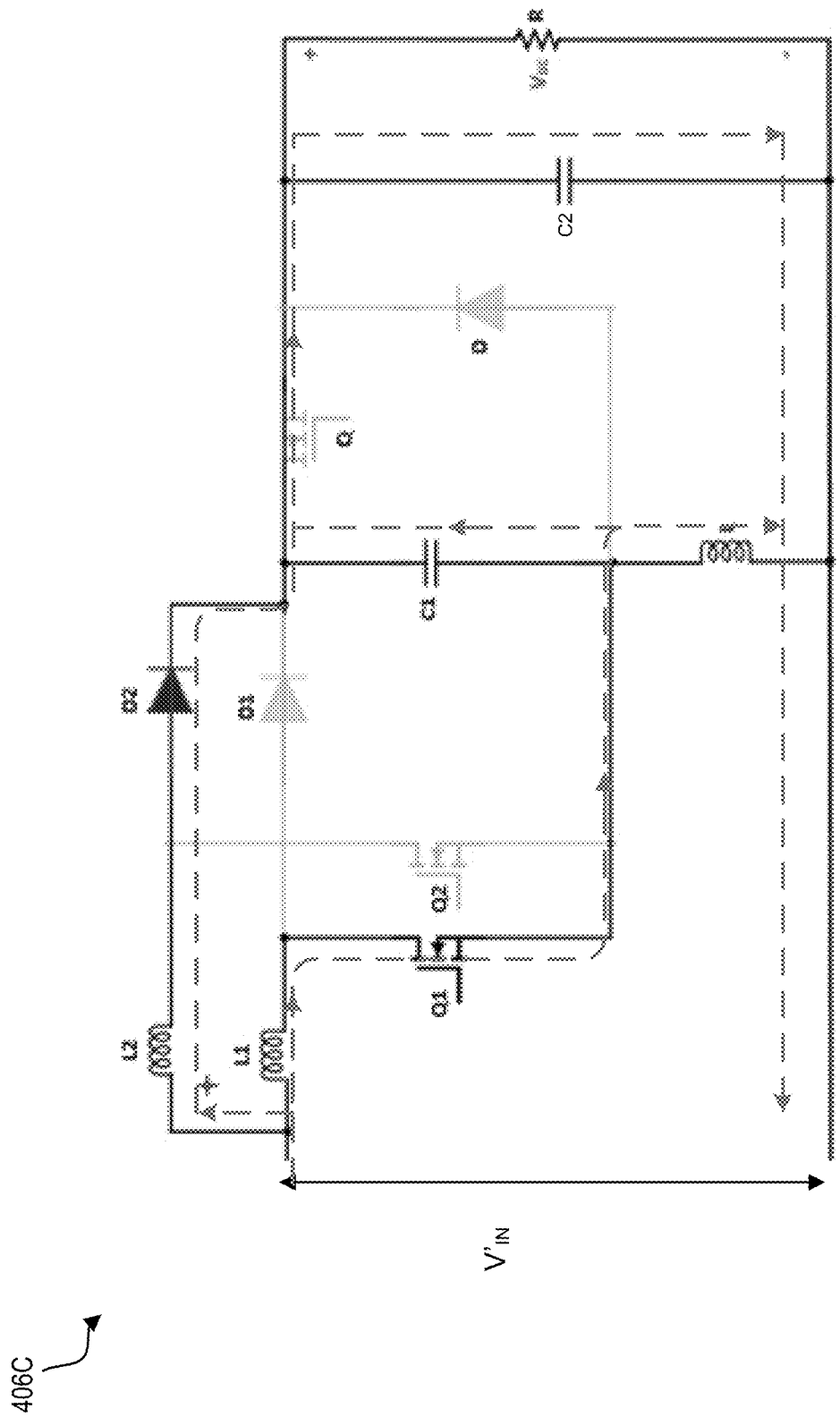
FIG. 4C is a circuit diagram of the converter unit of FIG. 4A in the boost mode of operation in accordance with some further teachings herein.
Figure 4D:
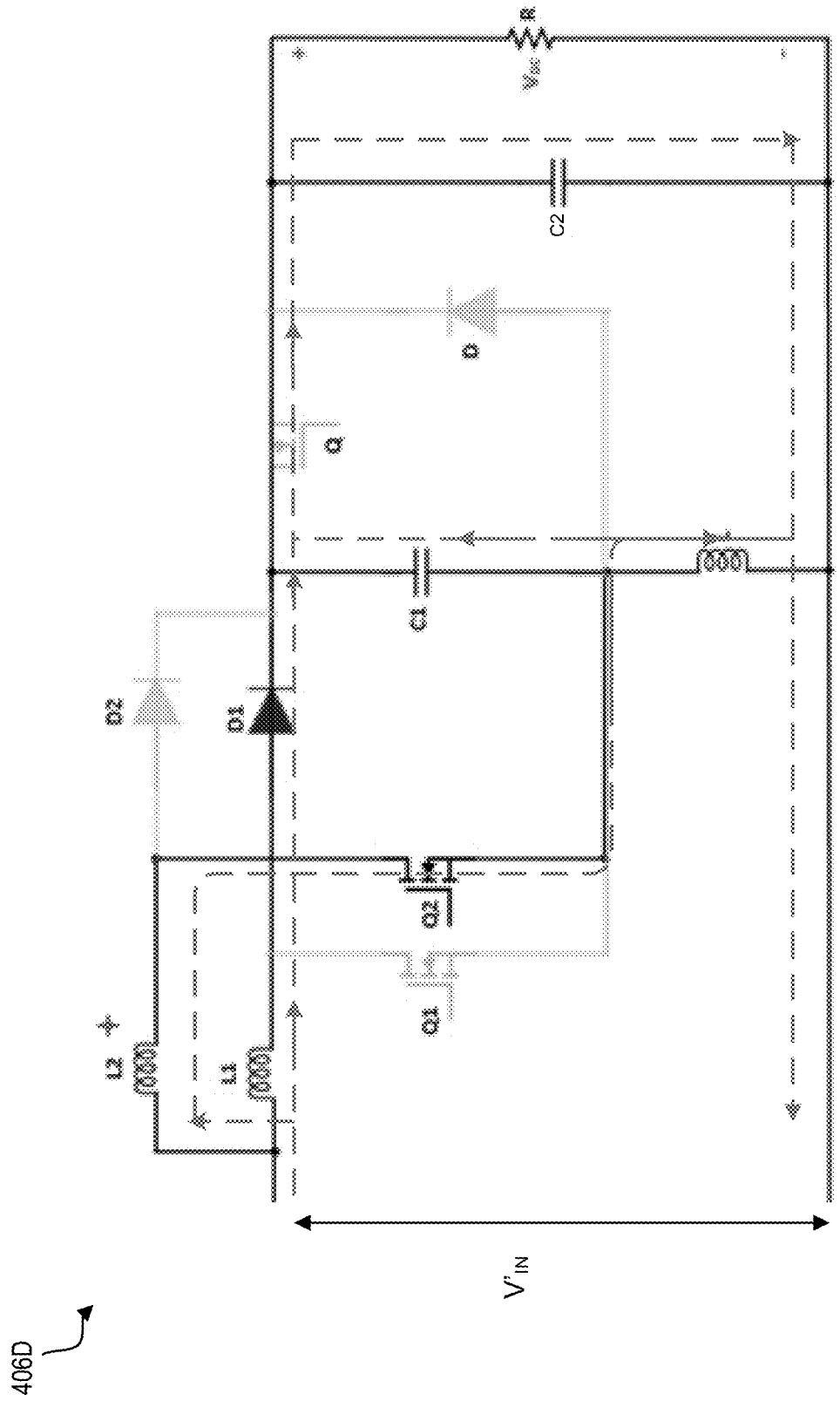
FIG. 4D is a circuit diagram of the converter unit of FIG. 4A in the boost mode of operation in accordance with still some further teachings herein.

Referring now to both FIGS. 4C and 4D, there is shown a circuit diagram of the converter units 406C and 406D, which are the converter unit 406A in the boost mode of operation. FIGS. 4B and 4C show a configuration where only one of the boost switches Q1 or Q2 is switched momentarily to the ON state during the ACTIVE mode. As shown by the illustrated current flow arrows, depending on which of the boost switches Q1 and Q2 is momentarily in the ON state, the current will flow through either one of the first diode D1, or the second diode D2, respectively.

Figure 4E:
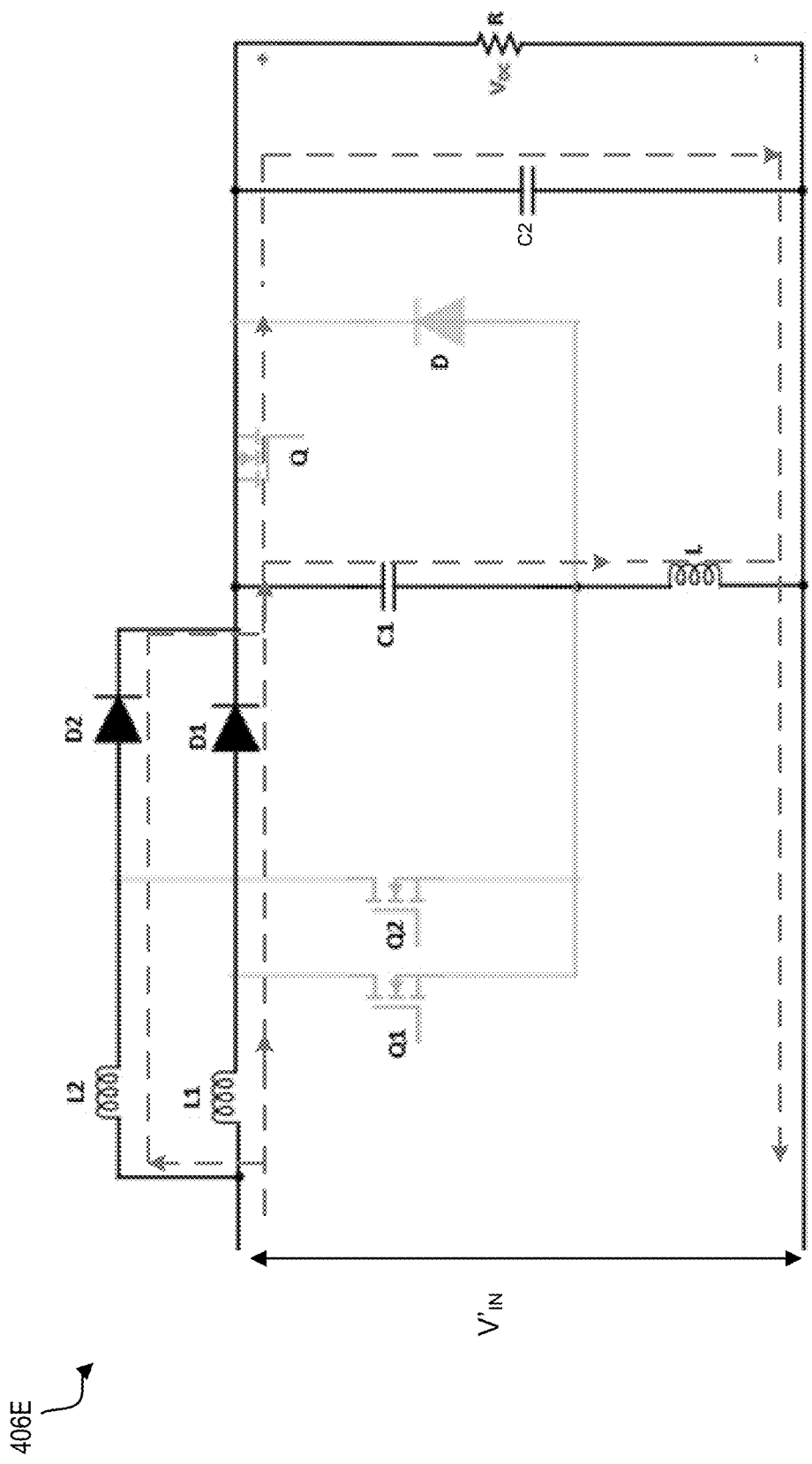
FIG. 4E is a circuit diagram of the converter unit of FIG. 4A in the boost mode of operation in accordance with yet still some further teachings herein.

Referring now to FIG. 4E, there is shown a circuit diagram of the converter unit 406E, which is the converter unit 406A in the boost mode of operation. FIG. 4E shows a configuration where the boost switches Q1 and Q2 are both momentarily switched to the OFF state during the ACTIVE mode. As shown by the illustrated current flow arrows, current now flows through both the first diode D1 and the second diode D, before branching-off between, on one hand, the series arrangement of capacitor C1 and inductor L, and on the other hand, the parallel arrangement of capacitor C2 and resistor R.

Figure 4F:
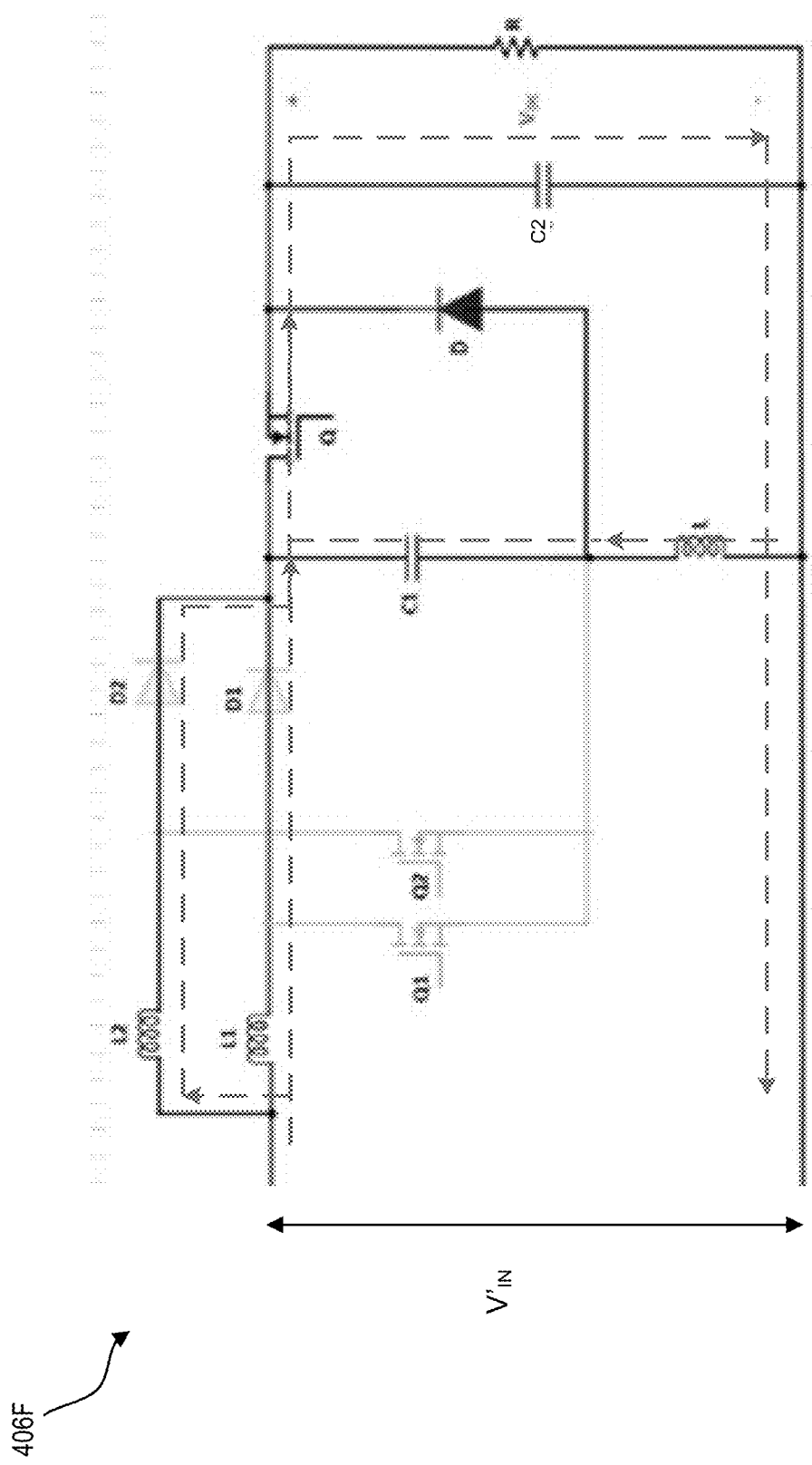
FIG. 4F is a circuit drawing of the converter unit of FIG. 2 in a buck mode of operation.

Referring now briefly to FIG. 4F, there is shown a circuit diagram of a converter unit 406F in a buck mode of operation. The converter unit 406F is analogous to the converter unit 206 of FIG. 2 in the buck mode of operation. In the buck mode of operation, the boost switches Q1 and Q2 are now set to a continuous OFF state by the controller 210. As shown by the current flow arrows, this generates an open circuit across each of the switches Q1 and Q2, which in turn, directs current through the inductors L1 and L2 and diodes D1 and D2. A low pass filter is formed by inductors L1, L2 and capacitor C1 such that current flow through these components generates smooth and low ripple current at the load resister R. The buck switch Q is now set to the ACTIVE mode, where the operational state of the buck switch Q is varied between the ON state and the OFF state according to a predetermined frequency reflected in a duty cycle of a buck PWM control signal CQ generated by the controller 210. By dynamically varying the switch Q, the input rectified voltage V"$_{IN}$ is bucked to a lower DC link voltage V$_{DC}$.

The circuit topology for the intermediate buck-and-boost mode is similar, and overlaps, with the circuit topology for the buck mode of operation, as shown in FIG. 4F. In the intermediate buck and boost mode, however, the buck switch Q will be turned ON continuously. This connects the input voltage IN to the output voltage terminal V$_{DC}$. By connecting the input and output voltage terminals, the input and output voltages are equalized, and the current flowing through the converter unit 406E is minimized (or stabilized) for a short duration of time. With the current stabilized, the switches Q, Q1, and Q2 can be re-configured to transition the converter unit 206 between the buck mode of operation and the boost modes of operation without distortions to the input current flow. Accordingly, the intermediate buck-and-boost mode allows for smooth cross-over transition in input current waveform from the boost to the buck mode of operation (and vice versa), thus maximizing the power quality at the input.

Referring now back to FIG. 2, the error unit 208 is coupled to the output of the converter unit 206. The error unit 208 is responsible for generating an error voltage V$_{ER}$.

The error voltage V$_{ER}$ is generated by determining the difference between the output DC link voltage V$_{DC}$, and the reference voltage V$_{REF}$ (i.e., the difference between the actual and desired DC link voltages). The error unit 208 includes an amplifier circuit 208a with a first input node that is coupled to a voltage divider formed by resistors R1 and R2 and a second input node that is coupled to the controller 210 to receive the reference voltage V$_{REF}$.

The controller 210 receives the voltage error V$_{ER}$ generated by the error unit 208, as well as the input AC voltage V$_{IN}$, the battery voltage V$_{BATT}$, and the sensed input current I$_{SEN}$. The controller 210 uses one or more of these inputs to generate the PWM control signals CQ, CQ1, and CQ2 which control the switches Q, Q1, and Q2 as described below.

Figure 5A:
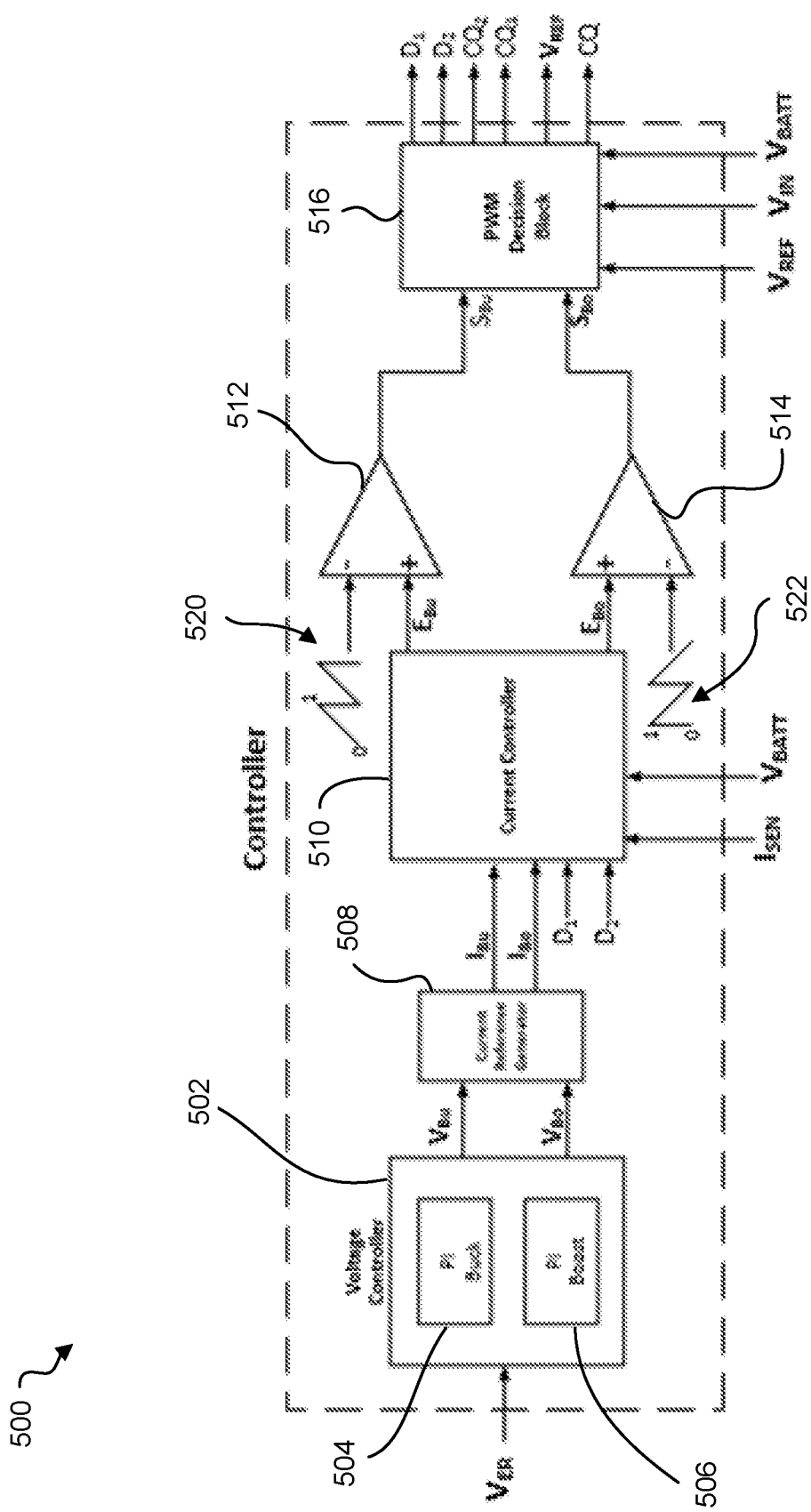
FIG. 5A is a simplified schematic drawing of a controller for the PFC converter of FIG. 2, in accordance with the teachings herein.

Referring now to FIG. 5A, there is shown an example embodiment of a controller 500. The controller 500 is analogous to the controller 210 of FIG. 2. The controller 500 includes a voltage controller 502, a current reference generator 508, a current controller 510, a buck comparator unit 512, a boost comparator unit 514, and a PWM decision block 516.

In this example, the voltage controller 502 includes two proportional-integral (PI) blocks: a PI buck block 504, and PI boost block 506. Each PI block receives the error voltage V$_{ER}$ as an input, and generates a respective buck error voltage V$_{BU}$ and a respective boost error voltage V$_{BO}$ as an output.

The voltage errors V$_{BO}$ and V$_{BU}$ are subsequently received by the current reference generator 508. The current reference generator 508 is responsible for generating a buck reference current signal I$_{BU}$, and a boost reference current signal I$_{BO}$, respectively.

The reference currents I$_{BU}$ and I$_{BO}$ are then passed to the current controller 510, along with the sensed input current I$_{SEN}$. The current controller 510 uses these inputs to generate either a buck error signal E$_{BU}$ and/or a boost error signal E$_{BO}$.

Figure 5B:
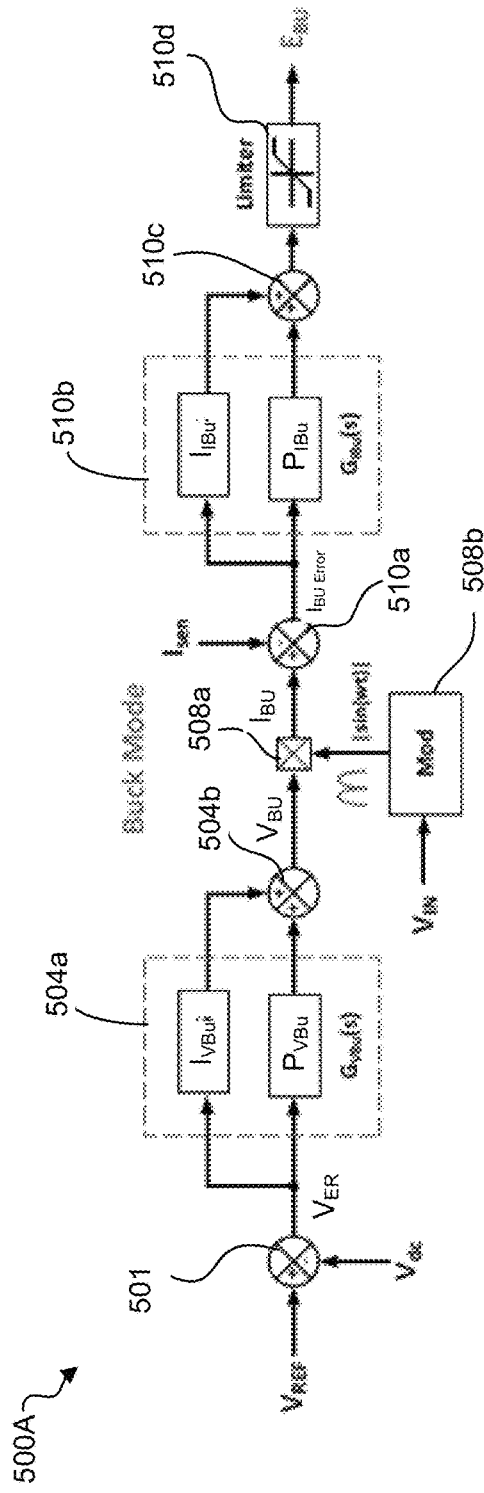
FIG. 5B is a simplified schematic drawing of the controller of FIG. 5A for a buck mode of operation.
Figure 5C:
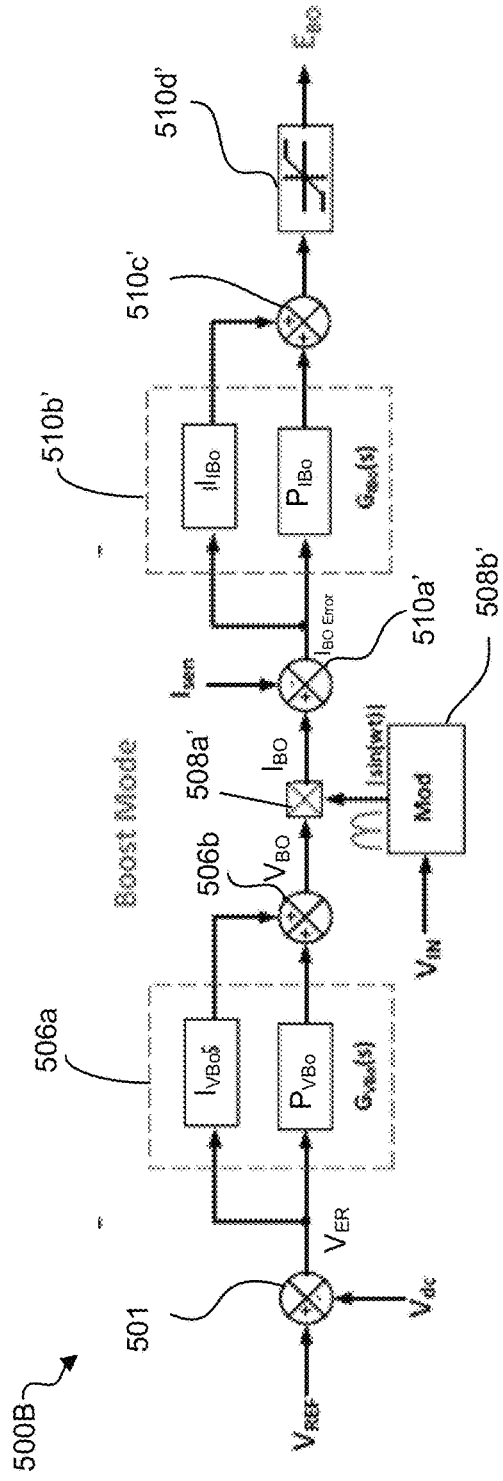
FIG. 5C is a simplified schematic drawing of the controller of FIG. 5A for a boost mode of operation.

Referring now to both FIGS. 5B and 5C, with continued reference to FIG. 5A, there is shown in more detail the separate controller for the buck mode of operation 500A, and the separate controller for the boost mode of operation 500B.

As shown, each of the controllers 500A and 500B receives as an input the error voltage V$_{ER}$, which is generated at 501 by taking the difference between the reference voltage V$_{REF}$ and the output DC link voltage V$_{DC}$.

The error voltage V$_{ER}$ is passed as an input to the proportional integrator (PI) buck block 504a, 504b and the PI boost block 506a, 506b, which together form the voltage controller 502.

At the PI buck block 504a, 504b the voltage error V$_{ER}$ is multiplied by a fixed gain factor G$_{VBu}$(s), which represents the sum at 504b between the proportional gain (P$_{VBu}$) and the integral gain (I$_{VBu}$). In at least some embodiments, the gain factor G$_{VBu}$(s) is expressed as a second order transfer function as shown in Equation (7):

$$G_{VBu}(s) = K\frac{s+B}{s(s+C)} \tag{7}$$

where "K", "B" and "C" are constants, and "s" is a complex variable. In at least some example cases, K=73.6, B=217.8, and C=1000. The PI buck block 504a, 504b will accordingly generate the buck voltage error signal V$_{BU}$.

Similarly, at the PI boost block 506a, 506b the voltage error $V_{ER}$ is multiplied by a fixed gain factor $G_{VBo}(s)$, which represents the sum at 506b between the proportional gain ($P_{VBu}$) and the integral gain ($I_{VBo}$). In at least some embodiments, the gain factor $G_{VBo}(s)$ is expressed as a first order transfer function as shown in Equation (8):

$$G_{VBo}(s) = K_1 \frac{s+A}{s} \tag{8}$$

where "$K_1$", and "A" constants, and "s" is a complex variable. In at least some example cases, $K_1$=0.00818, A=502.6. The PI boost block 506a, 506b will accordingly generate the boost voltage error signal $V_{BO}$.

The voltage error signals $V_{BU}$, $V_{BO}$ are sent to the reference current generator 508. In the controller for the buck mode of operation 500A, the reference current generator 508 multiplies the voltage error signal $V_{BU}$ at 508a with a full-wave rectified sinusoidal waveform to generate the buck reference current $I_{BU}$. Similarly, in the controller for the boost mode of operation 500B, the reference current generator 508 multiplies the voltage error signal $V_{BO}$ at 508a' with a full-wave rectified sinusoidal waveform to generate the boost reference current $I_{BO}$. In various embodiments, the sinusoidal waveforms, in each of the controllers for the buck and boost mode of operation, is derived from the input voltage waveform $V_{IN}$. For example, the input voltage $V_{IN}$ may be sensed by a voltage sensor located proximate the voltage source 202 of FIG. 2. The full-wave rectified sinusoidal voltage waveform may then be generated by passing the sensed input voltage $V_{IN}$ through modulator blocks 508b and 508b' for the buck and boost mode of operation, respectively. The modulator blocks 508b and 508b' may be configured to convert the negative component of the input voltage $V_{IN}$ to a positive component in order to generate the full-wave rectified sinusoidal waveform. In at least some embodiments, the modulator blocks 508b and 508b' may be a single unit configured to generate a single full-wave rectified sinusoidal waveform for both the buck mode of operation 500A and the boost mode of operation 500B.

The reference currents $I_{BU}$ and $I_{BO}$ are subsequently received by the current controller 510. In particular, in the controller for the buck mode of operation 500A, the current controller 510 comprises difference block 510a, and PI buck current blocks 510b and 510c. Similarly, in the controller for the boost mode of operation 500B, the current controller 510 comprises difference block 510a', and PI boost current blocks 510b' and 510c'. In each case, at difference blocks 510a and 510a', the sensed input current $I_{SEN}$ is subtracted from the respective reference currents $I_{BU}$ and $I_{BO}$ to generate the buck current error signal $I_{BU}$ Error and boost current error signal $I_{BO}$ Error, respectively. The current error signals are then passed through the separate respective PI boost and buck current blocks 510b, 510c and 510b', 510c', which are used to make the converter current $I_{SEN}$ follow the reference signals $I_{BU}$, $I_{BO}$ by driving the current error signals $I_{BU\ Error}$, $I_{BO\ Error}$ to zero.

More specifically, at the PI buck current blocks 510b and 510c, the buck current error signal ($I_{BU\ Error}$) is multiplied by a fixed gain factor $G_{IBu}(s)$, which represents the sum at 510c between the proportional gain ($P_{IBu}$) and the integral gain ($I_{IBu}$). In at least some embodiments, the gain factor $G_{IBu}(s)$ is expressed as a first order transfer function as shown in Equation (9):

$$G_{IBu}(s) = K_2 \left(1 + \frac{K_{I1}}{s}\right) \tag{9}$$

where "$K_2$" and "$K_1$" are constants, and "s" is a complex variable. In at least some example cases, $K_2$=0.33108 and $K_1$=12030.

Similarly, at the PI boost current block 510b' and 510c', the boost current error signal ($I_{BO\ Error}$) is multiplied by a fixed gain factor $G_{IBo}(s)$, which represents the sum at 510c' of the proportional gain ($P_{IBo}$) and the integral gain ($I_{IBo}$). In at least some embodiments, the gain factor $G_{IBo}(s)$ is expressed as a first order transfer function as shown in Equation (10):

$$G_{IBo}(s) = K_3 \left(1 + \frac{K_{I2}}{s}\right) \tag{10}$$

where "$K_3$", and "$K_{12}$" are constants, and "s" is a complex variable. In at least some example cases, $K_3$=2.314, and $K_{12}$=3220.

Accordingly, the PI boost and buck current blocks help to minimize the current error and ensure that the converter current (represented by $I_{SEN}$) follows the desired reference currents $I_{BU}$ and $I_{BO}$, respectively.

As further shown by FIGS. 5B and 5C, limiters 510d and 510d' are provided to compress the output signals of the PI buck current blocks 510b, 510c and PI boost current blocks 510b', 510c', and to generate the buck error signal $E_{BU}$, and boost error signal $E_{Bo}$, respectively. In particular, the limiters are generally used in the various embodiments described herein to limit the value of the signals that are provided as inputs to the limiters to avoid saturation. Further, and as described in further detail herein, the limiters 510d and 510d' may ensure that the output error signals $E_{BU}$, $E_{BO}$, of the current controller are within the limits for PWM generation using a modulating carrier signal.

Figure 6A:
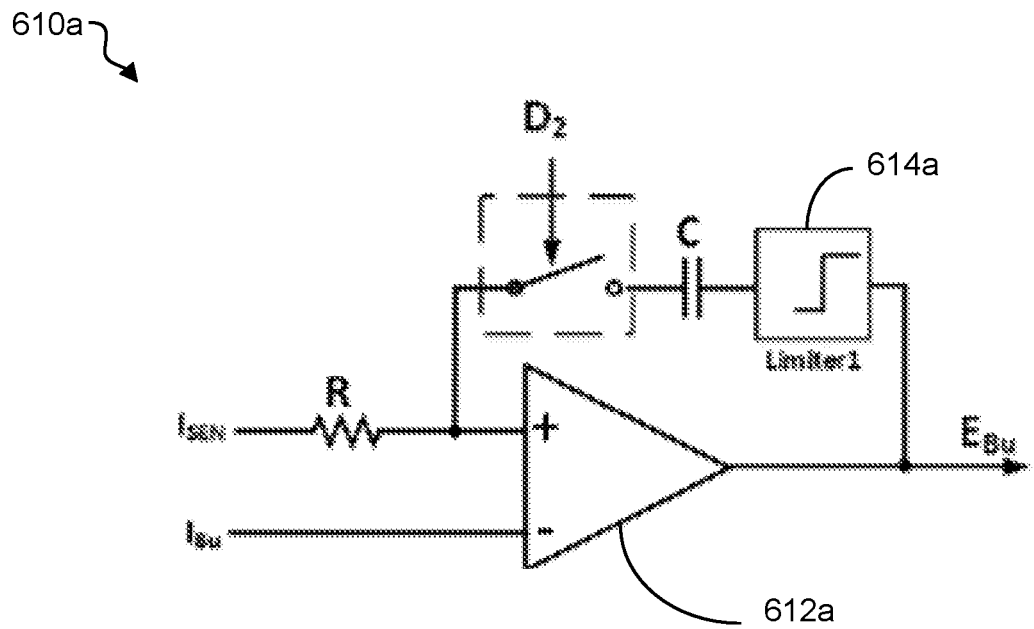
FIG. 6A is a circuit drawing of a buck current controller which can be used by the controller of FIG. 5A.
Figure 6B:
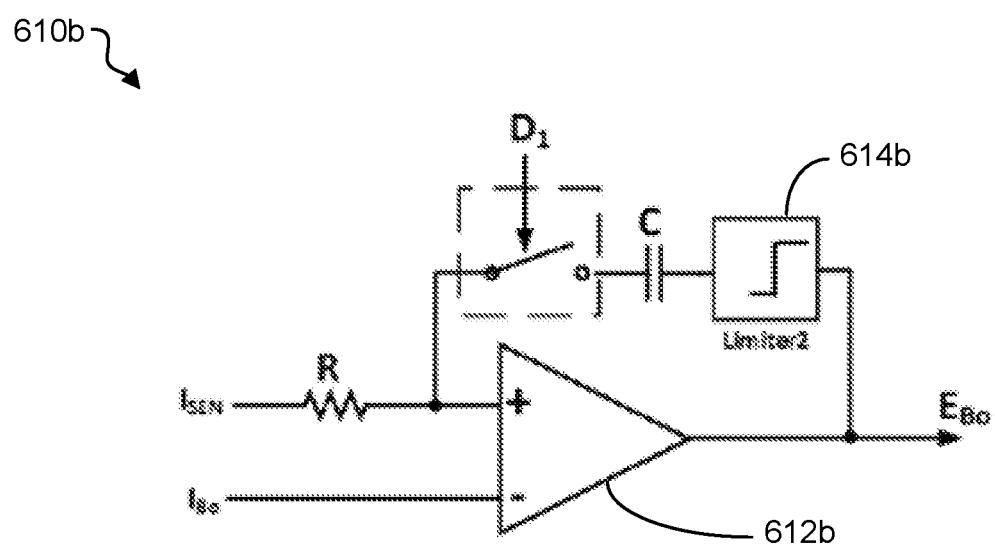
FIG. 6B is a circuit drawing of a boost current controller which can be used by the controller of FIG. 5A.

Referring now to both FIGS. 6A and 6B, there is shown an example circuit implementation of the integrator (I) blocks for the PI buck and boost current blocks 510b, 510b' of FIGS. 5B and 5C, respectively. In particular, FIG. 6A shows an integrator block 610a for the PI current block 510b of FIG. 5B, while FIG. 6B shows an integrator block 610b for the boost PI current block 510b' of FIG. 5C.

Each of the integrator blocks 610a, 610b includes an operational amplifier 612a, 612b for receiving the sensed current $I_{SEN}$, which is passed through resistor R, and the reference currents $I_{BU}$ or $I_{BU}$. The integrator blocks 610a, 610b also include capacitors C for implementing the integration functionality, and limiters 614a, 614b to avoid saturation at the output.

The switches D1 and D2 activate or de-activate the integrator blocks 610a, 610b depending on the mode of operation of the converter unit 206 of FIG. 2 (i.e. a buck or boost mode). In particular, the integrator blocks 610a, 610b are programmable such that they can reset based on the input voltage and reference voltage.

Figure 30:
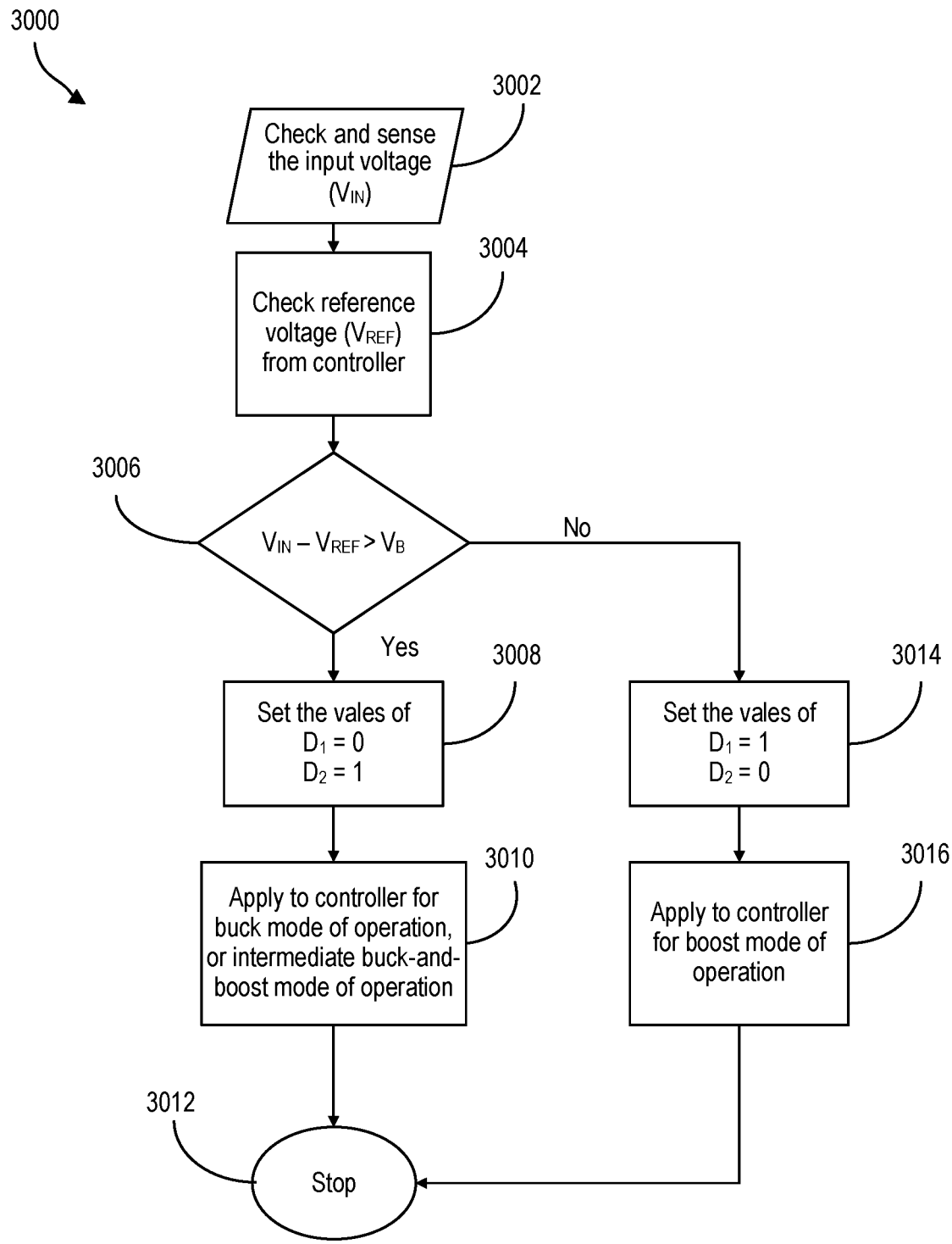
FIG. 30 is a process flow diagram showing an example process for controlling the operation of the buck and boost current controllers of FIGS. 6A and 6B, respectively.

Referring now to FIG. 30, there is shown an example process flow diagram for a process 3000 for controlling the switches D1 and D2. The process 3000 is implemented by the PWM decision block 516 of FIG. 5A.

At act 3002, the PWM decision block 516 senses the input voltage $V_{IN}$. At act 3004, the decision block 516 senses the reference voltage $V_{REF}$, which is also generated by the decision block 516 as discussed in further detail herein.

At act 3006, a determination is made as to whether the difference between the input voltage $V_{IN}$ and the reference voltage $V_{REF}$ is greater than the band voltage $V_B$. When this is the case, the converter unit 296 operates in either the buck mode or the intermediate buck-and-boost mode of operation. Accordingly, at act 3008, the decision block 516 generates a switch signal for $D_1$ which is set to 0 (i.e., de-activated), and a switch signal for $D_2$ which is set to 1 (i.e., activated) for the integrator blocks 610a, 610b, respectively.

At act 3010, the switch signals are applied to the switches D1 and D2. Accordingly, the buck integrator block 610a is activated, and the boost integrator block 610b is de-activated.

In particular, activating the buck integrator block 610a, at act 3010, enables both the buck, and the intermediate buck-and-boost mode of operation. As explained previously with reference to FIG. 4F, this is due to the overlap between the circuit topology for the buck, and the intermediate buck-and-boost modes of operations. In particular, the overlap in circuit topology allows for both modes to be controlled using only the buck integrator block 610a.

Alternatively, at act 3006, if the difference between the input voltage $V_{IN}$ and the reference voltage $V_{REF}$ is determined not to be greater than the band voltage $V_B$, then the converter unit 206 should operate in the boost mode of operation.

Accordingly, at act 3014, the decision block 516 generates a switch signal for D1 which is set to 1 (i.e., activated), and a switch signal for D2 which is set to 0 (i.e., de-activated) for the integrator blocks 610a, 610b, respectively.

At act 3016, the switch signals are applied to switches D1 and D2. Accordingly, the buck integrator block 610a is de-activated, and the boost integrator block 610b is activated.

Accordingly, and in view of the above, the process 3000 ensures that only one integrator block 610a, 610b is activated depending on the mode of operation. This avoids generating redundant error signals $E_{BU}$, $E_{BO}$, as well as for providing for smooth transitions between the buck and boost modes operation.

Referring now back to FIG. 5A, the buck and boost error signals $E_{BU}$, $E_{BO}$, are passed to a buck comparator unit 512 and a boost comparator unit 514, respectively.

At the buck comparator unit 512, the buck error signal $E_{BU}$ is compared to a trailing edge modulated signal 520 to generate a buck PWM signal $S_{BU}$. A trailing edge ramp signal generator (not shown) with a fixed amplitude range of 0 to 1 is used to generate the trailing edge modulated signal 520 as a carrier signal of a predetermined frequency to compare with the signal $E_{Bu}$ for the buck control logic. As explained in further detail herein, the predetermined frequency of the trailing edge modulated signal is based on the desired switching frequency, of the buck switch Q, between the ACTIVE mode (for the buck mode of operation), and the continuous ON state (for the boost, and the intermediate buck-and-boost modes of operation).

At the boost comparator unit 514, the boost error signal $E_{BO}$ is compared to a leading edge modulated signal 522 to generate a boost PWM signal $S_{BO}$. The leading edge modulated signal 522 is provided by a leading edge ramp signal generator (not shown) with a fixed amplitude range of 0 to 1. The leading edge modulated signal is used as a carrier signal of a predetermined frequency to compare with the signal $E_{Bo}$ for the boost control logic. As explained in further detail herein, the predetermined frequency of the leading edge modulated signal is based on the desired switching frequency, of the boost switches Q1 and Q2, between the ACTIVE mode (for the boost mode of operation), and the continuous OFF state (for the buck, and the intermediate buck and boost modes of operation).

Accordingly, a novel PWM scheme is generated which ping-pongs between the trailing-edge PWM signals for the buck mode, and the leading-edge PWM signals for the boost mode.

Figure 8A:
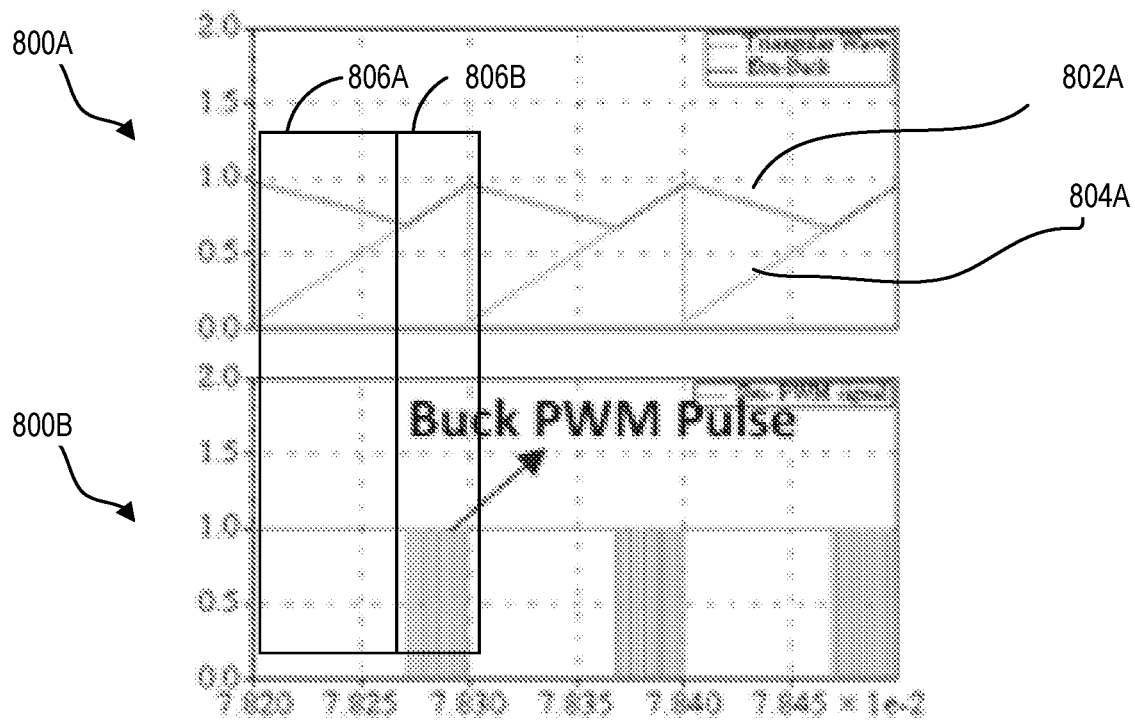
FIG. 8A shows plots of example input and output signals for a buck comparator unit which can be used by the controller of FIG. 5A.
Figure 8B:
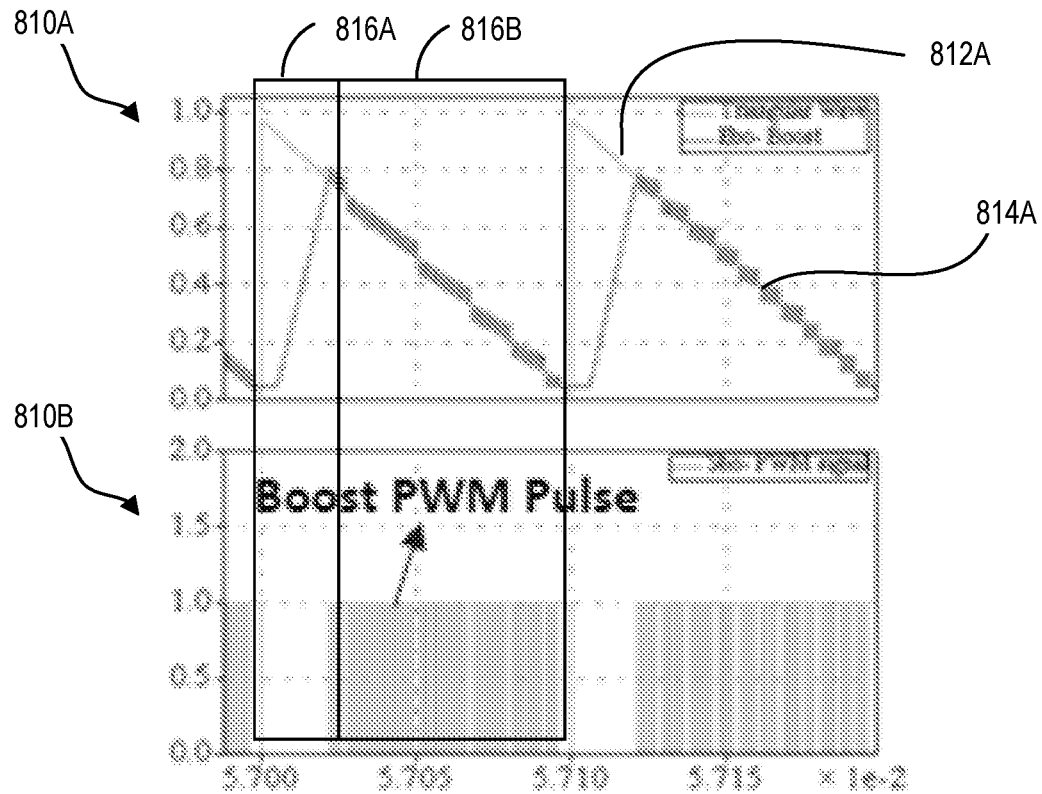
FIG. 8B shows plots of example input and output signals for a boost comparator unit which can be used by the controller of FIG. 5A.

Referring now briefly to FIGS. 8A and 8B, plots are shown of the input and output signals for the buck comparator unit 512, and the boost comparator unit 514, respectively.

In particular, FIG. 8A shows a plot 800A of the inputs to the buck comparator unit 512, namely, the buck error signal ($E_{BU}$) 802A, and the trailing edge ramp modulated signal 804A. Plot 800B shows the output buck PWM signal $S_{BU}$ of the buck comparator unit 512.

More specifically, plot 800A shows the buck error signal ($E_{BU}$) 802A as a clamped ramp signal which sinusoidally varies with time and has a small peak to peak value. The clamping results from the de-activation of the buck current integrator block 610A, in FIG. 6, at the end of the buck mode of operation. The small peak to peak value may result from the limiter 510d of controller 210 in FIG. 5B. The buck error signal ($E_{BU}$) 802A has a constant clamped upper limit of less than one, and a variable lower limit. The lower limit varies according to the difference between (a) the peak of the rectified input voltage ($V'_{IN}$), and (b) the reference voltage ($V_{REF}$) (i.e., assuming the reference voltage is below the peak of the rectified input voltage for a buck mode of operation, as in FIG. 3B). As the difference between the input voltage and reference voltage increases, the extent of the lower limit also increases. When the buck mode of operation is initiated, the buck error signal ($E_{BU}$) begins at the upper limit, and varies therefrom.

Turning now to plot 800B, when comparing the buck error signal ($E_{BU}$) 802A to the trailing edge ramp 804A, an active high PWM signal is generated when the trailing edge ramp 804A is lower than the lower limit of the buck error signal ($E_{BU}$) (i.e., see region 806A). In this case, the active high PWM signal results in the buck switch Q being turned ON continuously. As explained above, the buck switch Q is in the continuous ON state during the boost, and the intermediate buck-and-boost mode of operation. Conversely, when the trailing edge ramp 804A is greater than the lower limit of the buck error signal (i.e., region 806B), the resultant buck PWM signal will dynamically vary between the high and low modes. This results in the buck switch Q being controlled in the ACTIVE mode, whereby the buck switch Q alternates between the ON state and the OFF state. As discussed above, the buck switch Q is in the ACTIVE mode when the converter unit 206 is in the buck mode of operation.

Accordingly, by changing the frequency of the trailing edge ramp modulated signal 804A, the switching frequency of the buck switch Q between the ACTIVE mode (for the buck mode of operation), and the continuous ON mode (for the boost, and the intermediate buck-and-boost modes of operation) may also be varied.

Similarly, FIG. 8B shows a plot 810A of the inputs to the boost comparator unit 514, namely, the boost error signal ($E_{BO}$) 812A, and the leading edge ramp modulated signal 814A. Plot 810B shows the output boost PWM signal $S_{BO}$ from the boost comparator unit 514.

In particular, plot 810A shows the boost error signal ($E_{BO}$) 812A as a clipped ramp signal which sinusoidally varies with time and has a small peak to peak value. The clipping results from the de-activation of the boost current integrator block 610B, in FIG. 6, at the end of the boost mode of operation. The small peak to peak value may result from the limiter 510d' of controller 210 in FIG. 5C. The boost error signal ($E_{BO}$) 812A has a constant clipped lower limit of above zero, and a variable upper limit. The variable upper limit varies according to the difference between (a) the reference voltage ($V_{REF}$) and (b) the zero point voltage. As the difference between the reference voltage ($V_{REF}$) and the zero point voltage increases, the extent of the upper limit also increases. When the boost mode of operation is initiated, the boost error signal ($E_{BO}$) begins at the lower limit, and varies therefrom.

Turning now to plot 810B, when comparing the boost error signal ($E_{BO}$) 812A to the leading edge ramp 814A, a low PWM signal is generated when the leading edge ramp 814A is greater than the boost error signal ($E_{BO}$) (i.e., see region 816A). In this case, the low PWM signal results in the boost switches Q1, Q2, of converter unit 206, being turned OFF continuously. As explained above, the boost switches Q1, Q2 are turned OFF continuously in the buck mode of operation, or in the intermediate buck-and-boost mode. When the leading edge ramp 814A follows the boost error signal (i.e., region 816B), the boost PWM signal varies between high and low modes. This results in the boost switches Q1, Q2 being operated in the ACTIVE mode, wherein the switches are dynamically varied between the ON and OFF states. The boost switches Q1, Q2 are in the ACTIVE mode during the boost mode of operation.

Accordingly, by changing the frequency of the leading edge ramp modulated signal 812A, the switching frequency of the boost switches Q1 and Q2 between the ACTIVE mode (for the boost mode of operation), and the continuous OFF mode (for the buck, and the intermediate buck-and-boost modes of operation) may also be varied.

Returning now back to FIG. 5A, the PWM decision block 516 receives as an input both the PWM signal $S_{BU}$ or $S_{BO}$, as well as the input voltage $V_{IN}$, and the battery voltage $V_{BATT}$.

The PWM decision block 516 in-turn generates: (1) the signals for controlling the switches D1 and D2 for the current controller 510, as explained above; (2) the control PWM signals CQ, CQ1 and CQ2 for controlling the buck and boost switches (Q, Q1, and Q2) of the converter unit 206 of FIG. 2; and (3) the reference voltage $V_{REF}$, as well as the upper reference threshold $V_{UT}$, and the lower reference threshold $V_{LT}$, as also explained above.

Figure 7:
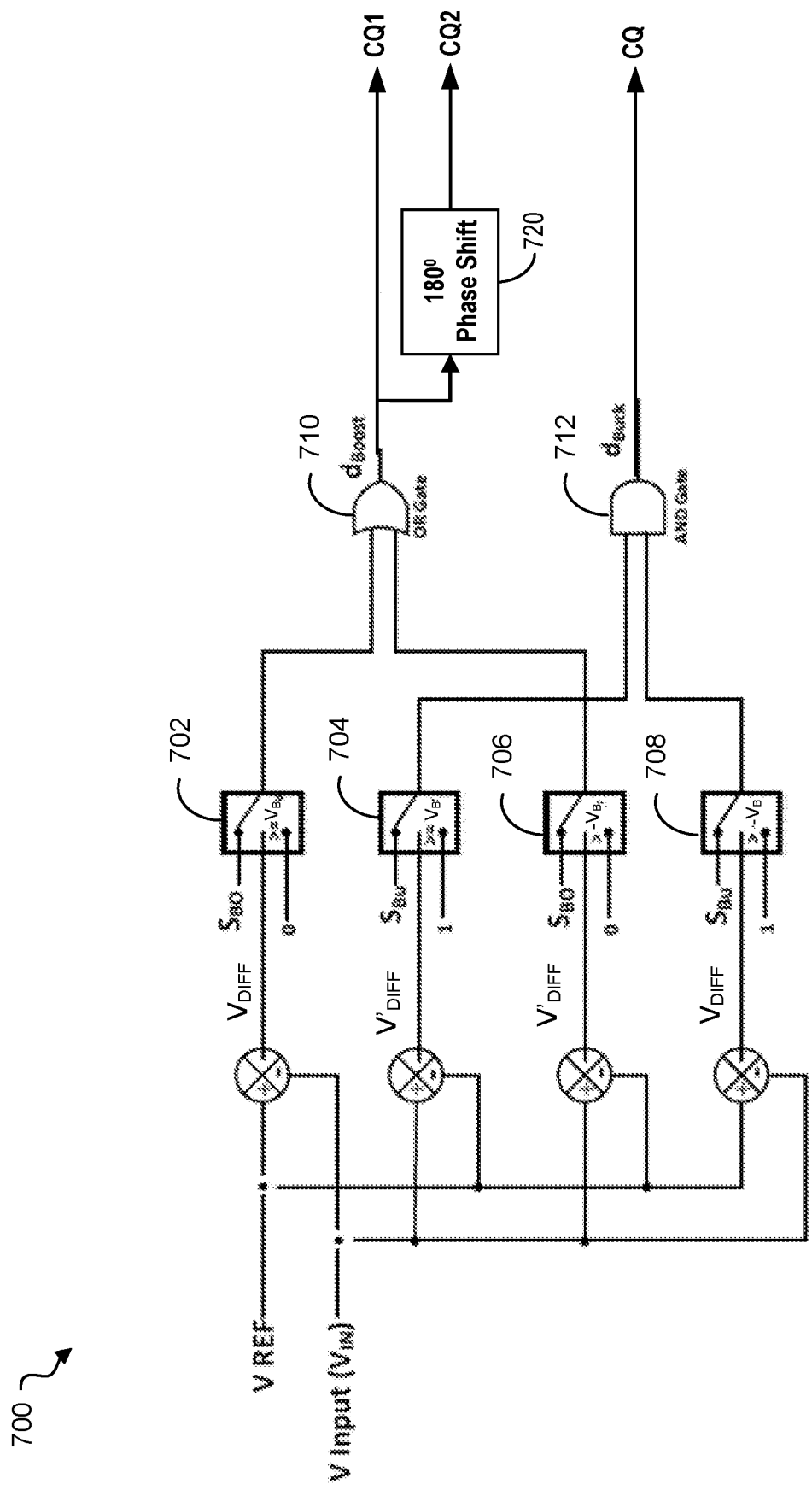
FIG. 7 is a simplified schematic drawing of a switch logic circuit which can be used by the controller of FIG. 5A.

Referring now first to FIG. 7, there is shown a simplified block diagram of a switch logic circuit 700. The switch logic circuit 700 is used by the decision block 516 to generate the PWM control signals CQ, CQ1 and CQ2 which control the switches Q, Q1, and Q2, respectively. By extension, the logic circuit 700 is also used by the decision block 516 to determine the duration of time the control signals CQ, CQ1, and CQ2 are applied to control the switches Q, Q1, and Q2, respectively.

More particularly, the switch logic circuit 700 implements the variable mode of operation scheme discussed with respect to FIG. 3B. The switch logic circuit 700 generally includes switch blocks 702, 704, 706, and 708.

The first switch block 702 receives the voltage difference $V_{DIFF}$ between the reference voltage $V_{REF}$ and input voltage $V_{IN}$ as an input. If $V_{DIFF}$ is greater than, or equal to, the band voltage $V_B$, the switch block 702 generates the boost PWM signal $S_{BO}$ as an output, otherwise a value of zero is generated.

The second switch block 704 receives the difference between the input voltage $V_{IN}$ and the reference voltage $V_{REF}$ (expressed as $V'_{DIFF}$) as an input. If $V'_{DIFF}$ is greater than, or equal to, the band voltage $V_B$, the switch block 704 generates the buck PWM signal $S_{BU}$ as an output, otherwise a value of one is generated.

The third switch block 706 receives the voltage difference $V'_{DIFF}$ as an input. If $V'_{DIFF}$ is greater than the negative of the band voltage $V_B$, the switch block 706 generates the boost PWM signal $S_{BO}$ as an output, otherwise a value of zero is generated.

Finally, the fourth switch block 708 receives the voltage difference $V_{DIFF}$ as an input. If $V_{DIFF}$ is greater than the negative of the band voltage $V_B$, the switch block 708 generates the buck PWM signal $S_{BU}$ as an output, otherwise a value of one is generated.

The outputs of the first switch block 702 and the third switch block 706 are passed through a logic OR gate 710 to generate the PWM boost pulse $d_{boost}$, which acts as the control signal CQ1 for controlling the boost switch Q1. The $d_{boost}$ signal is phase-shifted by 180 degrees at the phase-shifting block 720 to generate the control signal CQ2 which controls the boost switch Q2. The output DC link voltage $V_{DC}$ resulting from the PWM boost pulse $d_{boost}$ may be expressed by Equation (11):

$$V_{DC} = V_{IN} \times \frac{1}{1 - d_{Boost}} \quad (11)$$

The outputs of the second switch block 704 and the fourth switch block 708 are passed through a logic AND gate 712 to generate the PWM pulse $d_{buck}$ which acts as the control signal CQ. The PWM buck pulse $d_{buck}$ controls the operation of the buck switch Q. The output DC link voltage $V_{DC}$ resulting from the PWM buck pulse $d_{boost}$ may be expressed by Equation (12):

$$V_{DC} = V_{IN} \times d_{Buck} \quad (12)$$

The overall gain of the converter unit 206 may be accordingly expressed by Equation (11):

$$V_{DC} = V_{IN} \times \frac{d_{Buck}}{1 - d_{Boost}} \quad (13)$$

Table 1 below provides example output $d_{boost}$ and $d_{buck}$ signals for the logic circuit 700 and in respect of various input voltages $V_{IN}$ where the voltage reference ($V_{REF}$) is set at 250 V and the band voltage $V_B$ is set at 5 V.

TABLE 1

Example outputs of logic circuit 700 of FIG. 7

| | $V_{Input}$ | $V_{REF}$ | $V_{REF} - V_{Input}$ | $d_{Boost}$ | $d_{Buck}$ |
|---|---|---|---|---|---|
| Scenario 1 | 100 V | 250 V | 150 V | $S_{BO}$ | 1 |
| Scenario 2 | 245 V | 250 V | 5 V | $S_{BO}$ | $S_{BU}$ |
| Scenario 3 | 300 V | 250 V | −50 V | 0 | $S_{BU}$ |
| Scenario 4 | 255 V | 250 V | −5 V | $S_{BO}$ | $S_{BU}$ |
| Scenario 5 | 100 V | 250 V | 150 V | $S_{BO}$ | 1 |

As shown in Table 1, in scenarios 1 and 5, the input voltage is less than the lower reference voltage (e.g., see Equation (2), above). Accordingly, the logic circuit 700 of FIG. 7 generates the boost PWM signal ($d_{boost}$) corresponding to $S_{BO}$, and a high $d_{Buck}$ signal (i.e., value of one). This results in the converter unit 206 operating in the boost mode of operation wherein the boost switches Q1, Q2 are varied according to the boost PWM signal $S_{BO}$ (i.e., operating the boost switches in the ACTIVE mode), while the buck switch Q operates in the continuous ON state.

In scenarios 2 and 4, the input voltage is equal to, or otherwise within, the upper and lower reference thresholds. Accordingly, the logic circuit 700 of FIG. 7 generates both the boost PWM signal $S_{BO}$ and the buck PWM signal $S_{BU}$, and the converter unit 206 operates in the intermediate buck and boost mode. In particular, in this case, the boost PWM signal $S_{BO}$ will be substantially zero (i.e., operating the boost switches in the continuous OFF state), and the buck PWM signal $S_{BU}$ will be substantially one (i.e., operating the buck switch in the continuous ON state). This achieves the intermediate buck-and-boost configuration.

In scenario 3, the input voltage is greater than the upper reference threshold (e.g., see Equation (1), above). Accordingly, the logic circuit 700 of FIG. 7 generates a buck PWM signal ($d_{Buck}$) corresponding to $S_{BU}$, and a low $d_{Boost}$ signal (i.e., value of zero). This results in the converter unit 206 operating in the buck mode of operation wherein the buck switch Q is varied according to the buck PWM signal $S_{BU}$ (i.e., operating the buck switch in the ACTIVE mode), and the boost switches Q1, Q2 operate in the continuous OFF state.

As explained previously, the PWM decision block 516 of FIG. 5A also generates the output voltage reference $V_{REF}$.

Figure 31A:
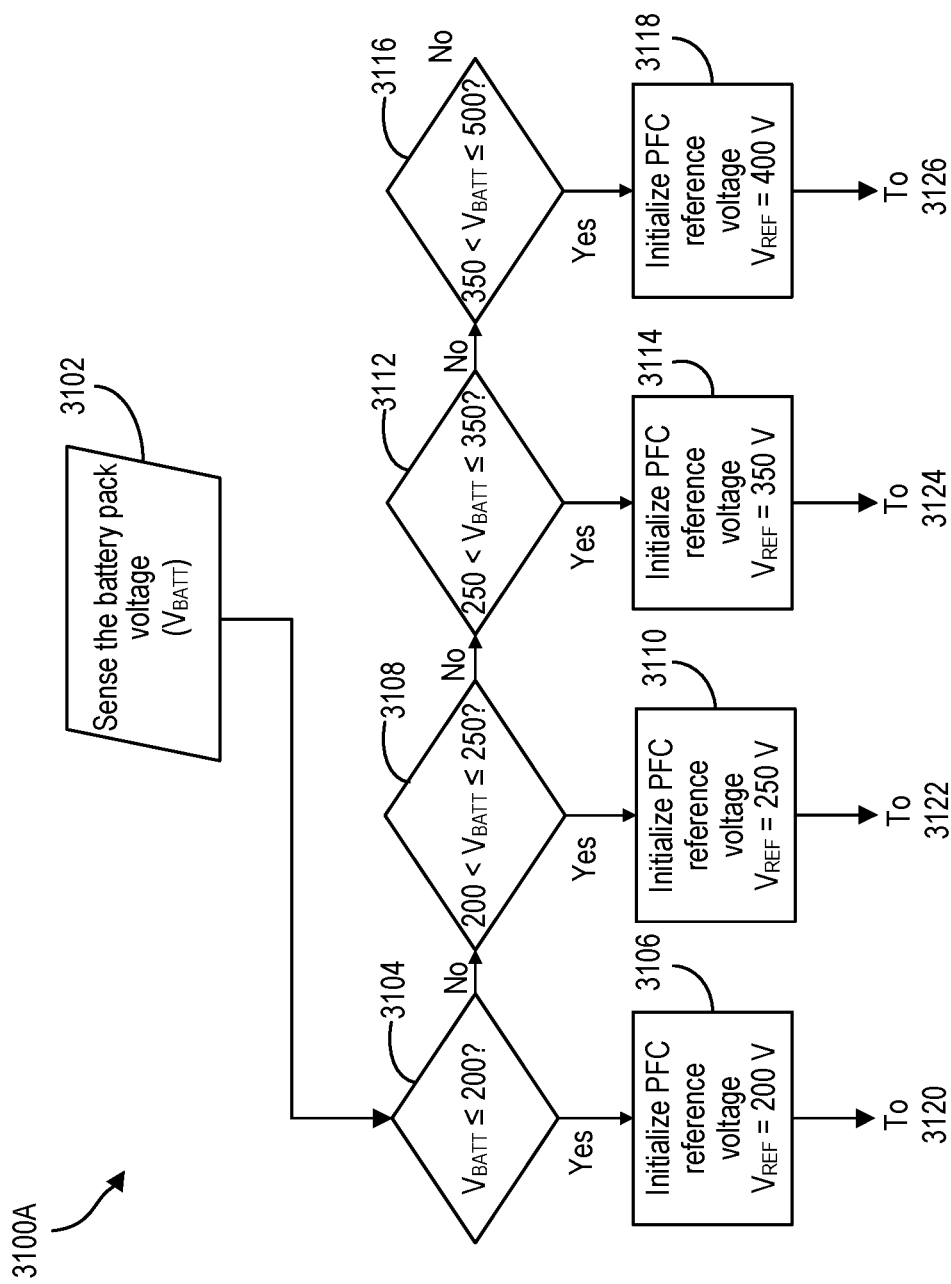
FIG. 31A is a process flow diagram showing an example process for determining a reference output voltage from a battery voltage.
Figure 31B:
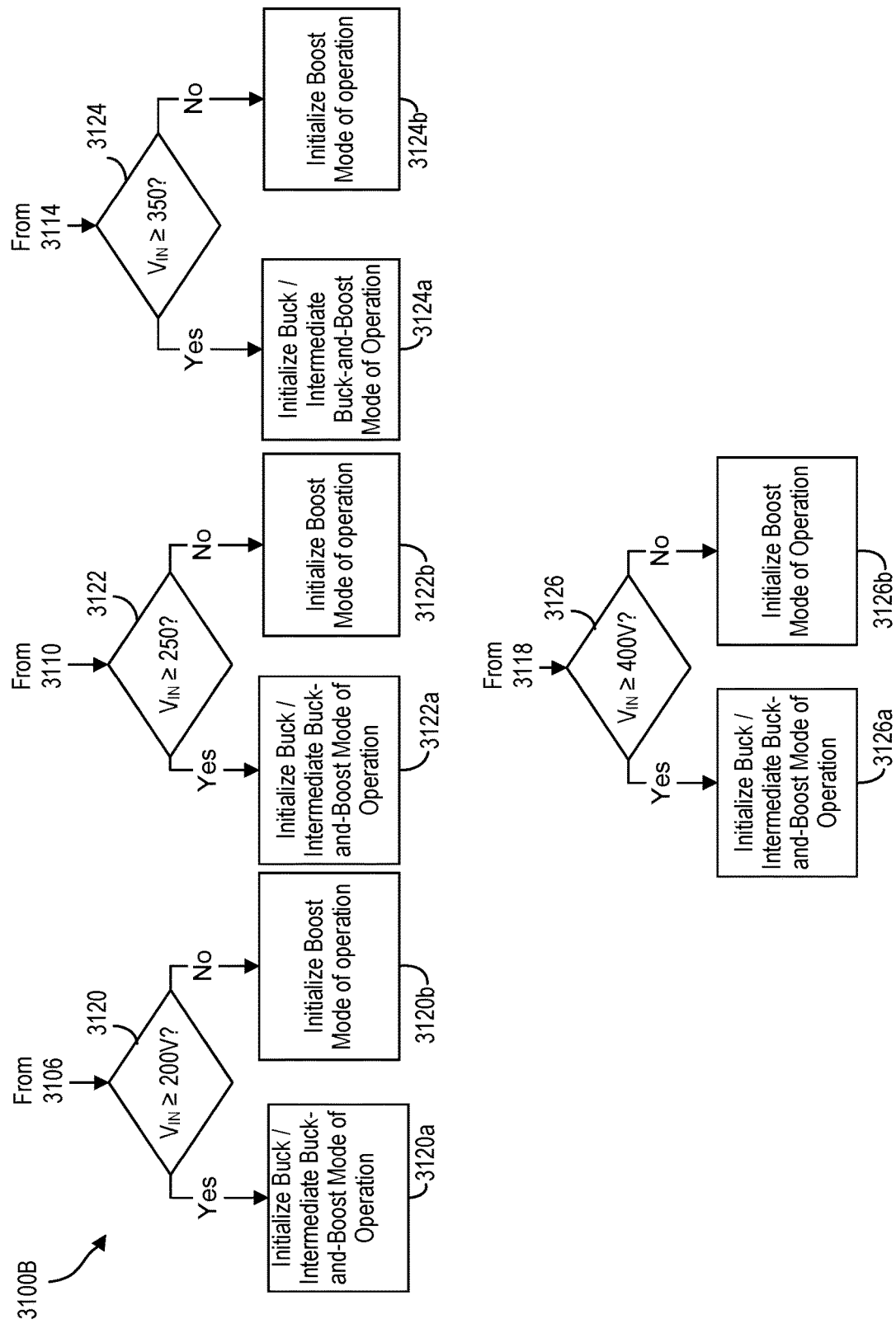
FIG. 31B is a continuation of the process flow diagram of FIG. 31A, and showing the mode of operation of the PFC converter of FIG. 2 for various input voltages.

Referring now to both FIGS. 31A and 31B, there is illustrated an example embodiment of a process flow for a process 3100A for determining the reference voltage $V_{REF}$ based on the battery voltage $V_{BATT}$ of the battery 110 of FIG. 1, as well as a process 3100B for determining the mode of operation of the converter unit 206 based on the reference voltage and the input voltage. The processes 3100A and 3100B are implemented by the PWM decision block 516 of FIG. 5A.

At act 3102, a voltage sensor may be used to sense the battery voltage $V_{BATT}$. For example, at act 3104, a determination is made as to whether the battery voltage $V_{BATT}$ is less than or equal to 200 volts. If this is the case, at act 3106, the reference voltage $V_{REF}$ is initialized to be about 200 Volts. In various cases, the reference voltage $V_{REF}$ can be initialized (e.g., determined) from the battery voltage $V_{BATT}$ according to Equation (14):

$$V_{BATT} = V_{REF} \times \left(\frac{N_s}{N_p}\right) \times d_{DC\text{-}DC} \quad (14)$$

wherein $V_{BATT}$ is the sensed battery voltage, $V_{REF}$ is the PFC reference output voltage, $N_S$ is the number of secondary turns in the high-frequency transformer in the DC-DC converter stage 120 of FIG. 1, $N_p$ is the number of primary turns in the transformer in the DC-DC converter stage 120, $d_{DC\text{-}DC}$ is the duty ratio of the DC-DC converter stage 120. In particular, where the reference voltage $V_{REF}$ is initialized to be about 200 Volts, then at act 3120 it is determined whether the input voltage is greater than 200 Volts. If the input voltage is greater than or equal to 200 Volts, the PWM decision block 516 initializes the buck mode or the intermediate buck-and-boost mode of operation at act 3120a. If the input voltage is not greater than or equal to 200 Volts, the PWM decision block 516 initializes the boost of operation at act 3120b. Since the ratio of turns for the transformer are fixed, the value of the reference voltage $V_{REF}$ can be determined by varying the $d_{DC\text{-}DC}$ to its maximum value (e.g. $d_{DC\text{-}DC}$=0.6 or 0.65). Alternatively, equation (14) may be used to determine the duty ratio $d_{DC\text{-}DC}$ of DC-DC converter by selecting a value for the reference voltage $V_{REF}$ based on the battery voltage or battery pack voltage (as the case may be) and the duty ratio $d_{DC\text{-}DC}$ may be varied up to its maximum value.

If at act 3104, the battery voltage $V_{BATT}$ is determined not to be between 200 volts and 250 volts, then at act 3108 it is determined whether the battery voltage $V_{BATT}$ is between about 200 volts and 250 volts. If this is the case, at act 3110 the reference voltage $V_{REF}$ is initialized at about 250 volts. Where the reference voltage $V_{REF}$ is initialized at about 250 Volts, then at act 3122 it is then determined whether the input voltage is greater than or equal to 250 Volts. If the input voltage is greater than or equal to 250 Volts, the PWM decision block 516 initializes the buck mode or the intermediate buck-and-boost mode of operation at act 3122a. If the input voltage is not greater than or equal to 250 Volts, the PWM decision block 516 initializes the boost mode of operation at act 3122b.

If at act 3108, the battery voltage $V_{BATT}$ is determined not to be between 200 volts and 250 volts, then at act 3112, it is determined whether the battery voltage $V_{BATT}$ is between about 250 volts and 350 volts. If this is the case, at act 3114 the reference voltage $V_{REF}$ is initialized at about 350 volts. Where the reference voltage $V_{REF}$ is initialized at about 350 volts, then at act 3124 it is then determined whether the input voltage is greater than or equal to 350 volts. If the input voltage is greater than or equal to 350 volts, the PWM decision block 516 initializes the buck mode or the intermediate buck-and-boost mode of operation at act 3124a. If the input voltage is not greater than or equal to 350 volts, the PWM decision block 516 initializes the boost mode of operation at act 3124b.

If at act 3112, the battery voltage $V_{BATT}$ is determined not to be between 250 volts and 350 volts, then at act 3116 it is determined whether the battery voltage $V_{BATT}$ is between 350 volts and 500 volts. If this is the case, at act 3118 the reference voltage $V_{REF}$ is initialized at about 400 volts. Where the reference voltage $V_{REF}$ is initialized at about 400 volts, then at act 3126 it is then determined whether the input voltage is greater than or equal to 400 volts. If the input voltage is greater than or equal to 400 volts, the PWM decision block 516 initializes the buck mode or the intermediate buck-and-boost mode of operation at act 3126a. If the input voltage is not greater than or equal to 400 volts, the PWM decision block 516 initializes the boost mode of operation at act 3126b.

Accordingly, the reference voltage $V_{REF}$ (i.e., the desired output DC-link voltage $V_{DC}$) is varied to accommodate different battery voltage requirements. As stated previously, this is in contrast to prior PFC converters which only generate a fixed output DC-link voltage higher than the peak input voltage.

With reference now to FIGS. 9A to 14, results generated by the PFC converter stage 115 in FIG. 1 and/or PFC converter stage 200 in FIG. 2, will now herein be described.

Figure 9A:
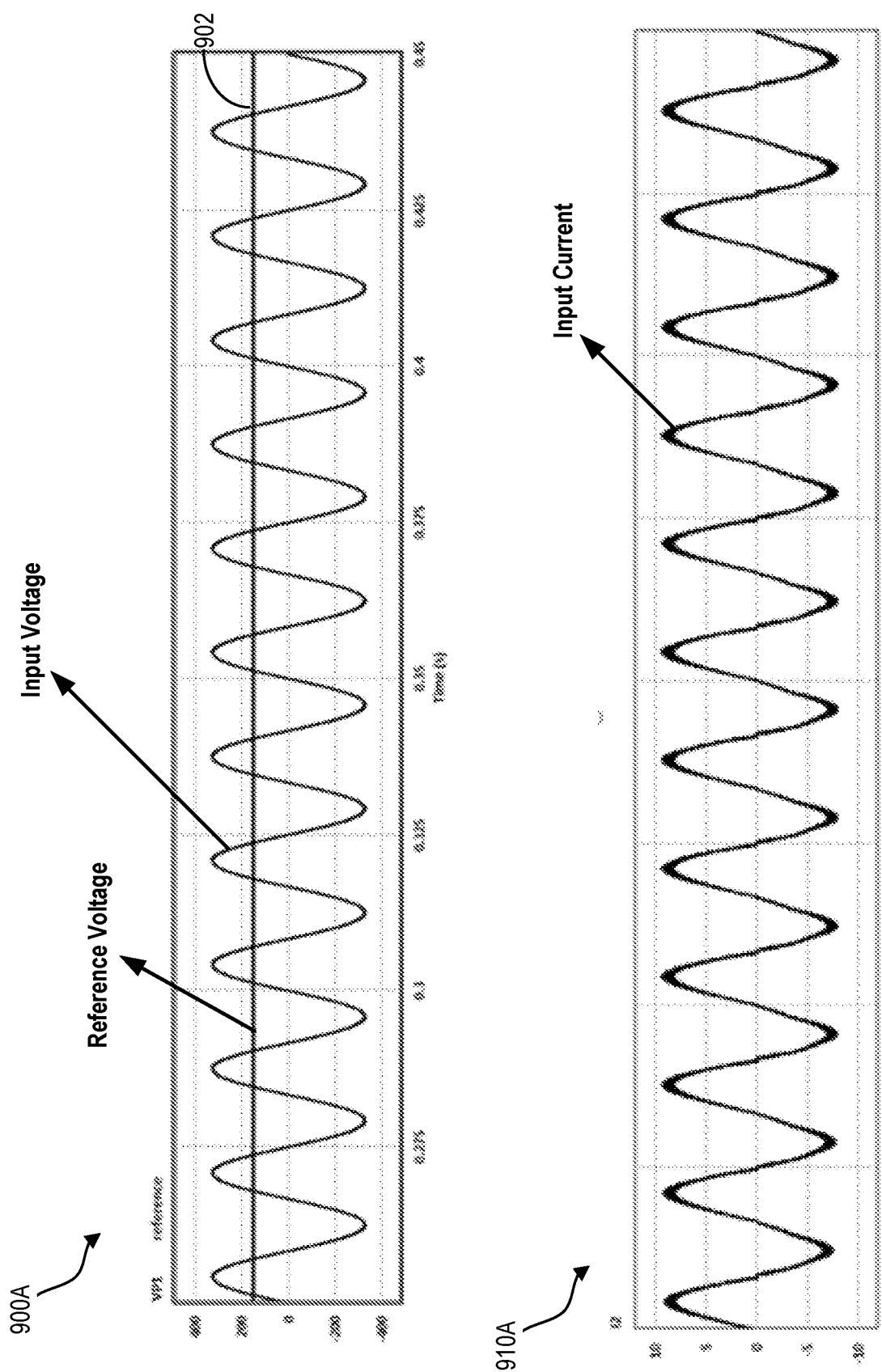
FIG. 9A shows plots of example input voltage and current signals for the PFC converter of FIG. 2.

Referring now first to FIG. 9A, there is shown a voltage plot 900A of an example input voltage waveform ($V_{IN}$) for the PFC converter 115. FIG. 9A also shows a current plot 910A of an example input current waveform for the PFC converter 115. In particular, the voltage plot 900A shows the reference voltage 902 being set at substantially about 150 volts, or otherwise below the peak input voltage. In this example, the PFC converter 115 dynamically changes between the boost mode, the buck mode, and the boost-buck mode, in accordance with the teachings herein, in order to generate the desired reference voltage $V_{REF}$.

Figure 9B:
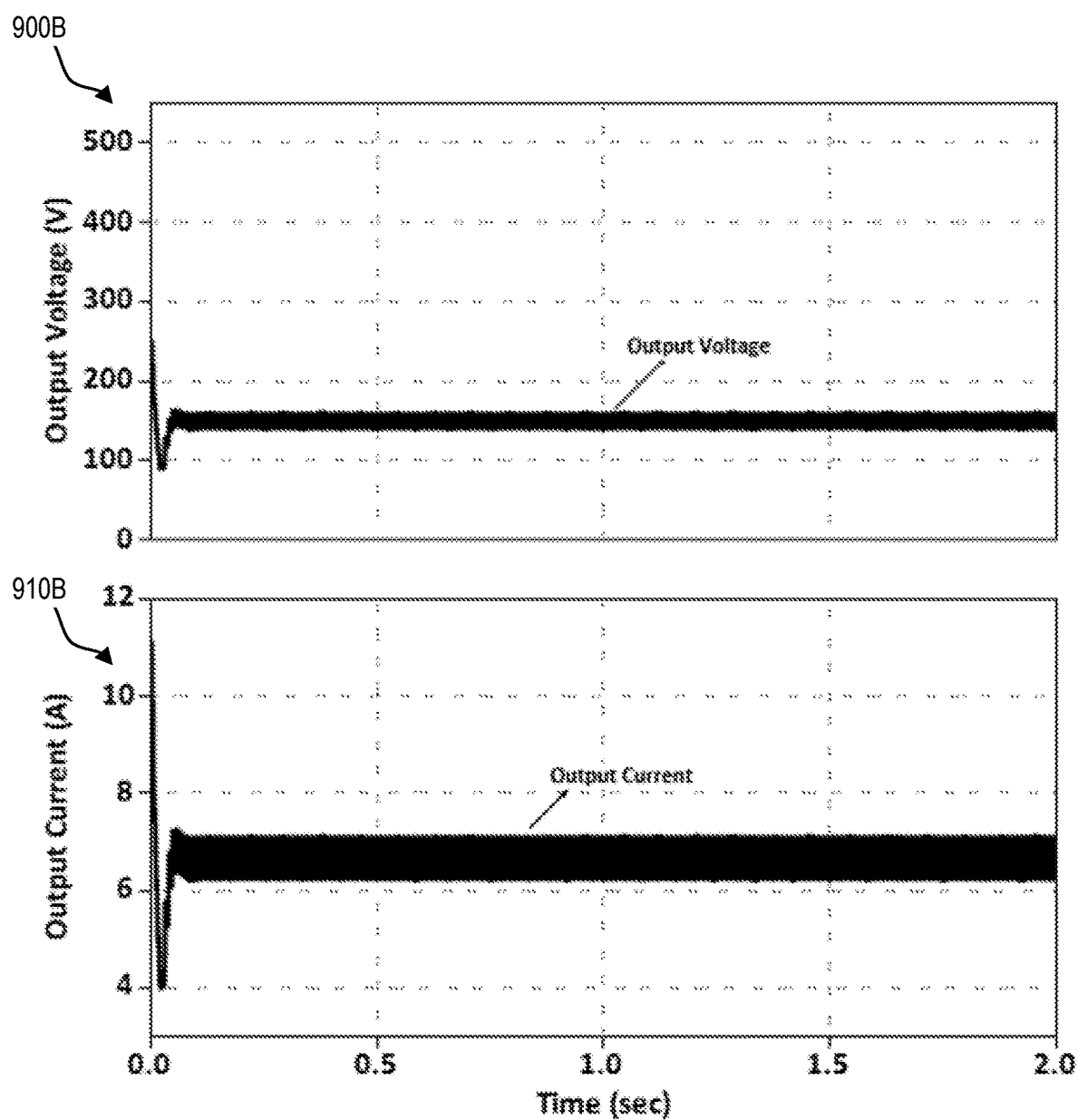
FIG. 9B shows plots of output voltage and current signals generated by the PFC converter of FIG. 2 as a result of the input voltage and current signals of FIG. 9A.

Referring now to FIG. 9B, there is shown a voltage plot 900B of the output voltage from the PFC converter 115 that corresponds to the input voltage and reference voltage of FIG. 9A. Also shown is a current plot 910B of the output current from the PFC converter 115. In particular, the voltage plot 900B shows the output voltage ($V_{DC}$) from the PFC converter 115 being at substantially about 150 volts.

Figure 10A:
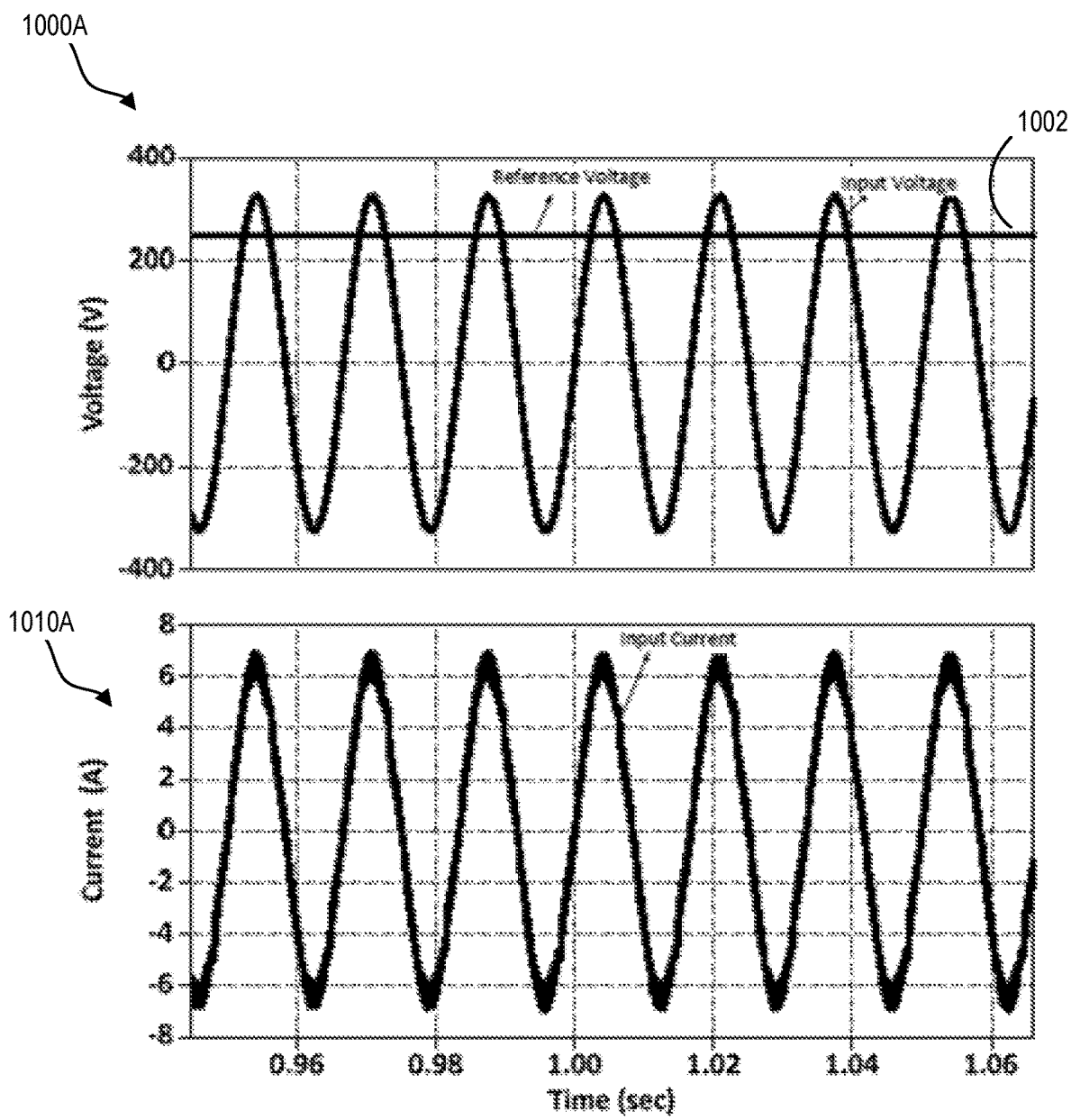
FIG. 10A shows plots of further example input voltage and current signals for the PFC converter of FIG. 2.

Referring now to FIG. 10A, there is shown a voltage plot 1000A of a further example input voltage waveform ($V_{IN}$) for the PFC converter 115. FIG. 10A also shows a current plot 1010A of an example input current waveform for the PFC converter 115. In particular, the voltage plot 1000A shows the reference voltage 1002 being set at substantially about 250 volts, or otherwise below the peak input voltage. In this example, again, the PFC converter 115 dynamically changes between the boost mode, the buck mode, and the boost-buck mode, in accordance with the teachings herein, in order to generate the desired reference voltage $V_{REF}$.

Figure 10B:
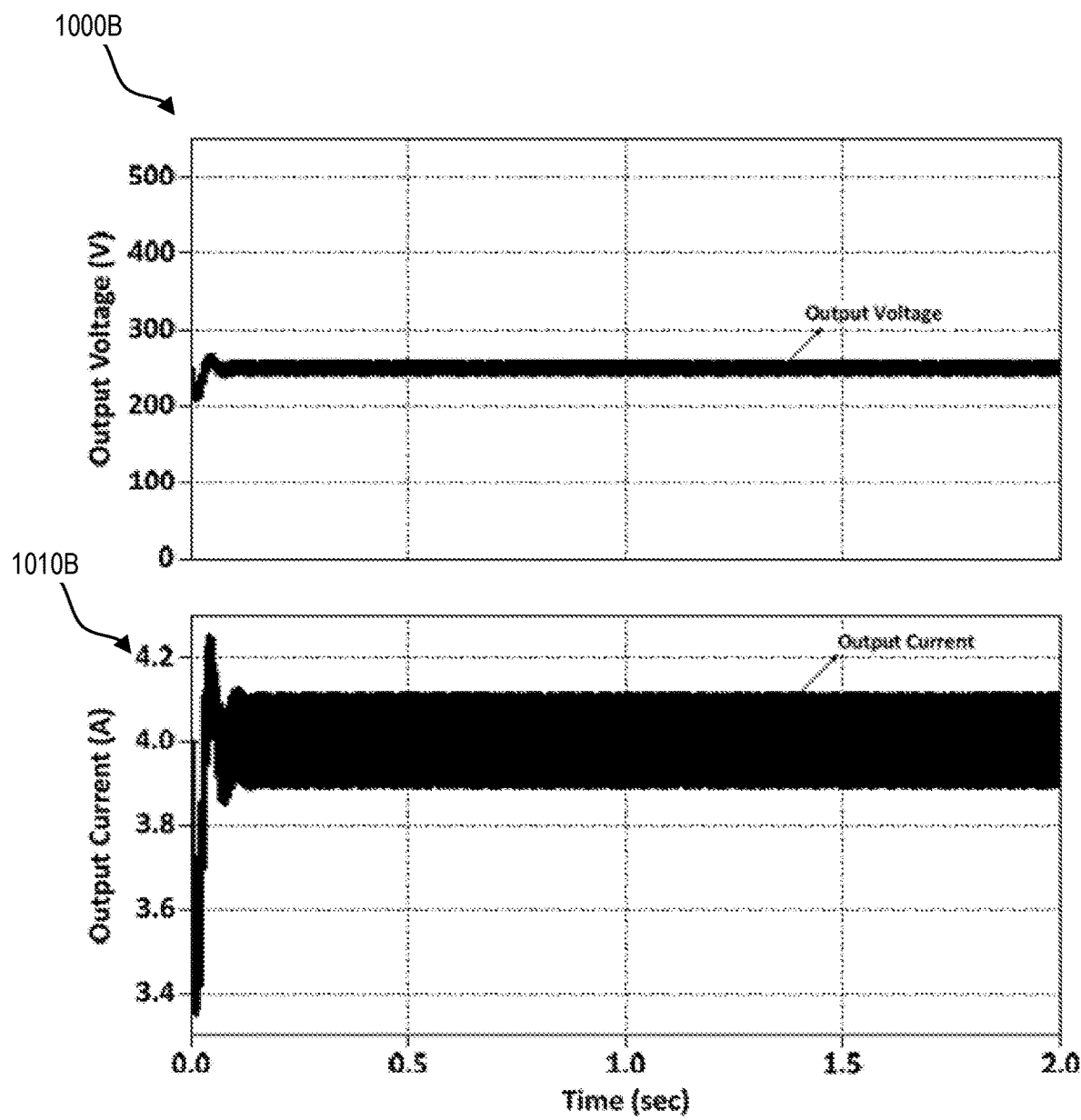
FIG. 10B shows plots of output voltage and current signals generated by the PFC converter of FIG. 2 as a result of the input voltage and current signals of FIG. 10A.

Referring now to FIG. 10B, there is shown a voltage plot 1000B of the output voltage from the PFC converter 115 that corresponds to the input voltage and reference voltage of FIG. 10A. Also shown is a current plot 1010B of the output current from the PFC converter 115. In particular, the voltage plot 1000B shows the output voltage ($V_{DC}$) from the PFC converter 115 being at substantially about 250 volts.

Figure 11A:
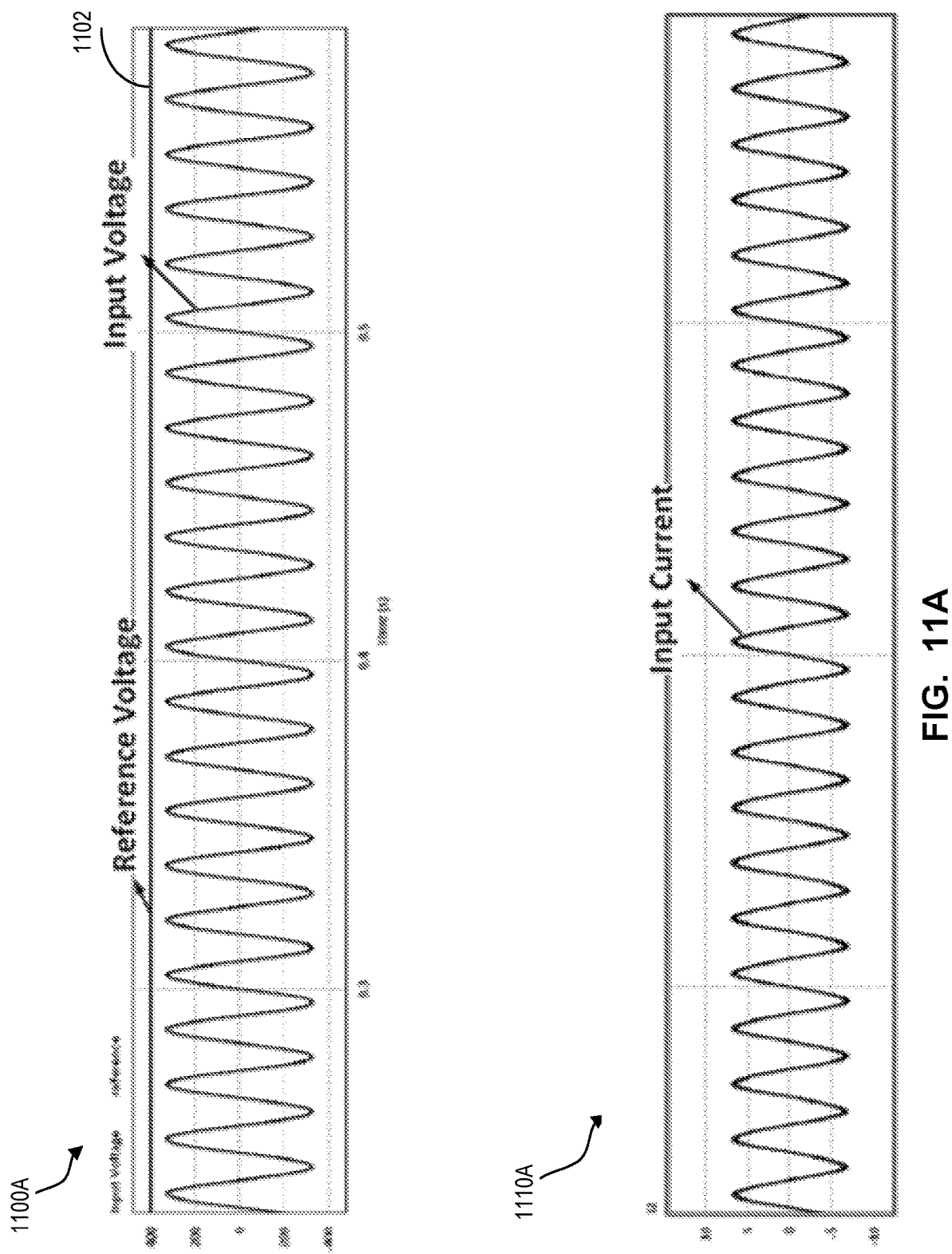
FIG. 11A shows plots of still further example input voltage and current signals for the PFC converter of FIG. 2.

Referring now to FIG. 11A, there is shown a voltage plot 1100A of still a further example input AC voltage waveform $V_{IN}$ for the PFC converter 115. FIG. 11A also shows a current plot 1110A of an example input current waveform for the PFC converter. In particular, the voltage plot 1100A now shows that the reference voltage 1102 is set at substantially about 450 volts, which is higher than the peak of the input AC voltage waveform. Accordingly, in this example, the PFC stage 115 will operate continuously in the boost mode, in accordance with the teachings herein.

Figure 11B:
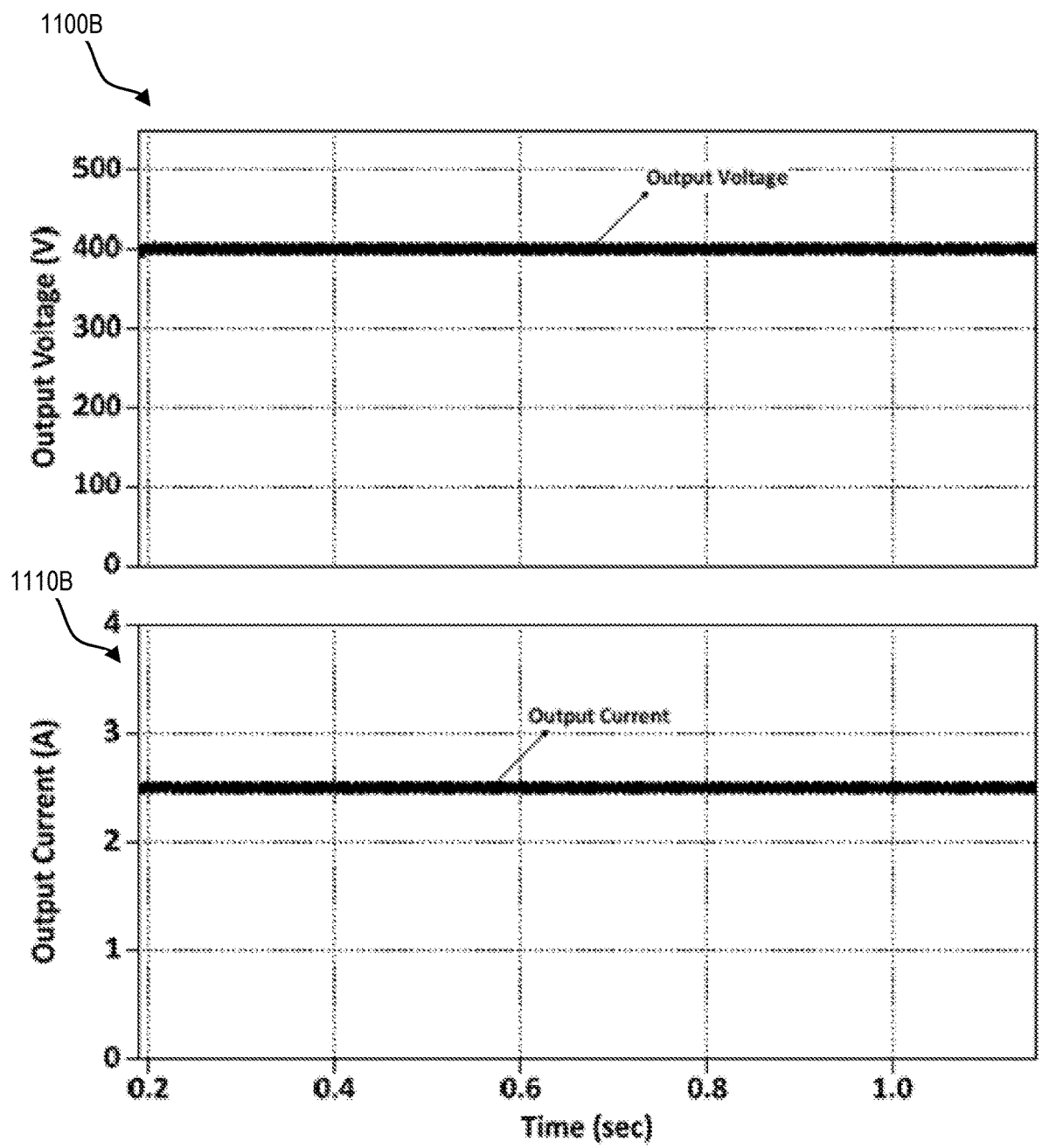
FIG. 11B shows plots of output voltage and current signals generated by the PFC converter of FIG. 2 as a result of the input voltage and current signals of FIG. 11A.

Referring now to FIG. 11B, there is shown the voltage plot 1100B of the output voltage from the PFC converter 115 that corresponds to the input voltage and reference voltage shown in FIG. 11A. Also shown is a current plot 1110B of the output current from the PFC converter. In particular, the voltage plot 1100B shows the output voltage $V_{DC}$ at substantially 400 volts.

As such, FIGS. 9 to 11 demonstrate the capability of the PFC converter 115 to generate variable DC link voltages $V_{DC}$ that are either above or below the peak input voltage.

Figure 12:
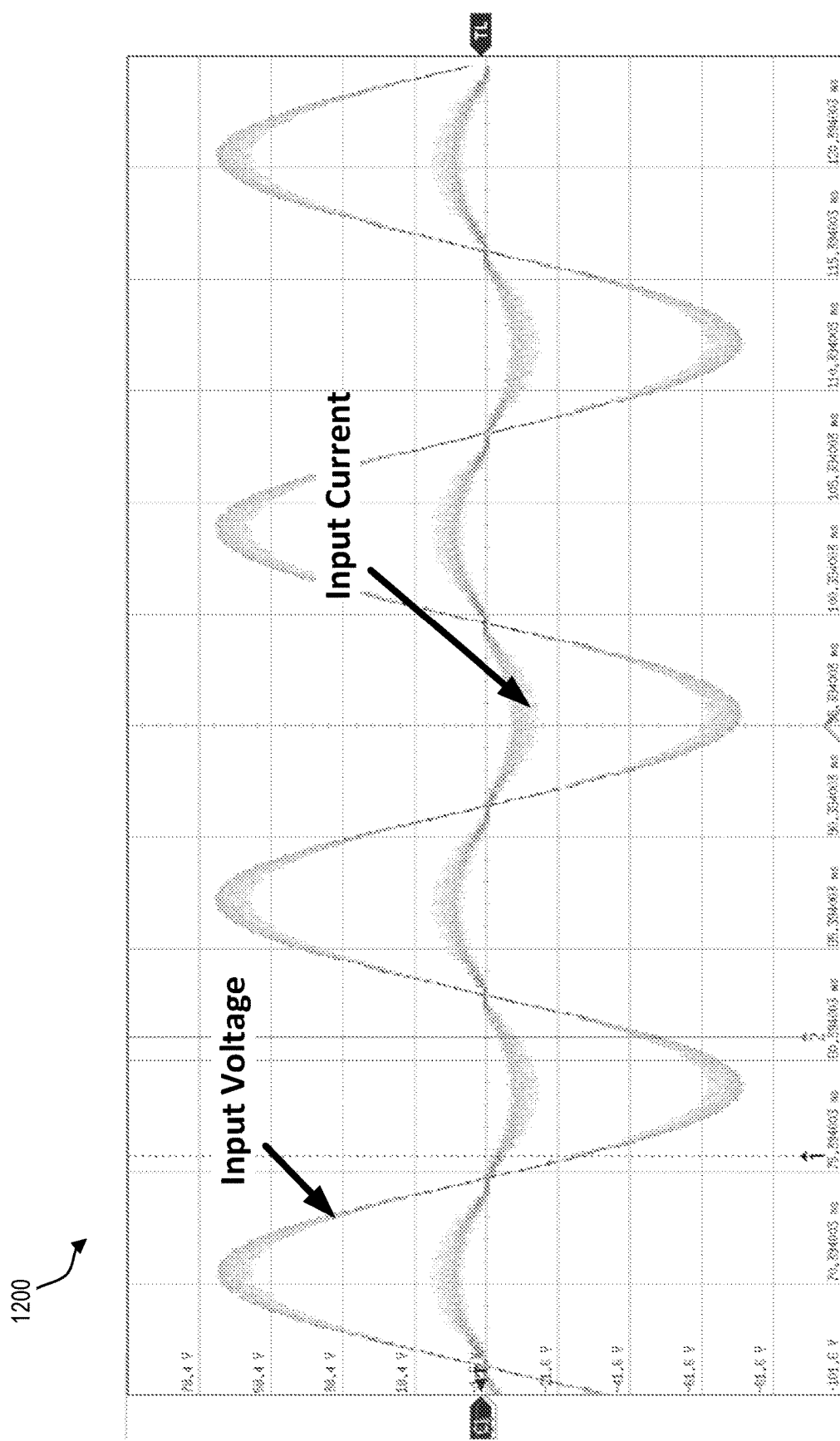
FIG. 12 shows a plot of still a further example of an input voltage and current signal for the PFC converter of FIG. 2.

Referring now to FIG. 12, there is shown a plot 1200 of further example input voltage and current waveforms for the PFC converter 115. In particular, FIG. 12 shows an example case where the observed input current and input voltage signals for the PFC converter 115 are in-phase, resulting in a near unity power factor.

Figure 13:
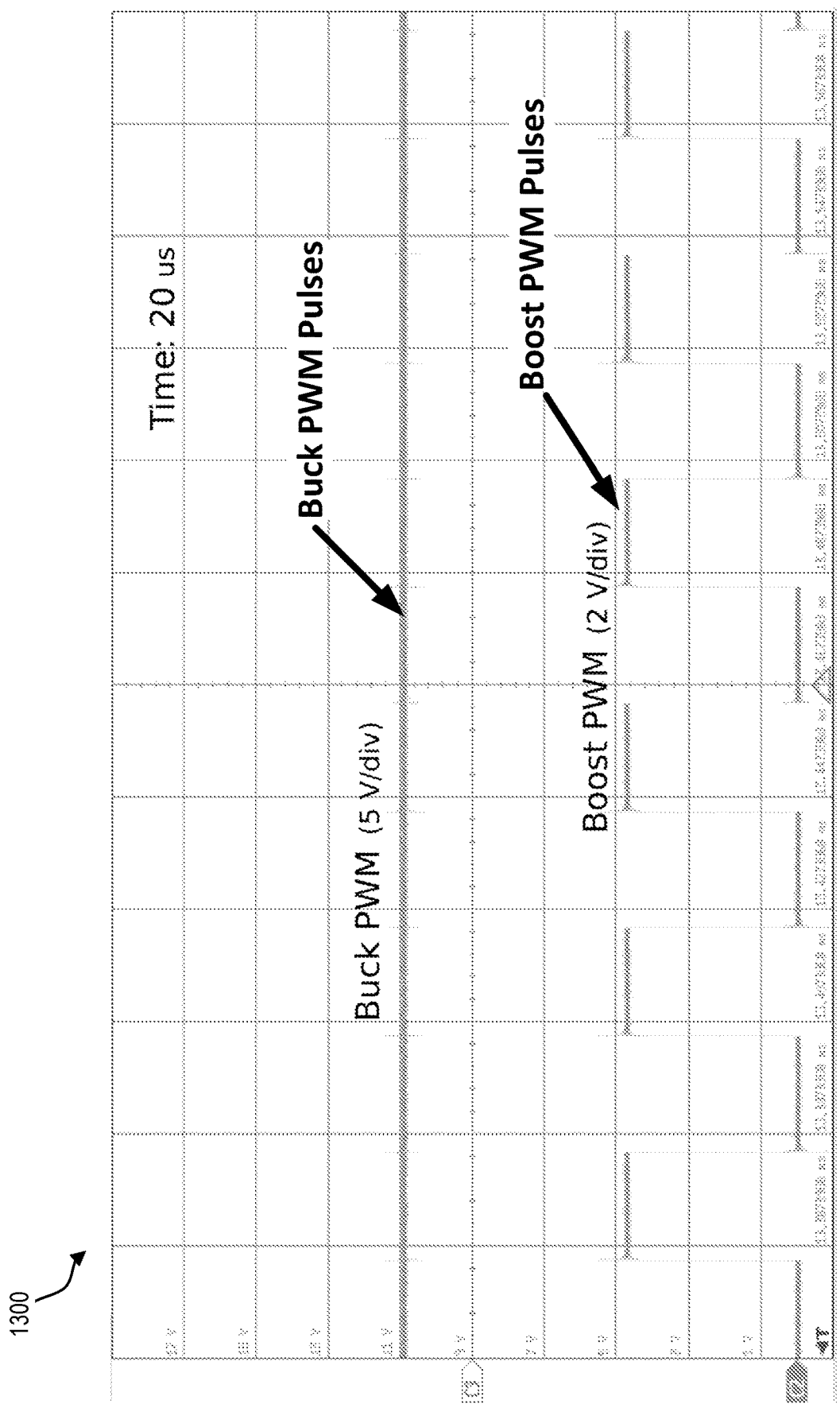
FIG. 13 shows a plot of pulse-width modulated (PWM) signals generated by the switch logic circuit of FIG. 7.

Referring now to FIG. 13, there is shown a plot 1300 of example buck PWM pulses ($d_{Buck}$) and boost PWM pulses ($d_{Boost}$) that may be generated by the switch logic circuit 700 of FIG. 7 in the boost mode of operation. In particular, the PWM pulses shown in FIG. 13 are generated in a case where the reference voltage $V_{REF}$ is greater than the peak of the input voltage $V'_{IN}$, resulting in the converter unit 206 operating in a continuous boost mode of operation. As shown in FIG. 13, the buck PWM signal is in a continuous high mode, which operates the buck switch in the continuous ON state. Conversely, the boost PWM signal varies between the high and low states, which operates the boost switches for a limited time duration in the ACTIVE mode whereby the switches are dynamically varied between the ON and OFF states, as required in the boost mode of operation.

Figure 14:
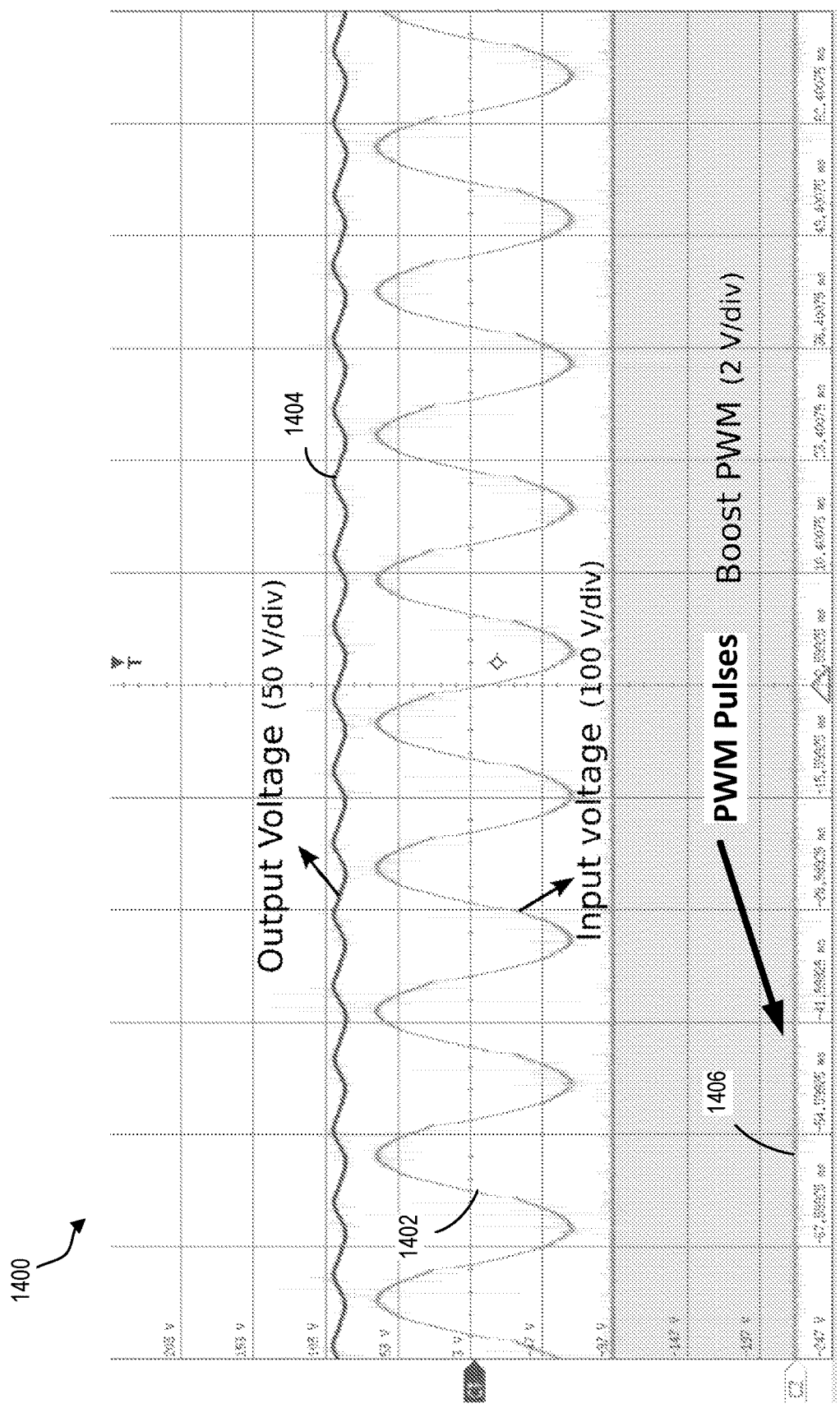
FIG. 14 shows a plot of an example input voltage signal for the PFC converter of FIG. 2 and the resultant output voltage signal generated when using the PWM signals of FIG. 13.

Referring now to FIG. 14, there is shown a plot 1400 of an example input voltage signal 1402 used for logic verification of the PFC converter 115 of FIG. 1, as well as the PWM signal 1406 generated by the PFC converter 115 and the resultant output DC-link voltage $V_{DC}$ signal 1404. As shown, the output voltage 1404 is greater than the peak of the input voltage 1402, which results from the PFC converter 115 operating in a continuous boost mode of operation.

Figure 15:
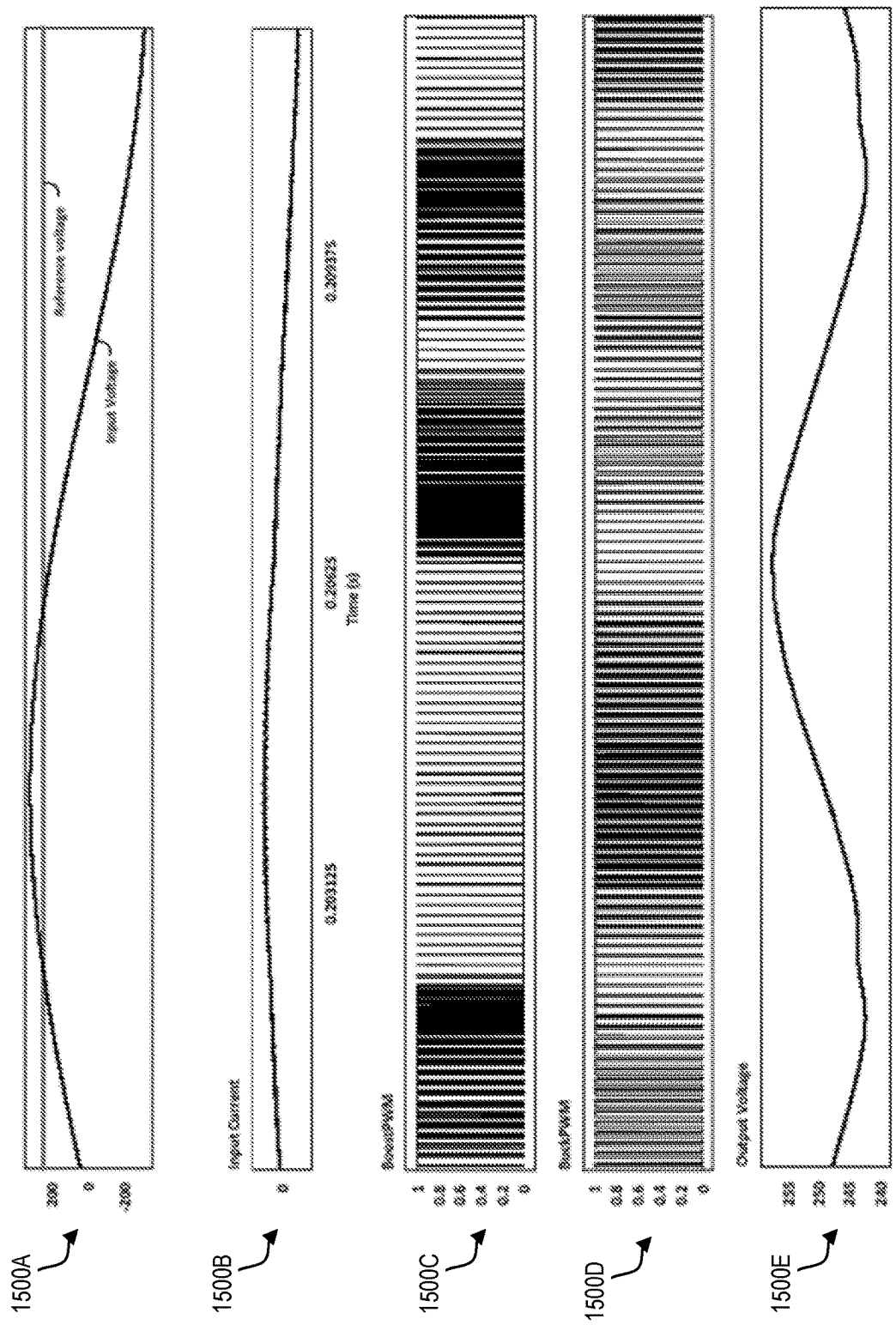
FIG. 15 shows plots of example half-cycle input current and voltage signals for the PFC converter of FIG. 2 where the reference voltage is less than the peak input voltage, as well as the resultant boost and buck PWM signals and the resultant output voltage signal.

Referring now to FIG. 15, there is shown a voltage plot 1500A of an example half-cycle input AC voltage signal $V_{IN}$ for the PFC converter 115 of FIG. 1, whereby the reference voltage is set below the peak input voltage at about 250 Volts. The voltage plot 1500A is analogous to the half-cycle input voltage waveform shown in FIGS. 3A and 3B. Also shown by FIG. 15 is a current plot 1500B of an example half-cycle input current signal to the PFC converter 115, as well as a boost PWM plot 1500C and a buck PWM plot 1500D generated by the controller 210 of FIG. 2 in respect of the voltage plot 1500A. In particular, the boost PWM signal in plot 1500C is most active when the input voltage, in the voltage plot 1500A, is less than the reference voltage. Further, the buck PWM signal is most active when the input voltage, in the voltage plot 1500A, is greater than the reference voltage in plot 1500A. FIG. 15 also shows an output DC-link voltage plot 1500E resulting from the input voltage and current signals and the boost and buck PWM signals. In particular, as shown in the output voltage plot 1500E, the output DC-link voltage of the PFC converter 115 fluctuates closely around the reference voltage line at 250 Volts.

Figure 16:
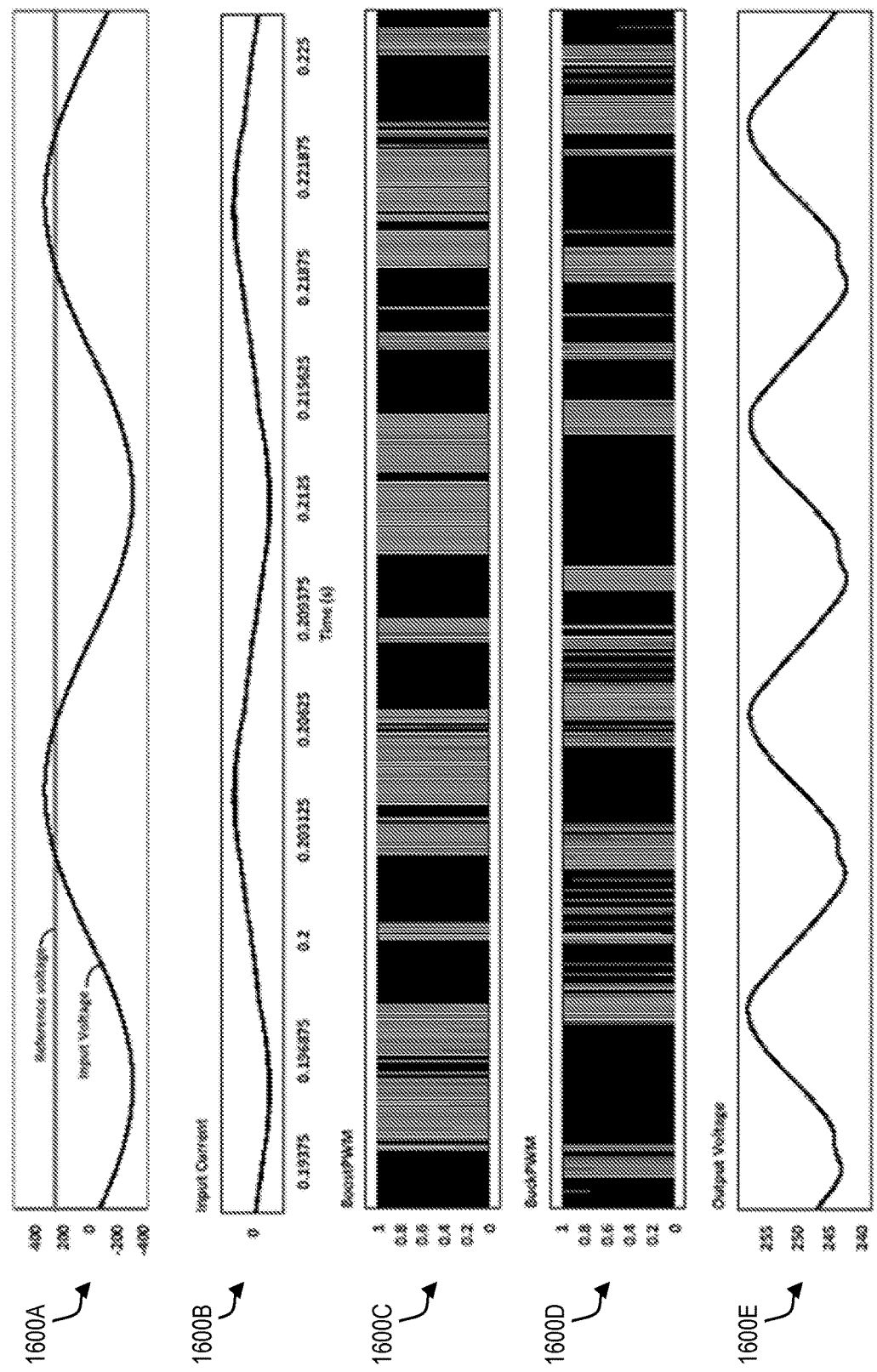
FIG. 16 shows plots of example double-cycle input current and voltage signals for the PFC converter of FIG. 2 where the reference voltage is less than the peak input voltage, as well as the resultant boost and buck PWM signals and the and the resultant output voltage signal.

Referring now to FIG. 16, there is shown a voltage plot 1600A of an example double-cycle AC voltage waveform $V_{IN}$, wherein the reference voltage is set below the peak input voltage at about 250 volts. FIG. 16 also shows a current plot 1600B of an example double-cycle input current signal for the PFC converter 115 of FIG. 1, as well as well as a boost PWM plot 1600C and a buck PWM plot 1600D generated by the controller 210 of FIG. 2 in respect of the voltage plot 1600A. In particular, the boost PWM signal in plot 1600C is most active when the input voltage, in the voltage plot 1600A, is less the reference voltage. Further, the buck PWM signal is most active when the input voltage, in voltage plot 1600A, is greater than the reference voltage in plot 1600A (i.e., in order to buck the input voltage to the reference voltage level). FIG. 16 also shows an output DC-link voltage plot 1600E resulting from the input voltage and current signals and the boost and buck PWM signals. As shown in the output voltage plot 1600E, the output voltage of the PFC converter again fluctuates closely around the reference voltage line at 250 volts.

Figure 17:
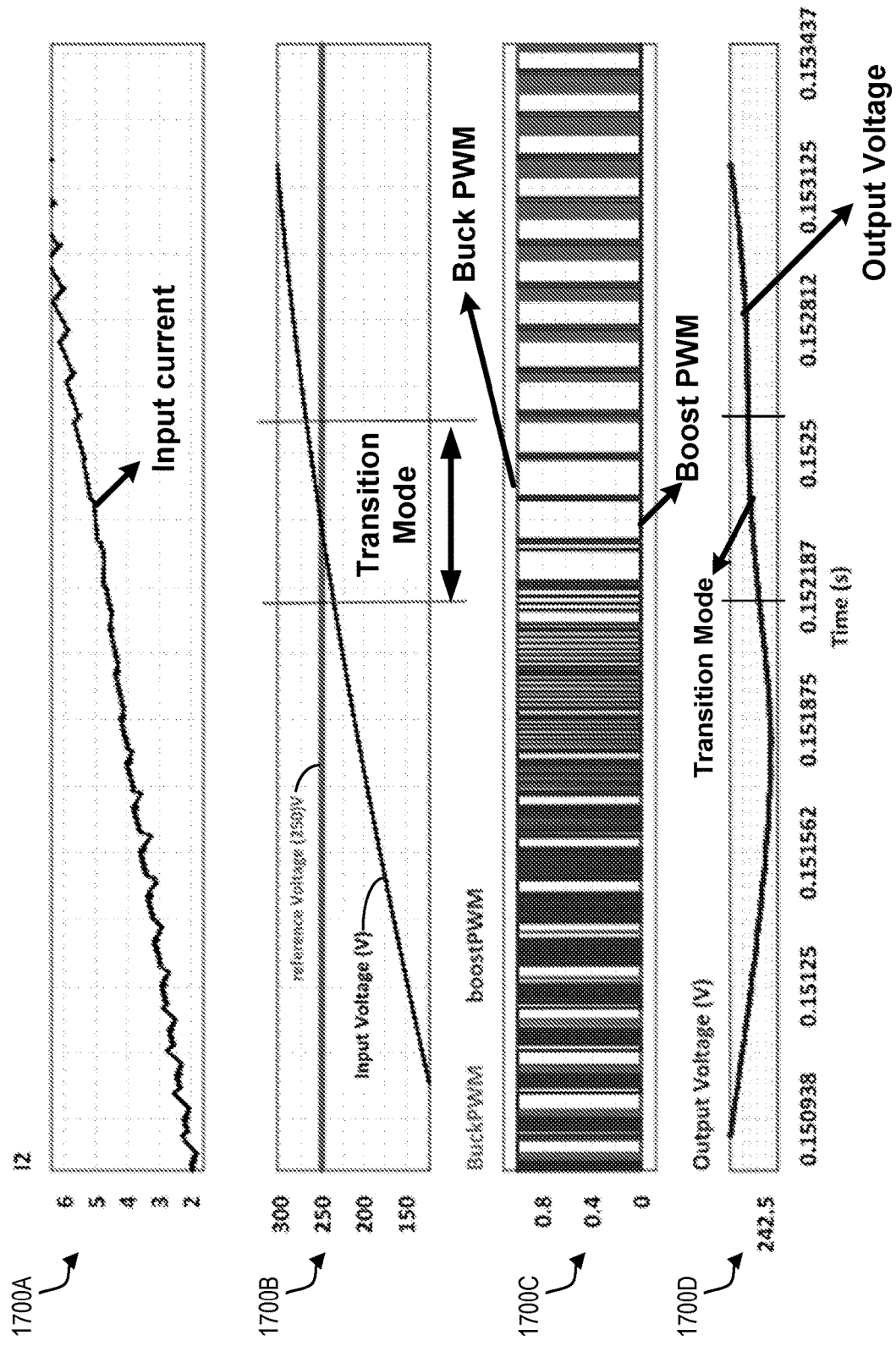
FIG. 17 shows plots of example input current and voltage signals for the PFC converter of FIG. 2 in the intermediate buck-boost mode of operation, as well as the resultant boost and buck PWM signals and the resultant output voltage signal.

Referring now to FIG. 17, there is shown a current plot 1700A of an example input current signal for the PFC converter 115 of FIG. 1, and a voltage plot 1700B of an example input voltage signal to the PFC converter during the intermediate buck-and-boost mode of operation. In the voltage plot 1700B, the transition mode (i.e., corresponding to the intermediate buck-and-boost mode of operation) is identified as the region where the input voltage is approximately within 5 Volts of the reference voltage, assuming a band voltage $V_B$ of 5 Volts. Plot 1700C shows the buck and boost PWM signals generated during the transition mode. As shown, the buck PWM signal is generally high, which results in the buck switch Q operating in the continuous ON state. Further, the boost PWM signal is generally low, which results in the boost switches Q1 and Q2 operating in the continuous OFF state. Accordingly, the buck and boost PWM signals generate the configuration of FIG. 4E wherein the input voltage terminal is connected to the output voltage terminal. Plot 1700D is a voltage plot of the output DC-link voltage in the transition zone, resulting from buck and boost PWM signals of plot 1700C.

Figure 18:
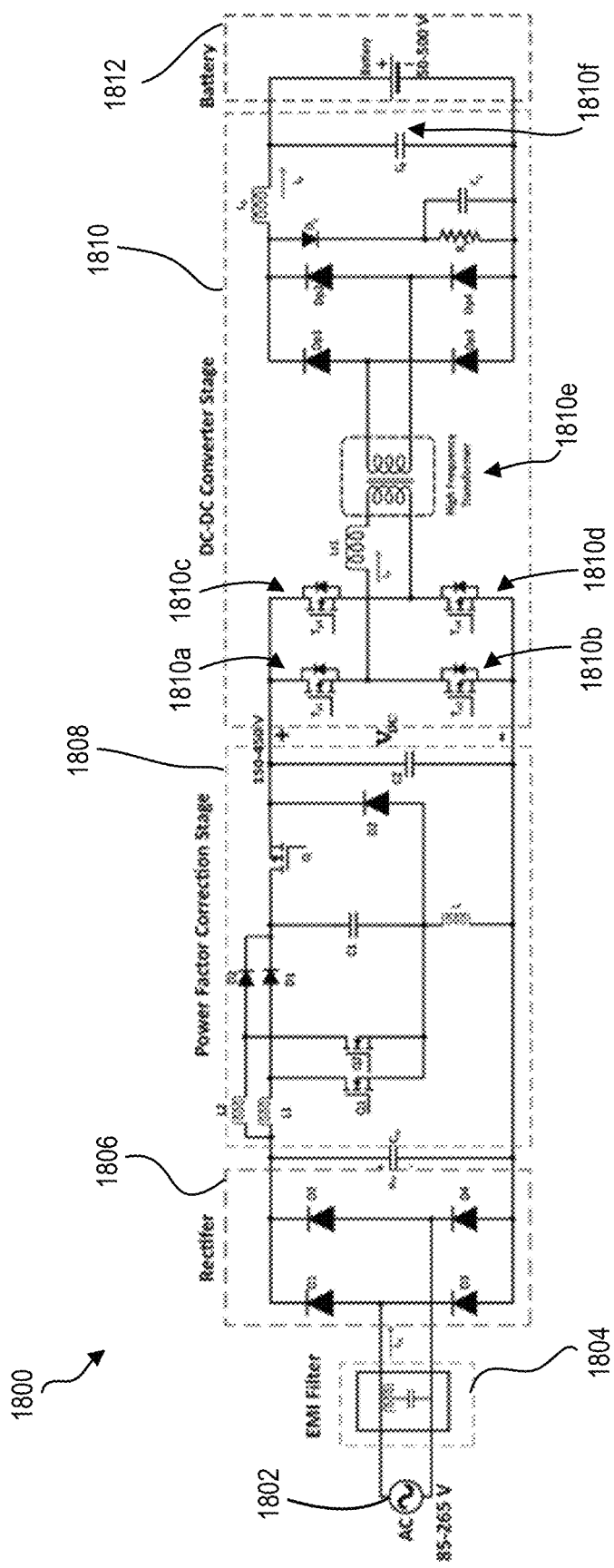
FIG. 18 is a circuit drawing of an example embodiment of the two-stage battery charger of FIG. 1.

Referring now to FIG. 18, there is shown a circuit diagram of an example embodiment of a two-stage battery charger 1800 in accordance with the teachings herein. The two-stage battery charger 1800 is analogous to the two-stage battery charger 100 of FIG. 1.

As shown, the two-stage battery charger 1800 includes a voltage source 1802, an EMI Filter 1804, a rectifier unit 1806, an AC/DC PFC converter unit 1808, a DC-DC converter 1810, and a battery 1812. The voltage source 1802 may be the grid supply that is coupled to the EMI filter 1804. The DC-DC converter 1810 provides isolation from the voltage source 1802 by using a high frequency transformer 1810e. The DC-DC converter 1810 also generates the wide range of output voltages.

The DC-DC converter 1810 may have a full bridge topology. In various cases, the switching frequency of the DC-DC converter 1810 may be about 100 kHz. The components of the battery charger 1800 may be implemented such that when the voltage source 1802 provides an input voltage in the range of about 85-265 Volts AC RMS, the battery charger 1800 can provide a regulated output voltage over a wide range of about 50-500 Volts DC.

Figure 19A:
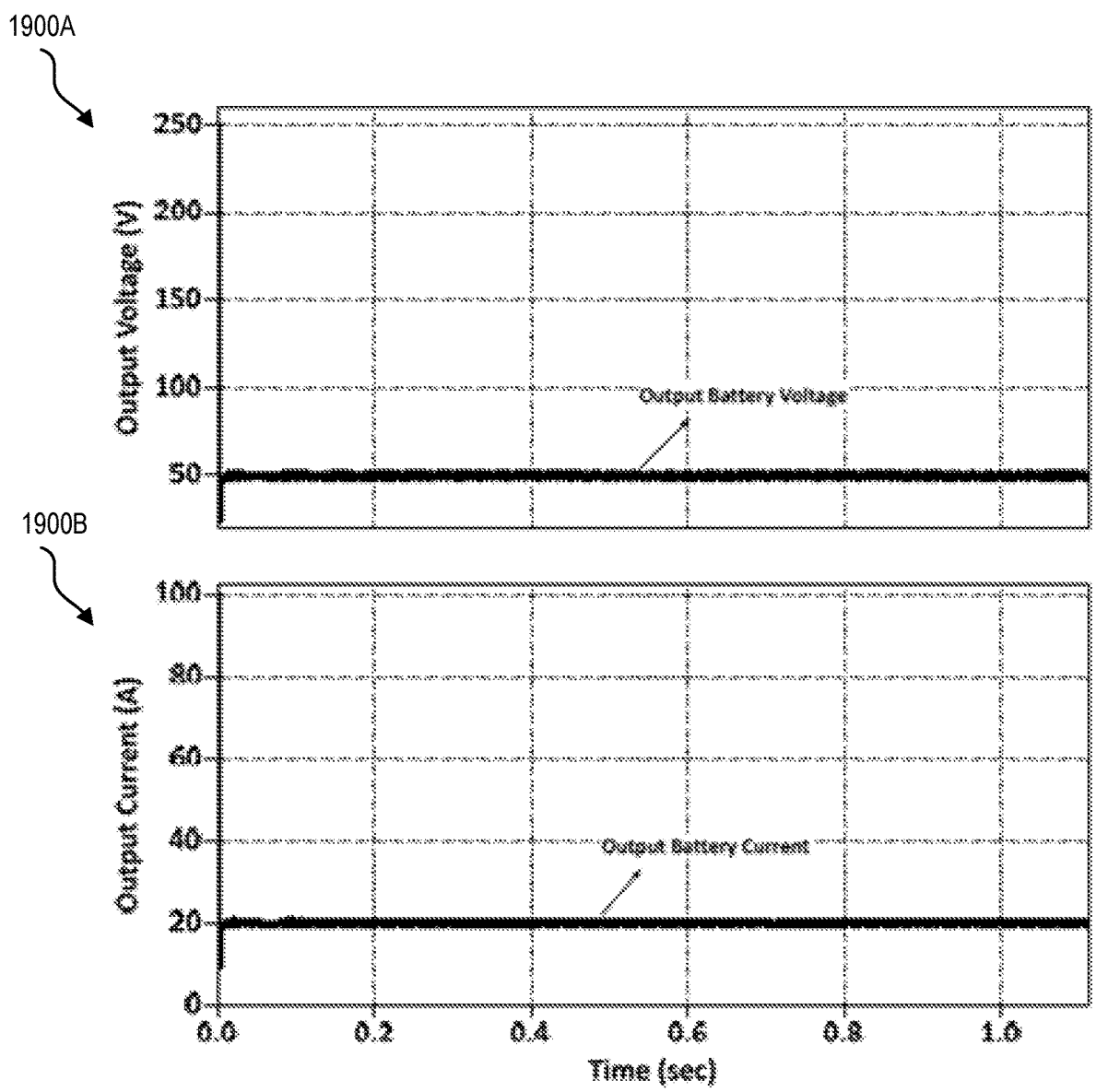
FIG. 19A shows plots of example output voltage and current signals generated by the two-stage battery charger of FIG. 18.

Referring now to FIG. 19A, there is shown a plot 1900A for an example output battery voltage ($V_{BATT}$) from the two-stage battery charger 1800. FIG. 19A also shows a plot 1900B of an example output current from the battery charger 1800. In particular, the plot 1900A shows an output battery voltage of 50 volt where the output voltage ripple is substantially 0.8%. Further, the output current ripple in the plot 1900B is substantially 0.5%.

Figure 19B:
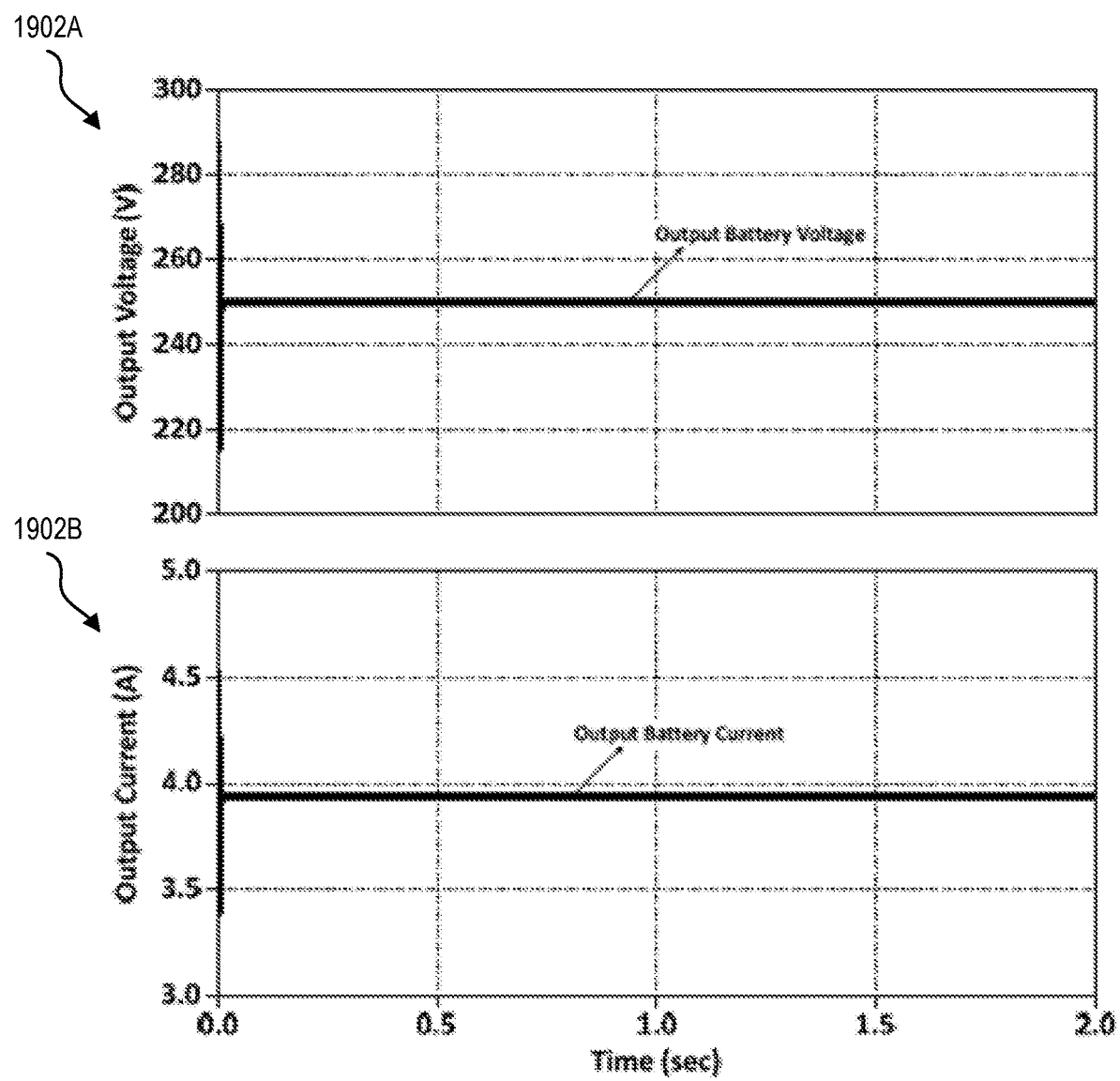
FIG. 19B shows plots of further example output voltage and current signals generated by the two-stage battery charger of FIG. 18.

Referring now to FIG. 19B, there is shown a plot 1902A for a further example output battery voltage ($V_{BATT}$) from the two-stage battery charger 1800. FIG. 19B also shows a plot 1902B for an example output current from the battery charger 1800. In particular, the plot 1900A now shows an output battery voltage of 250 volts, wherein the output battery voltage ripple is substantially 0.9%. Further, the output current ripple in the plot 1902B is substantially 1.25%.

Figure 19C:
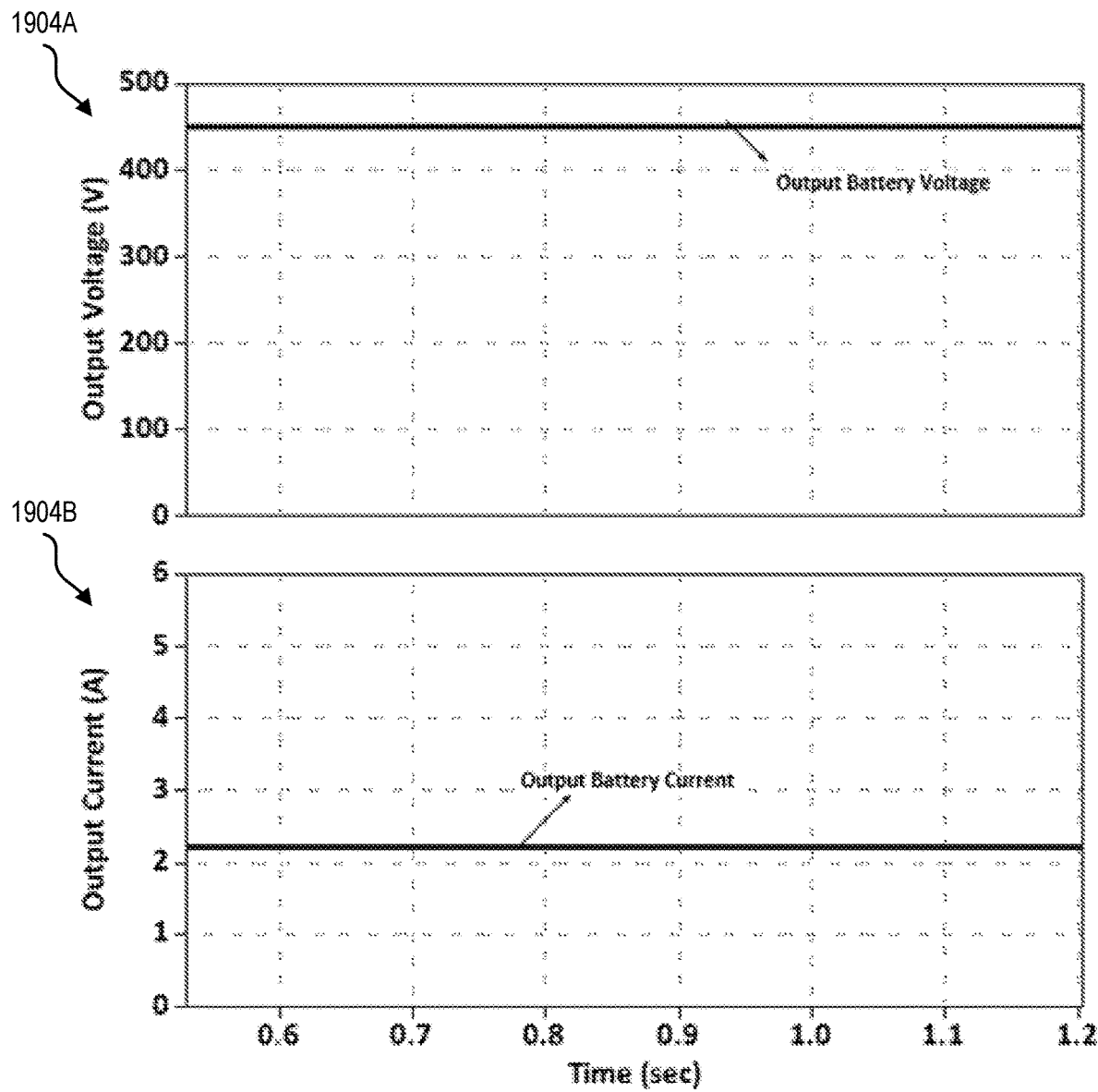
FIG. 19C shows plots of still further examples of output voltage and current signals generated by the two-stage battery charger of FIG. 18.

Referring now to FIG. 19C, there is shown a plot 1904A for an example output battery voltage ($V_{BATT}$) from the two-stage battery charger 1800. FIG. 19C also shows a plot 1904B of an example output current from the battery charger 1800. In particular, the plot 1904A shows an output battery voltage of 450 volts, wherein the output voltage ripple is substantially 1%. Further, the output current ripple in the plot 1904B is substantially 0.4%.

Accordingly, FIGS. 19A to 19C demonstrate the wide-output voltage range capabilities of the two-stage battery charger 1800 (i.e., at least 50 volts to 450 volts).

Referring now to FIGS. 20-28, there are shown various plots of example experimental results obtained from the PFC converter 1808 of FIG. 18, as well as the DC-DC converter stage 1810 of FIG. 18. The experimental results are generated using a PFC converter and DC-DC converter stage using $L_1$=2 mH, $L_2$=2 mH, L=1.5 mH, $L_0$=560 µH, $C_1$=8 µF, $C_2$=470 µF, $C_0$=2×47 µF (e.g., capacitor 1810f in FIG. 18), a PFC converter frequency of 30 kHz, and a DC-DC converter frequency of 100 kHz.

Figure 20A:
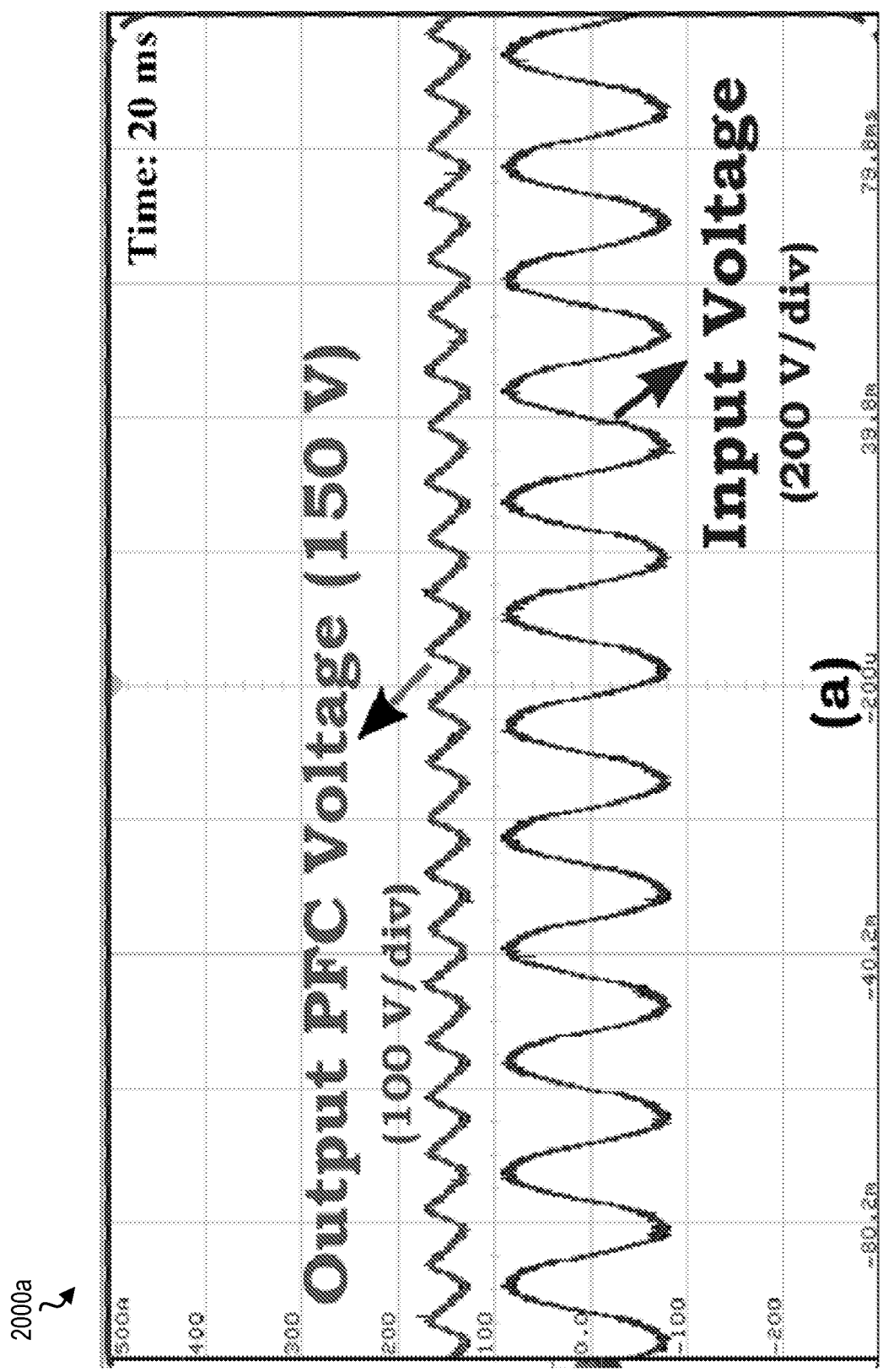
FIG. 20A is a voltage plot showing example experimental results for input and output voltage waveforms for a PFC converter operating to provide an output voltage of 150 V.
Figure 20B:
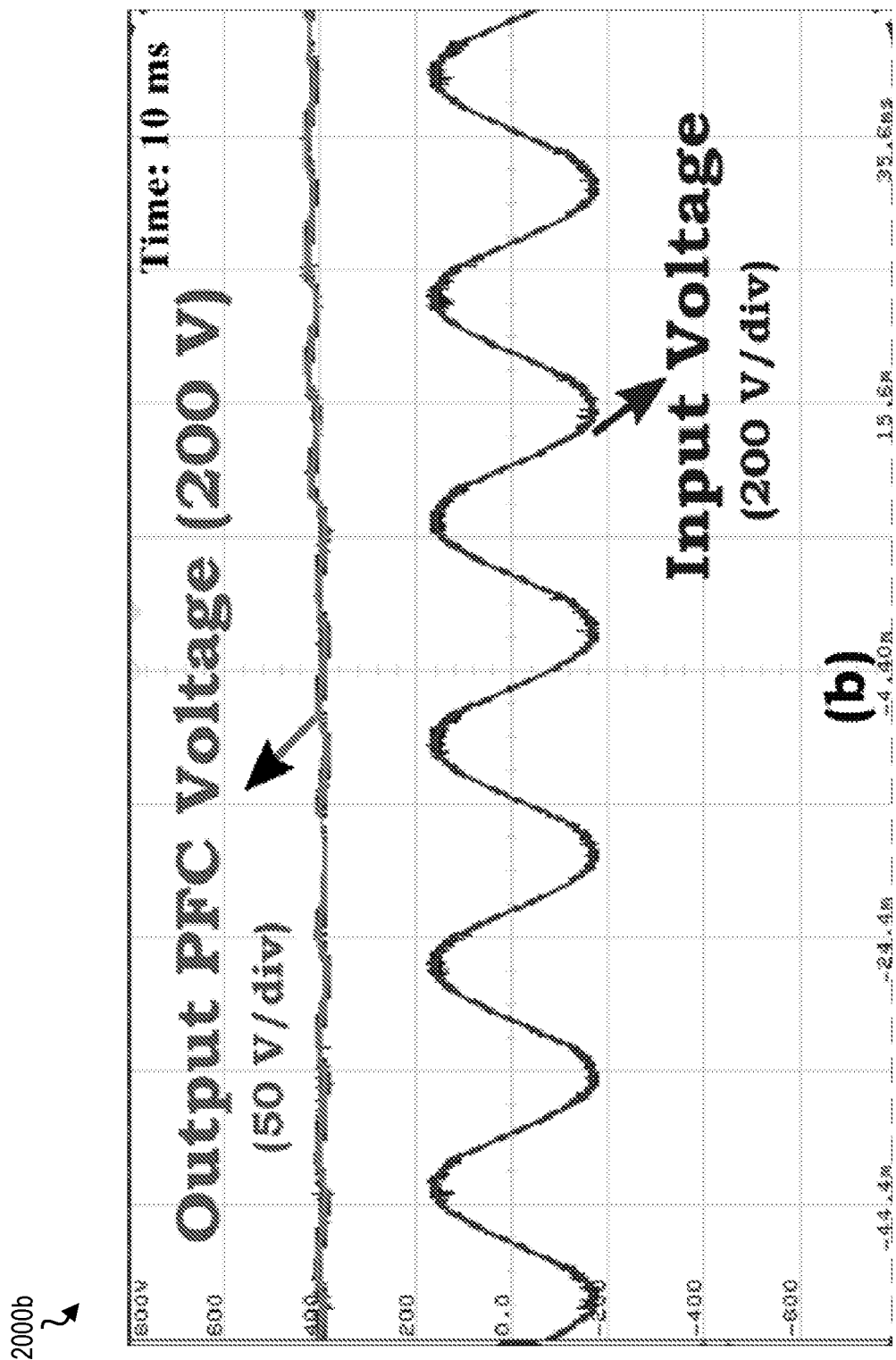
FIG. 20B is a voltage plot showing further example experimental results for input and output voltage waveforms for a PFC converter operating to provide an output voltage of 200 V when the PFC converter is operating only in boost mode.
Figure 20C:
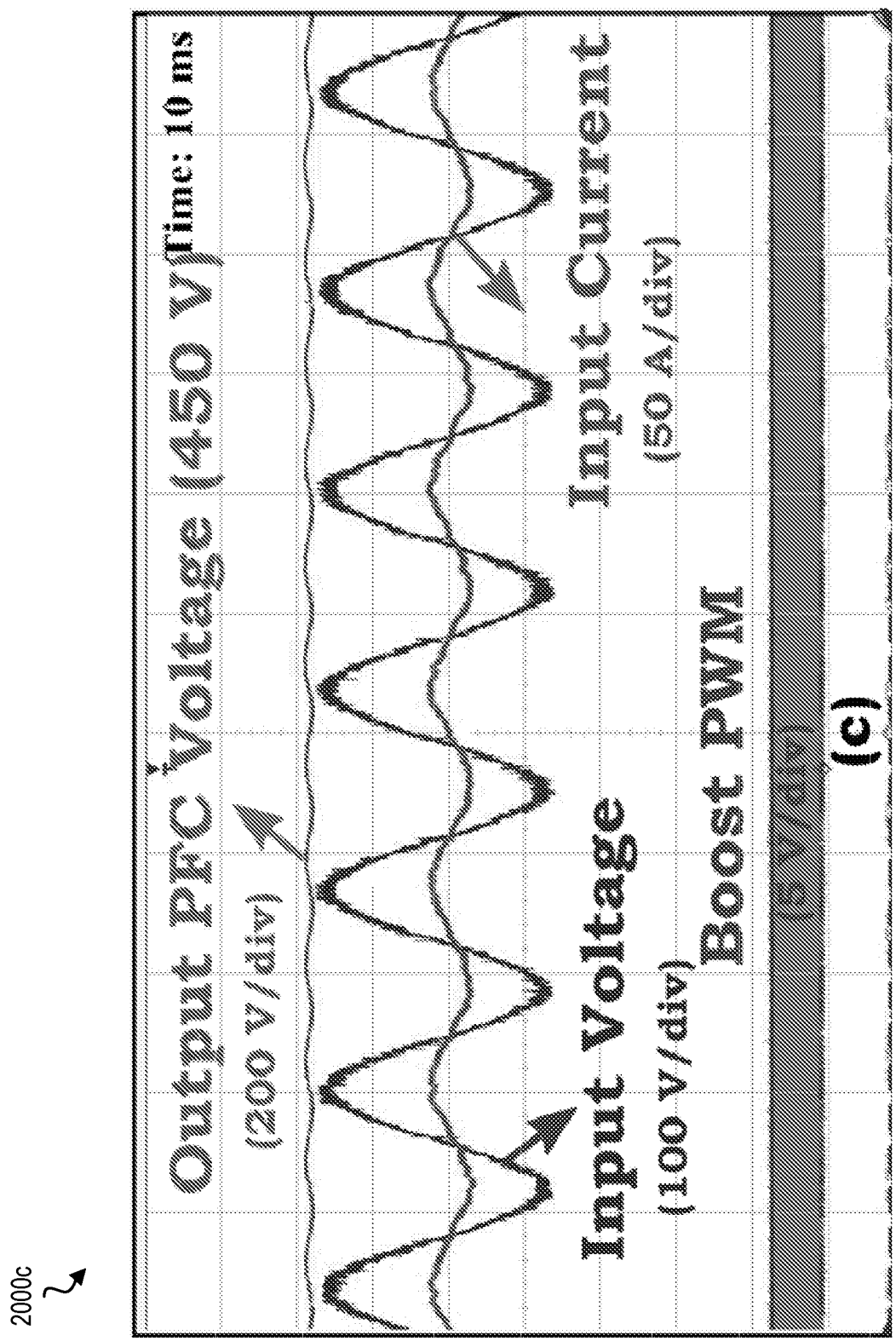
FIG. 20C is a plot showing still further example experimental results for input and output voltage waveforms for a PFC converter, as well as an input current waveform and a step-up PWM waveform operating to provide an output voltage of 450 V.

Referring now to FIGS. 20A-20C, there are shown example plots of experimental results demonstrating the wide voltage output range of the PFC converter 1808 of FIG. 18, or the PFC converter 200 of FIG. 2. In these example cases, a 1 kW converter is powered with a 120 V (RMS) input supply.

In particular, FIG. 20A shows a voltage plot 2000a showing example input and output voltage waveforms from the PFC converter unit 1808 of FIG. 18. In this example case, the input voltage ($V_{IN}$) to the converter has a value of 170 V ($V_{max}$), and the nominal converter output voltage ($V_{DC}$) is observed at 150 V, with a peak-to-peak ripple of 25 V. As the output voltage ($V_{DC}$) is less than the peak of input voltage ($V_{IN}$), the converter 1808 is operated in the buck and boost modes. As shown, there are no observed disturbances in the output voltage during changeover of modes. A low frequency (120 Hz) ripple can also be observed in the output voltage waveform. Though a large value electrolytic capacitor (470 µF) was placed near the load, the ripple remains high at low output voltages.

FIG. 20B shows a voltage plot 2000b showing other example input and output voltage waveforms for the PFC converter unit 1808 of FIG. 18. The PFC converter unit 1808, in this example case, is still operating at an input voltage ($V_{IN}$) of 170 V ($V_{max}$); however, the converter 1808 is now allowed to operate at an output voltage ($V_{DC}$) of 200 V. In particular, this results in the PFC converter 1808 operating in only boost mode. As shown, a 20 V (peak-peak) output voltage ripple is observed in the converter output voltage waveform ($V_{DC}$).

FIG. 20C shows a plot 2000c showing still other example input and output voltage waveforms for the PFC converter unit 1808, as well as an input current waveform and a boost PWM waveform. In this example case, the input voltage ($V_{IN}$) to the converter is again 170 V ($V_{max}$); however, the converter is generating an output voltage ($V_{DC}$) of 450 V.

In view of the foregoing, FIGS. 20A-20C demonstrate that the control structure for the PFC converter is able to detect the desired reference output voltage for an applied input voltage, and is able to operate in the appropriate mode accordingly. In particular, the PFC voltage controller is a slow acting loop, and accordingly, responds to the wide output voltage range. A high PF near unity is observed as the input current is aligned in-phase with the input voltage. In particular, this shows that the converter operates with wide output voltages while maintaining high input PF.

Figure 21:
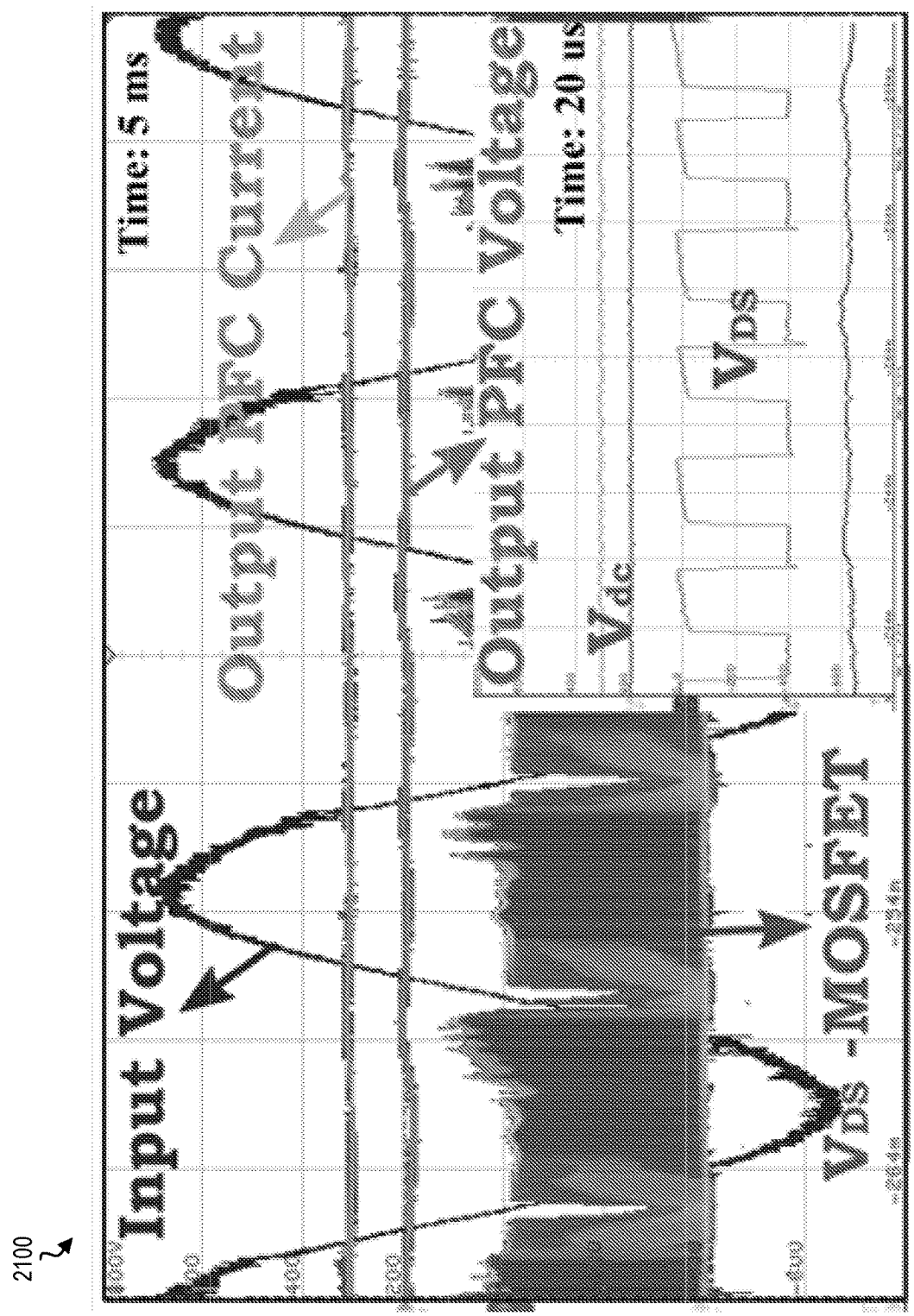
FIG. 21 is a plot showing example experimental results for a drain-source voltage waveform for a boost MOSFET in a PFC converter, along with example input and output voltage waveforms.

Referring now to FIG. 21, there is shown a plot 2100 showing the drain-source voltage of a boost switch (e.g., boost MOSFET) in the PFC converter, along with the input and output voltage waveforms of the PFC converter 1808 operating at 600 W power. In particular, plot 2100 shows an output current of 3 A being drawn by the load. The voltage stress observed on the boost switch is 200 V (i.e., the output voltage of converter).

Figure 22A:
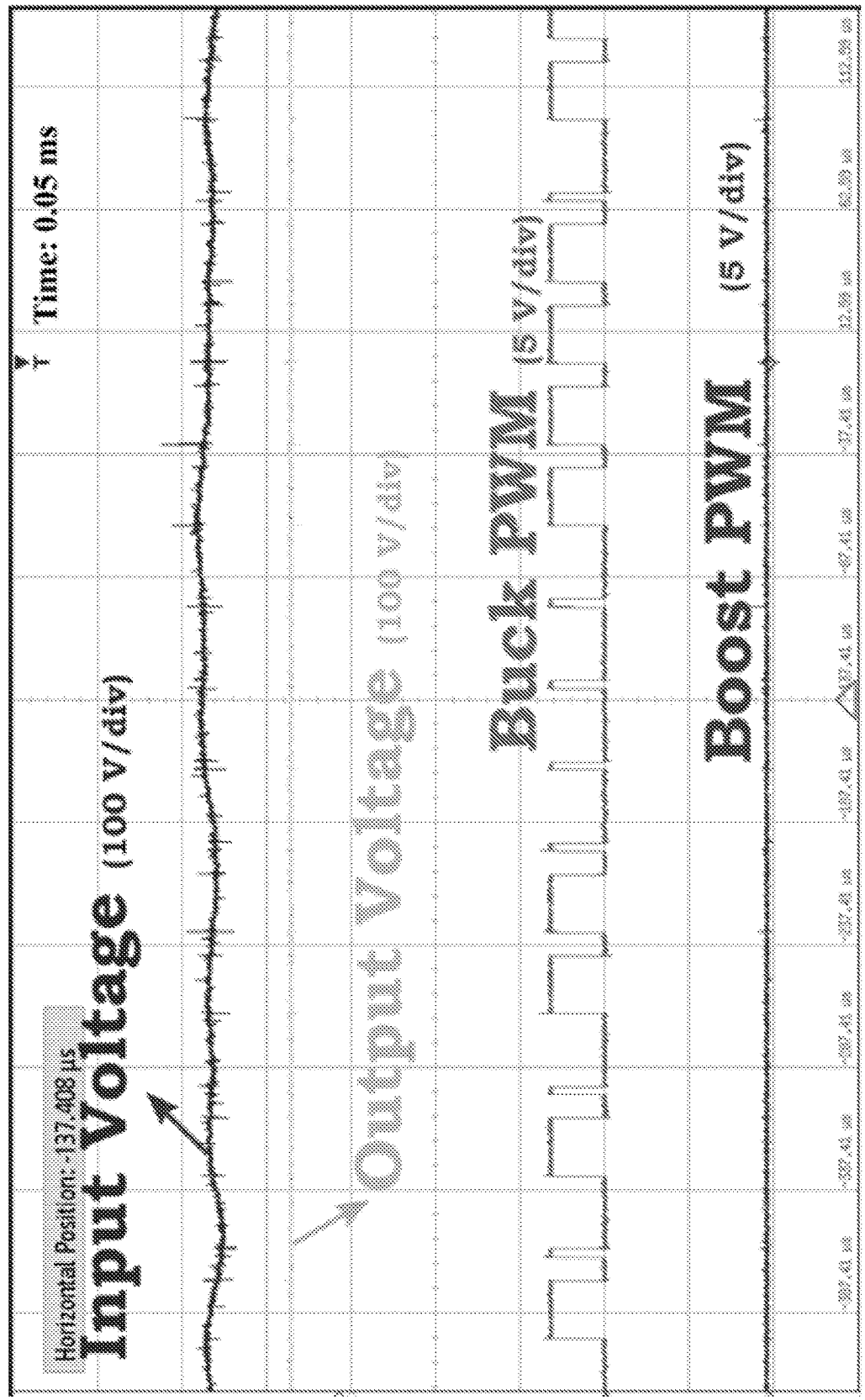
FIG. 22A is a plot showing experimental results for the operation of a PFC converter in a buck mode of operation.
Figure 22B:
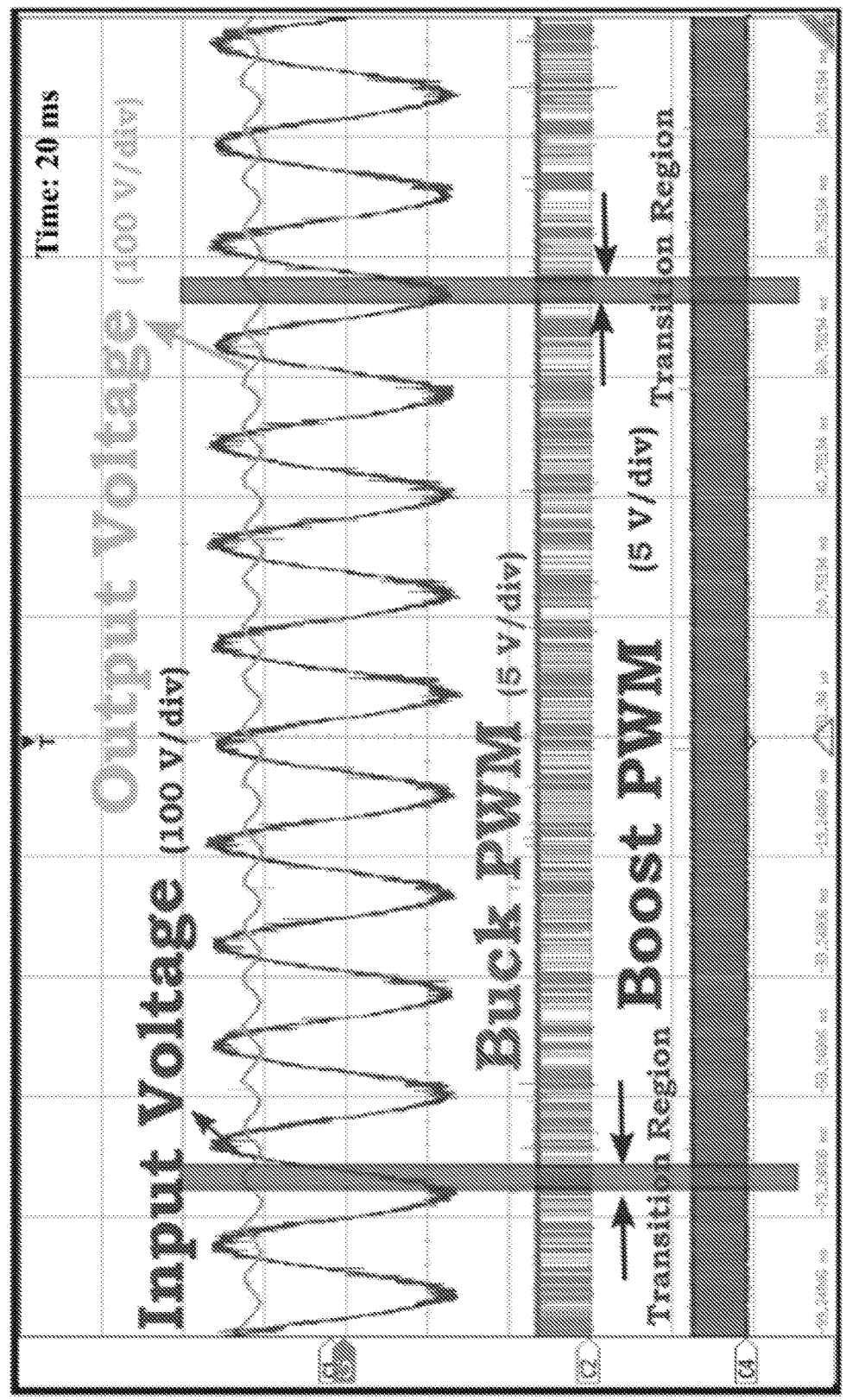
FIG. 22B is a plot showing experimental results for the operation of a PFC converter in a transition mode.
Figure 22C:
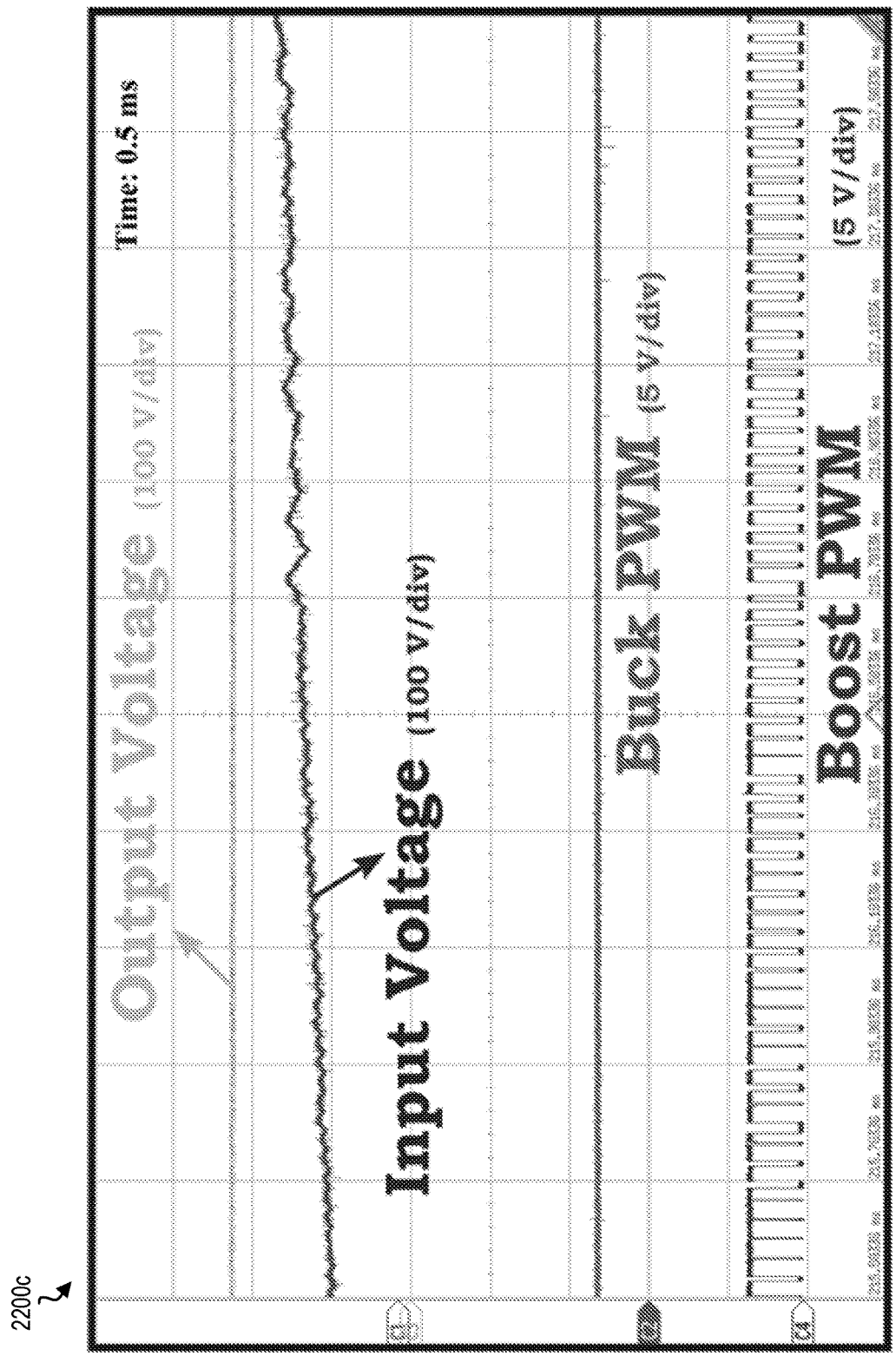
FIG. 22C is a plot showing experimental results for the operation of a PFC converter in a boost mode.

Referring now to FIGS. 22A-22C, there is shown plots which demonstrate the functionality of the transition mode between buck and boost modes in the PFC converter 1808 of FIG. 18.

In particular, FIG. 22A shows a plot 2200a showing experimental results for the operation of the PFC converter 1808 in buck mode. As shown, the response of the converter in the buck mode contains an input voltage which is greater than the output voltage, and the PWM signal of the boost switches ($Q_1$, $Q_2$) are turned-off. The control logic is implemented without any distortions, and the buck switch (Q) operates with a defined duty ratio ($d_{Buck}$).

FIG. 22B shows a plot 2200b for experimental results for the operation of the PFC converter 1808 in a transition mode. As shown, the converter is operating with both boost switches ($Q_1$, $Q_2$) and buck switch (Q) operating at their respective duty ratios.

FIG. 22C shows a plot 2200c for experimental results for the operation of the PFC converter 1808 in the boost mode. As shown, the output voltage ($V_{DC}$) is greater than the input voltage ($V_{IN}$). Further, the duty ratio for the boost switch ($Q_1$) is varied, while the duty ratio for the buck switch (Q) is turned-on continuously (i.e., $d_{Buck}=1$).

Figure 23A:
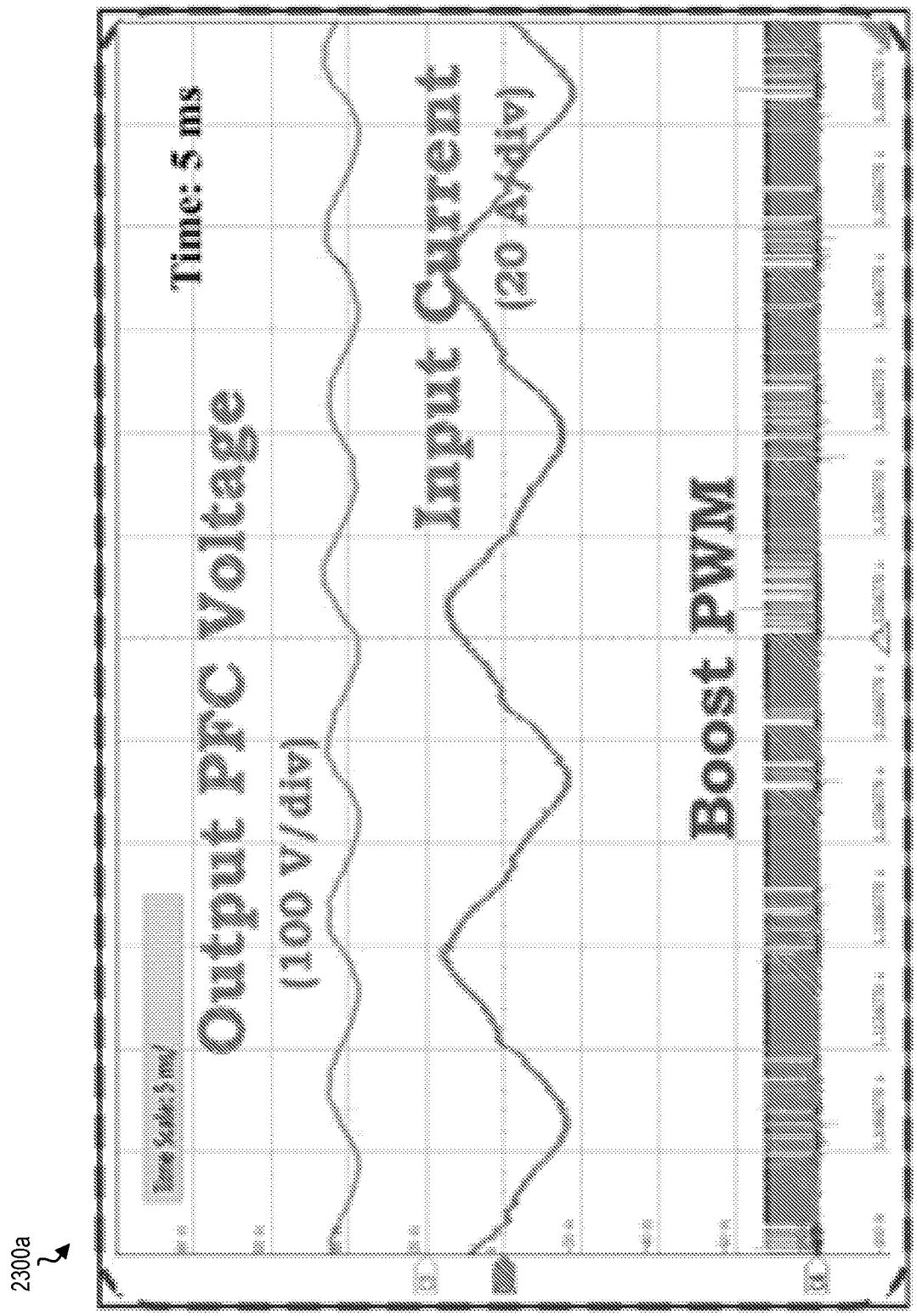
FIG. 23A is a plot showing an example experimental response of a PFC converter in a case where the output voltage is less than the peak of the input voltage.

Referring now to FIG. 23A, there is shown a plot 2300a showing experimental results for the response of the PFC converter 1808 when the output voltage is less than the peak of the input voltage. As shown, in this example case, the PFC converter generates an output voltage of 150 V for an input voltage of 170 V (Max), which is less than the peak of the input voltage. Further, the input current aligns with the input voltage to maintain high power quality. An acceptable displacement PF of 0.99 is observed from the converter operation. A small delay of <0.5 ms between the input voltage and current exists, which results in a displacement phase angle of around 7°. A small zero cross distortion is further shown, which indicates operation in a boost mode during that region. Still further, the circuit operates in continuous-conduction mode (CCM) operation, which may result in phase delay for operation with the output voltage being less than the peak of the input voltage. Moreover, the proposed transition mode is able to provide smooth transition from the boost mode to the buck mode in input current and vice-versa.

Figure 23B:
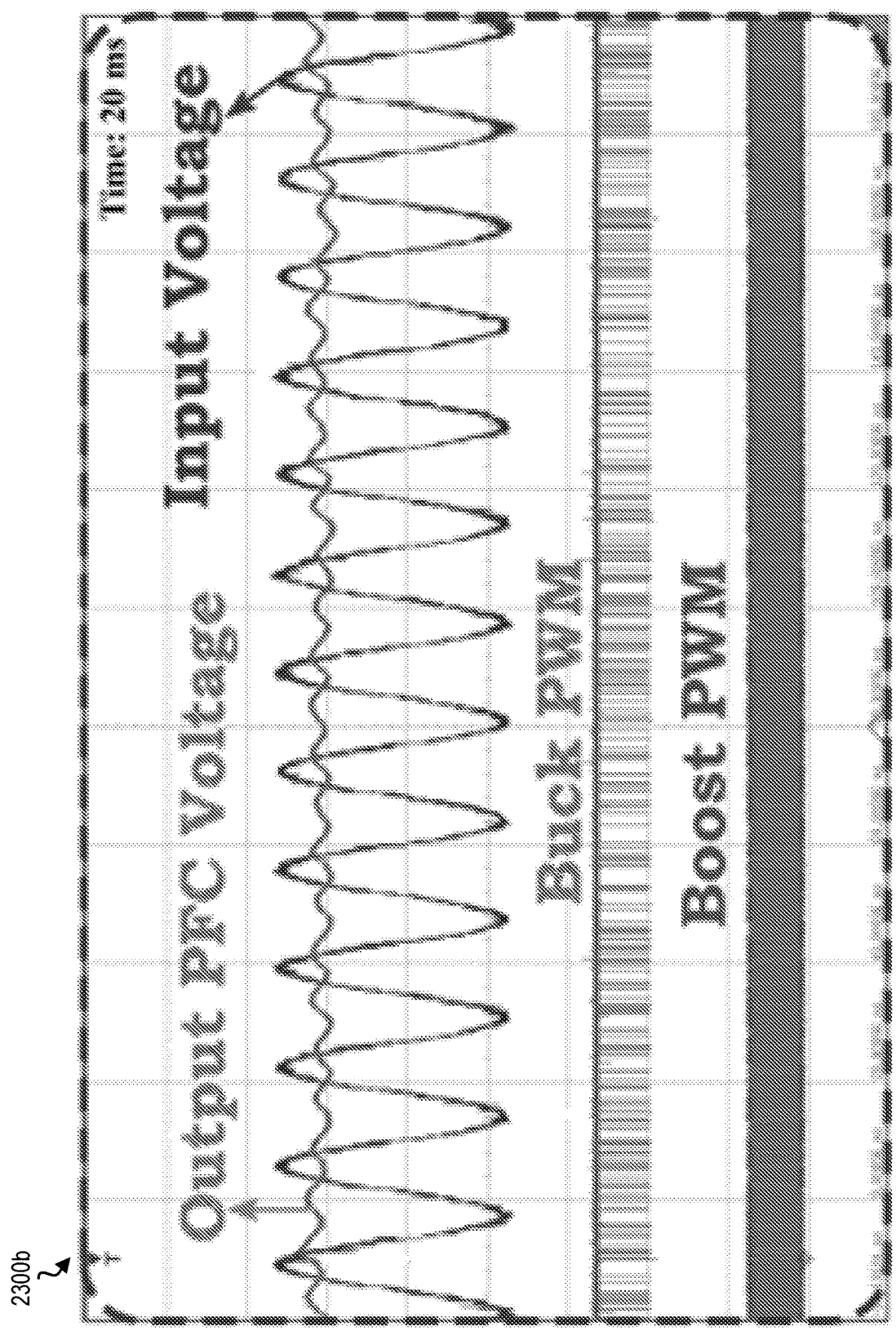
FIG. 23B is a plot showing an example experimental response of a PFC converter in a cases where the output voltage is less than the peak of the input voltage and the PFC converter is operating in a buck-boost mode of operation.

Referring now to FIG. 23B, there is shown a plot 2300b showing experimental results for the response of the PFC converter 1808 when the output voltage is less than the input voltage and the PFC converter is operating in buck-boost mode of operation. As shown, during operation of the converter, if the output voltage is very near to the peak of the input voltage, then the operation of the converter is closer to the boost mode than the buck mode.

Figure 24A:
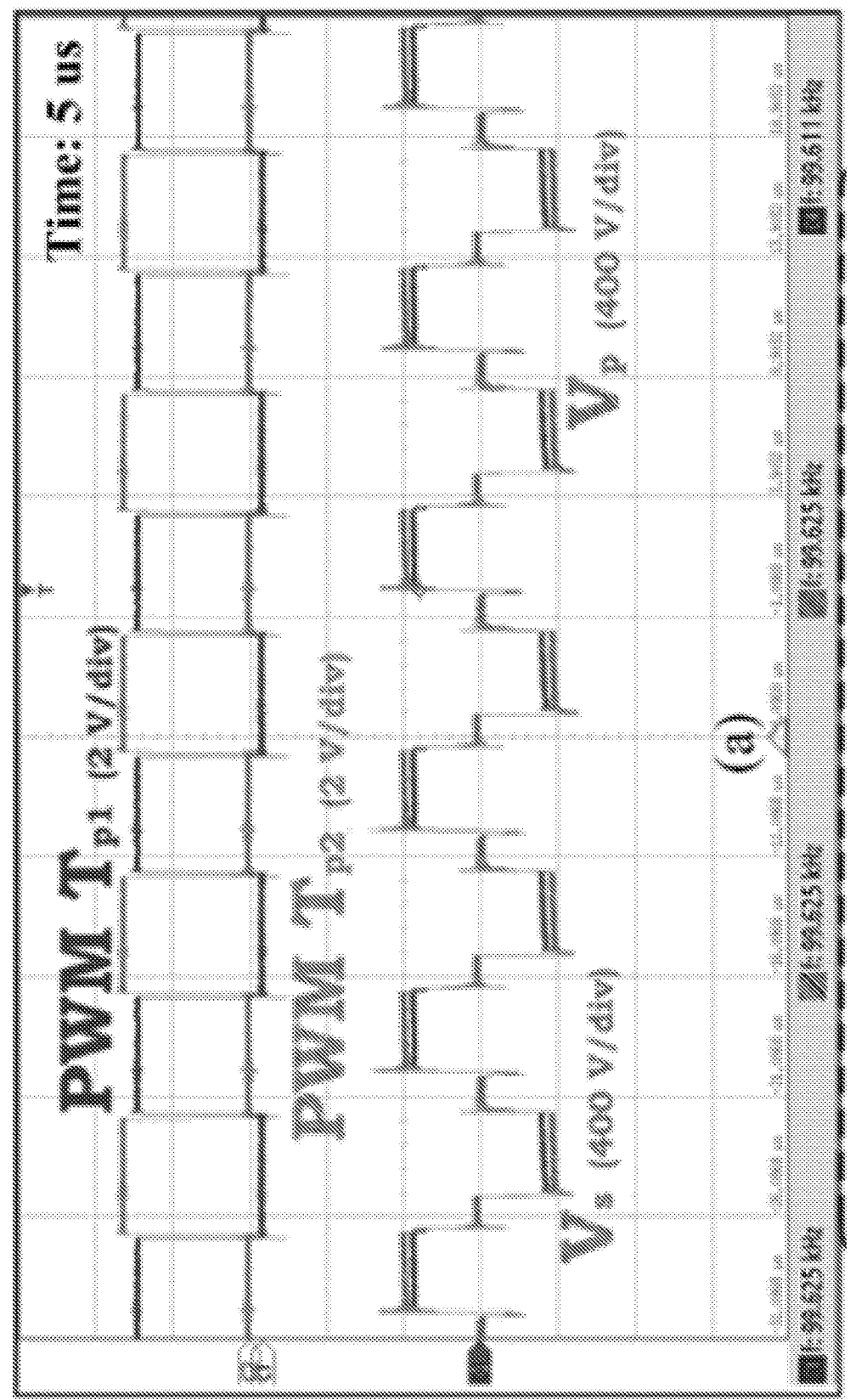
FIG. 24A is a plot showing example experimental results for the response of a DC-DC converter in a two-stage battery charger.
Figure 24B:
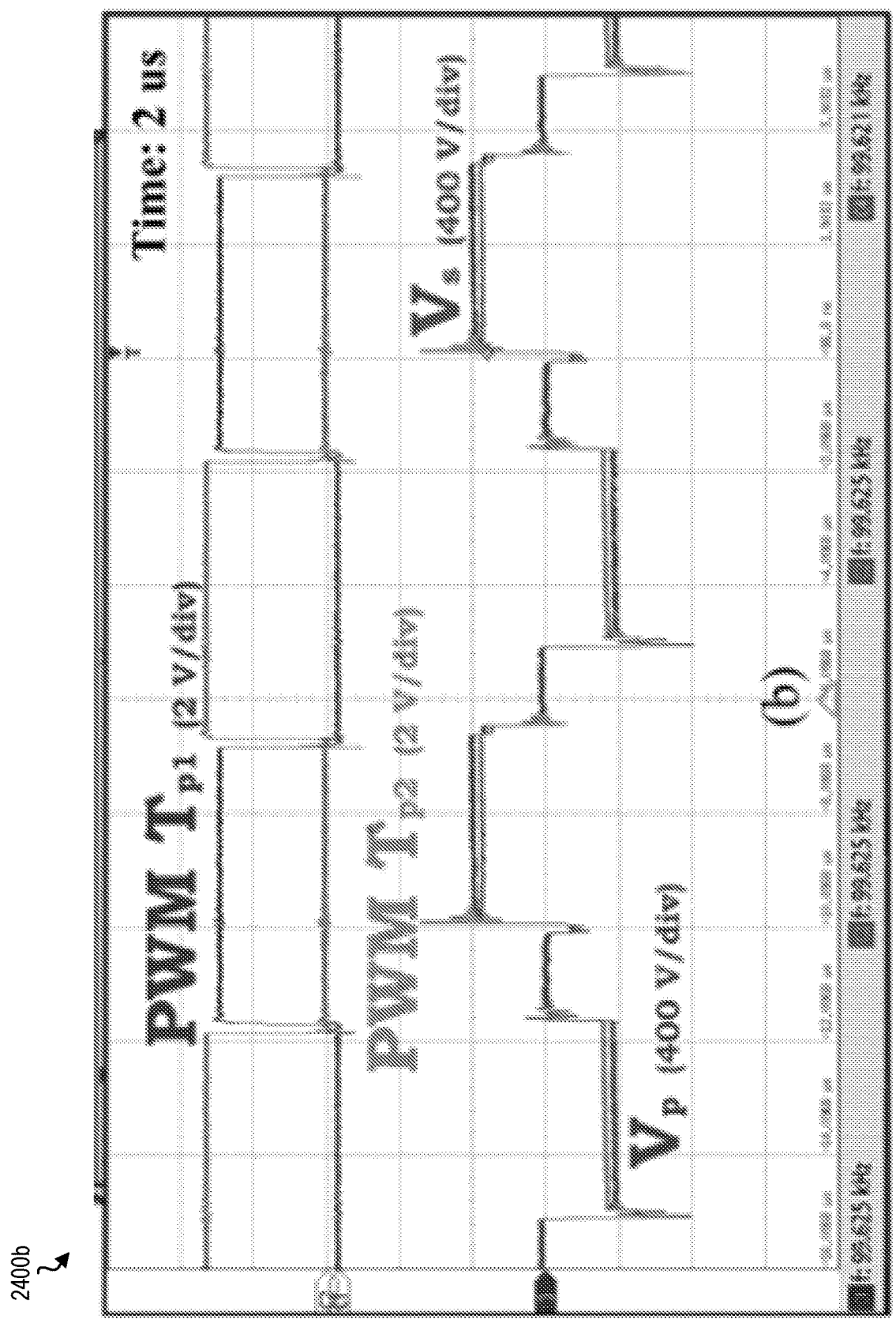
FIG. 24B is a plot showing example experimental voltage responses for a primary and secondary side of a high frequency transformer in a DC-DC converter in a two-stage battery charger.

Referring now to FIG. 24A which shows a plot 2400a of experimental results for the response of the DC-DC converter 1810 of FIG. 18, with an input voltage of 350 V. The primary voltage obtained from the converter is also plotted. As shown, the secondary side of the transformer 1810e in the DC-DC converter 1810 sees a higher voltage than the primary side. To meet the desired output voltage of the converter 1810, the signal generated from the current controller is applied as a phase shift to the PWM signals to the transistors 1810a ($T_{p1}$) and 1810b ($T_{p2}$) to attain the required voltage. In phase shifted controllers, the duty ratio of the controller "legs" are switched with 50% duty ratio, and the corresponding phase angle may be controlled to meet the desired voltage. FIG. 24B shows plot 2400b, which plots the voltages observed in the primary side ($V_p$) and the secondary sides ($V_s$) of the high frequency (HF) transformer 1810e of the DC-DC converter 1810.

Figure 25A:
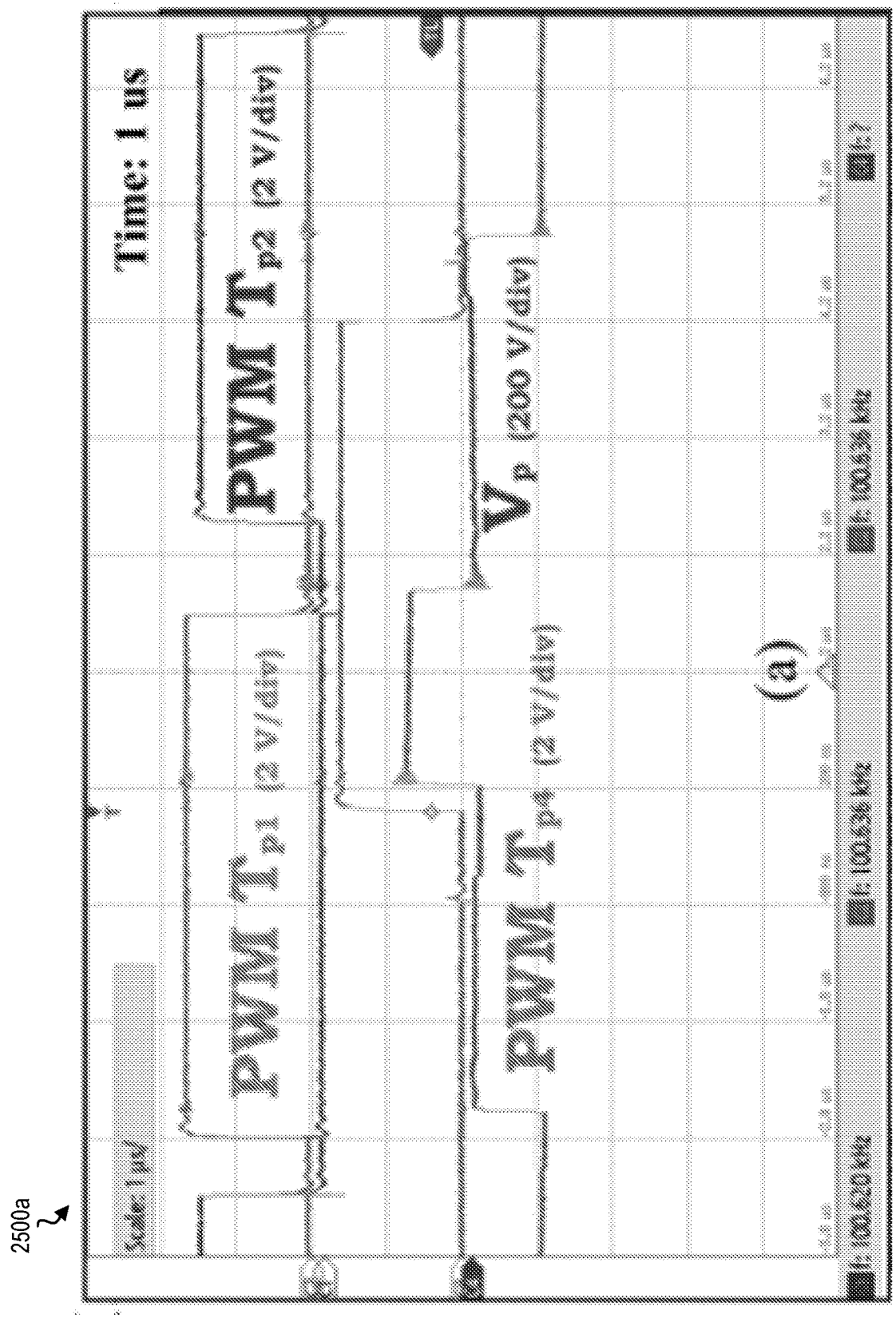
FIG. 25A is a plot showing example experimental results for a DC-DC converter in a two-stage battery charger, according to an example embodiment.
Figure 25B:
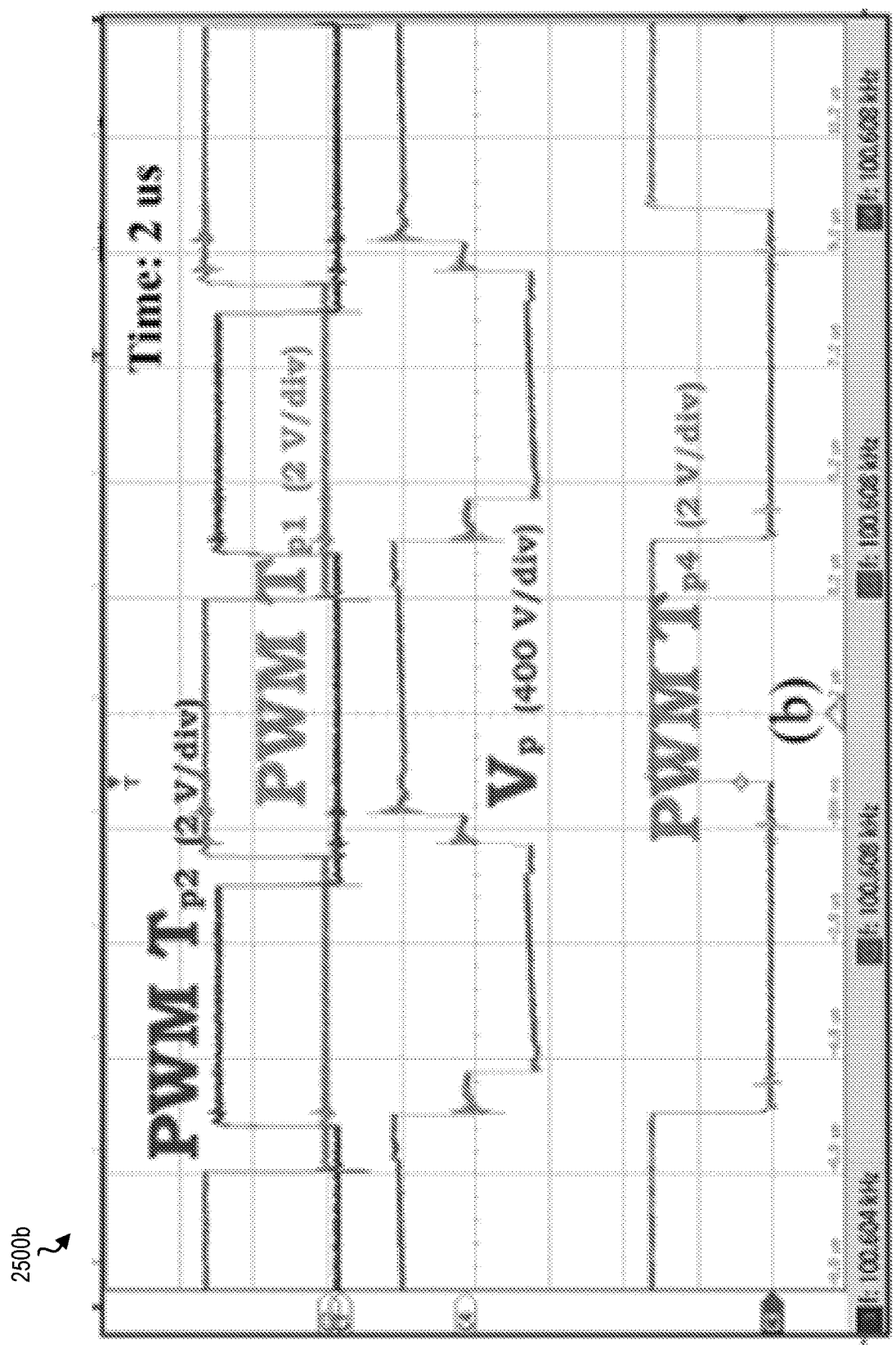
FIG. 25B is a plot showing example experimental results for a DC-DC converter in a two-stage battery charger, according to an example other embodiment.

Referring now to FIGS. 25A and 25B, there are shown plots 2500a and 2500b, respectively, showing experimental results for the DC-DC converter 1810 of FIG. 18, with an input voltage of 150V. As shown, waveforms of the PWM signals $T_{p1}$, $T_{p2}$, and $T_{p4}$ are plotted for transistors 1810a, 1810b and 1810d, respectively, of the DC-DC converter 1810. As shown in plot 2500a, when the gate pulse for $T_{p1}$ is turned off, the converter operation goes to transition mode. Likewise, plot 2500b shows the gate pulses and the transformer primary voltage ($V_p$) for an output of 450 V.

Figure 26A:
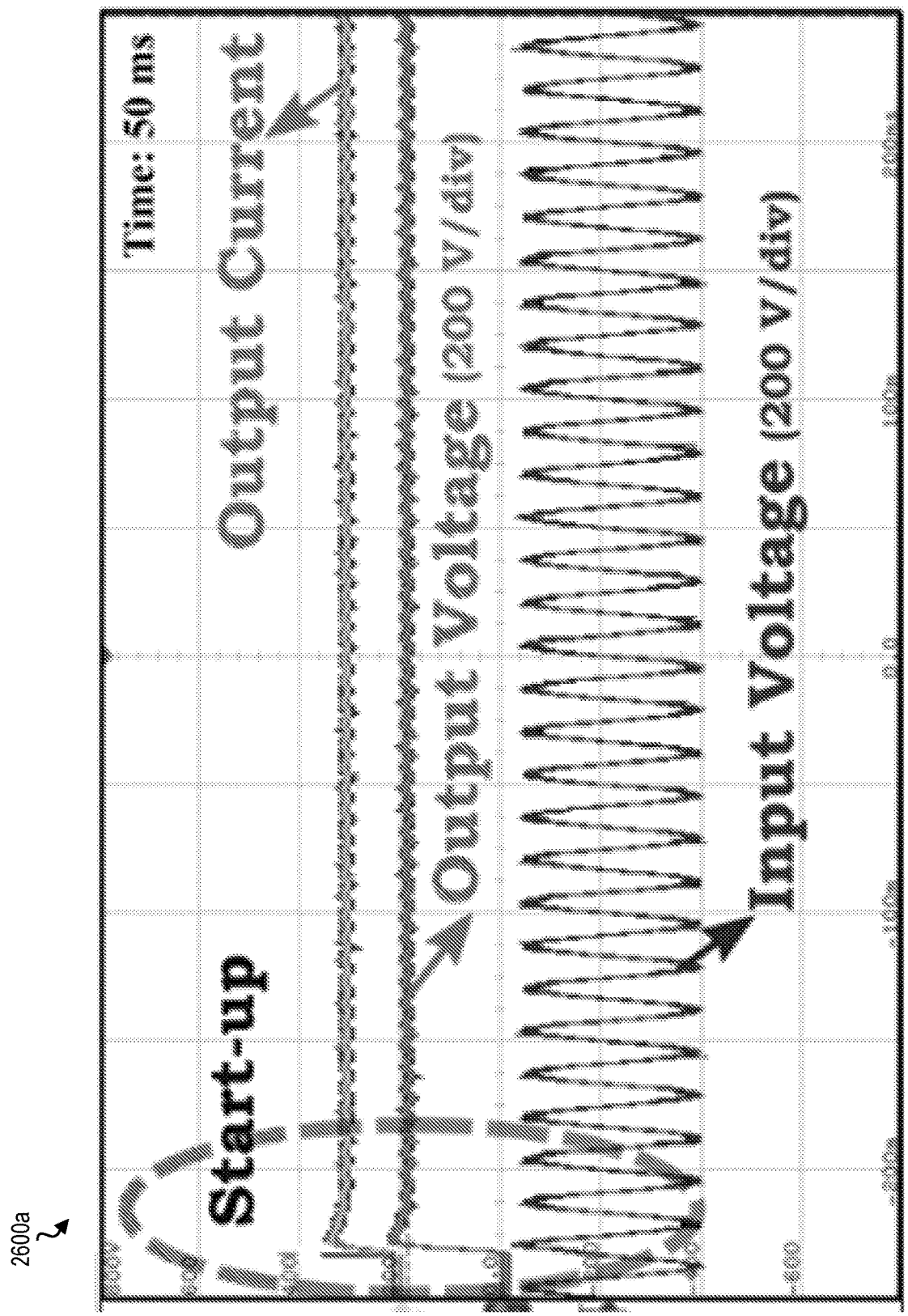
FIG. 26A is a plot showing example experimental voltage and current responses for a two-stage battery charger during start-up operation.
Figure 26B:
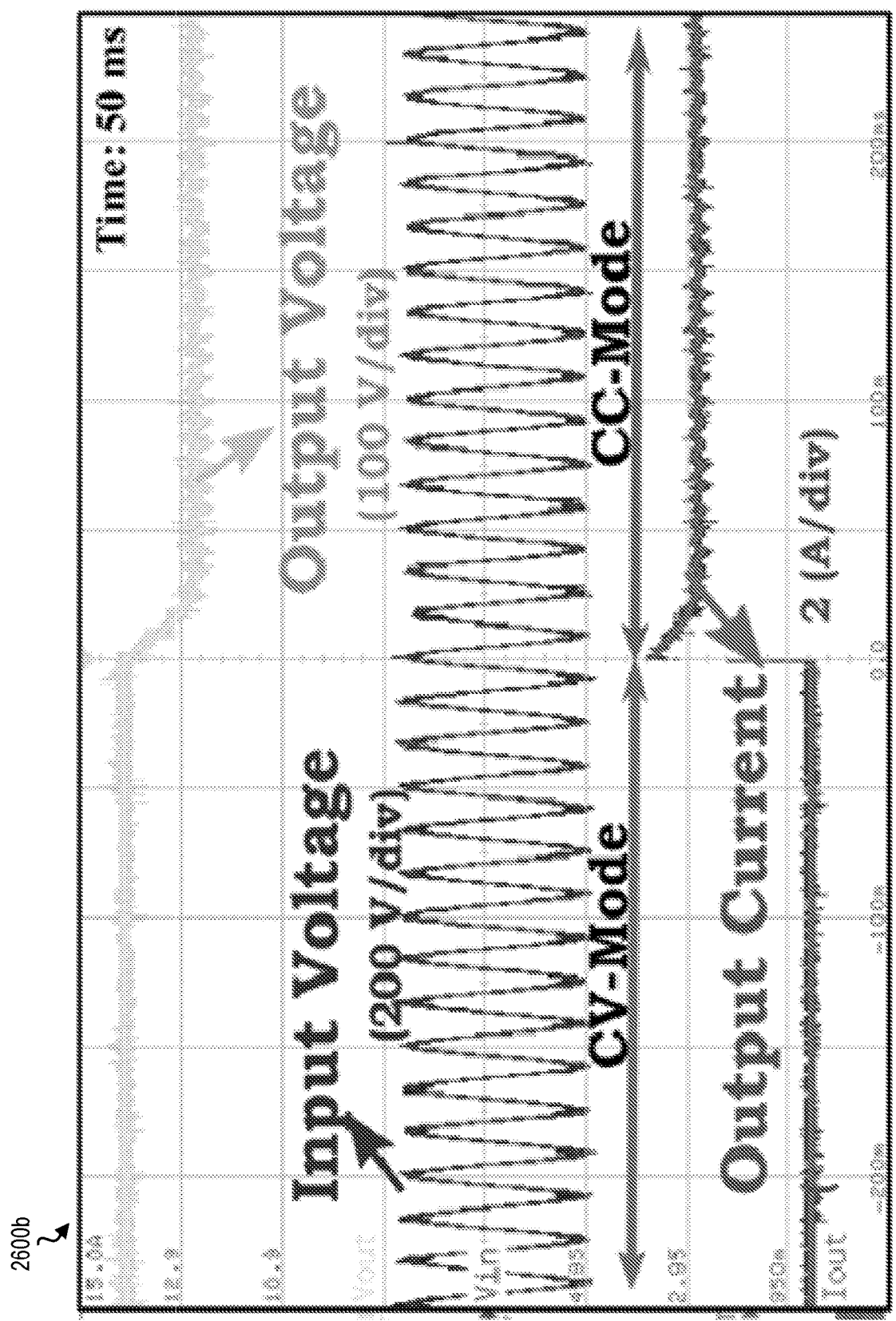
FIG. 26B is a plot showing example experimental results for constant current, constant voltage (CC-CV) charging modes in a two-stage battery charger using a DC electronic load.
Figure 26C:
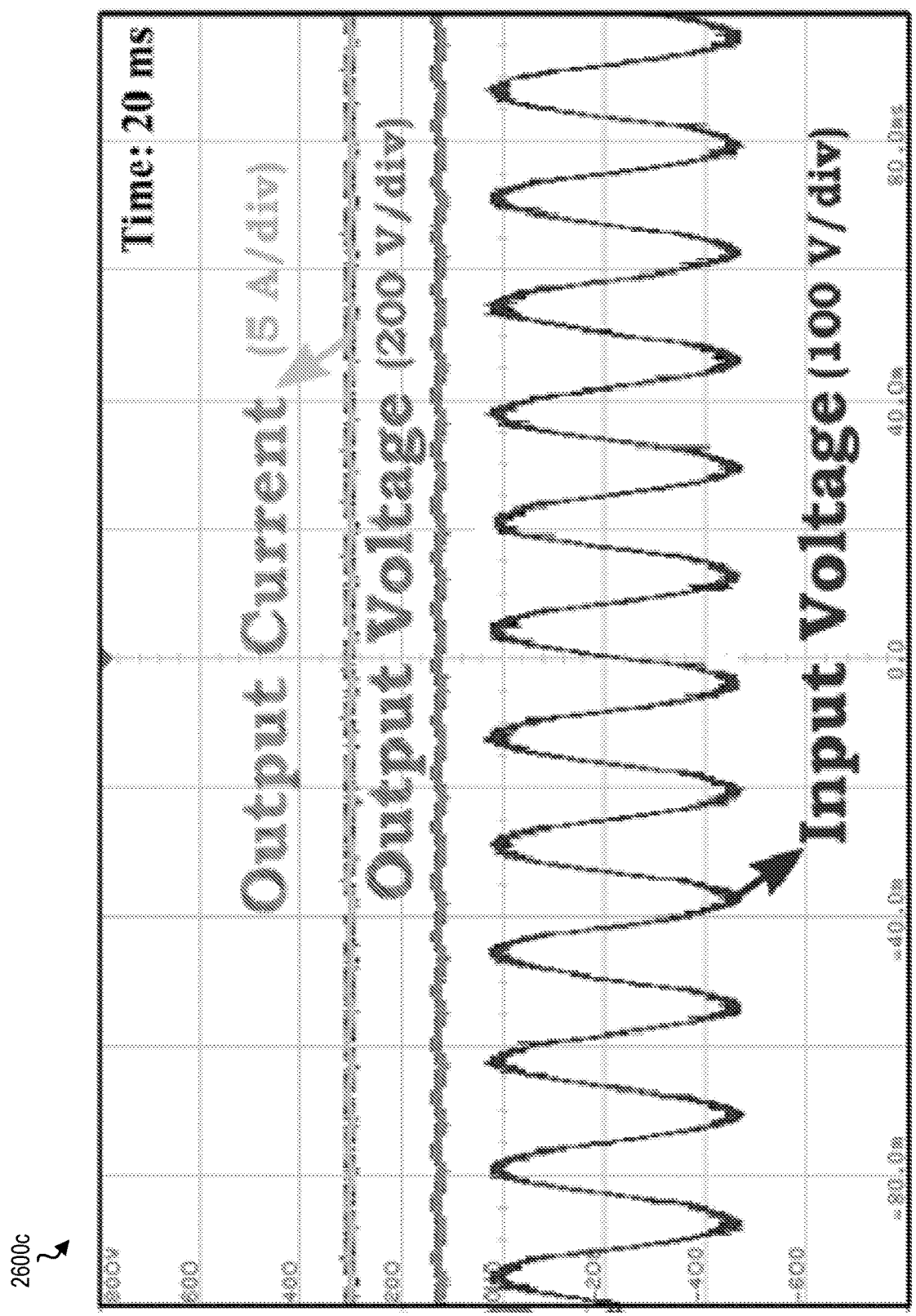
FIG. 26C is a plot showing example experimental results for an input voltage waveform and output voltage response waveform of a two-stage battery charger.

Referring now to FIGS. 26A-26C, there are shown experimental results for the output of the combination of the PFC converter 1808 and DC-DC converter 1810.

In particular, FIG. 26A shows plot 2600a, which shows experimental results for the output voltage and current response of the charger 1800 of FIG. 18 during the start-up operation. Even though the charger 1800 is operated from no-load to a fixed load, the designed controller does not provide any overshoot peak transient operation. Further, an output voltage of around 200 V is observed at the charger with an input voltage of 120 V (RMS).

FIG. 26B shows plot 2600b showing experimental results of constant current, constant voltage (CC-CV) charging modes of the charger 1800 using a DC electronic load. The charger 1800 is initially operated with constant voltage (CV) mode of charging then the constant current (CC) mode is immediately enabled on the charger with a reference profile set on the load. The converter performance with a sudden mode change is observed and plotted. Further, the converter is operated at 250 V in CV mode, and CC mode with around 3 A reference current. The output voltage of the charger in CC mode is maintained to 200 V but the operation still continues without any abnormality in the circuit.

FIG. 26C shows a plot 2600c which shows experimental results observed with an 85 V input voltage, and the output voltage of charger selected at 100 V.

Figure 27A:
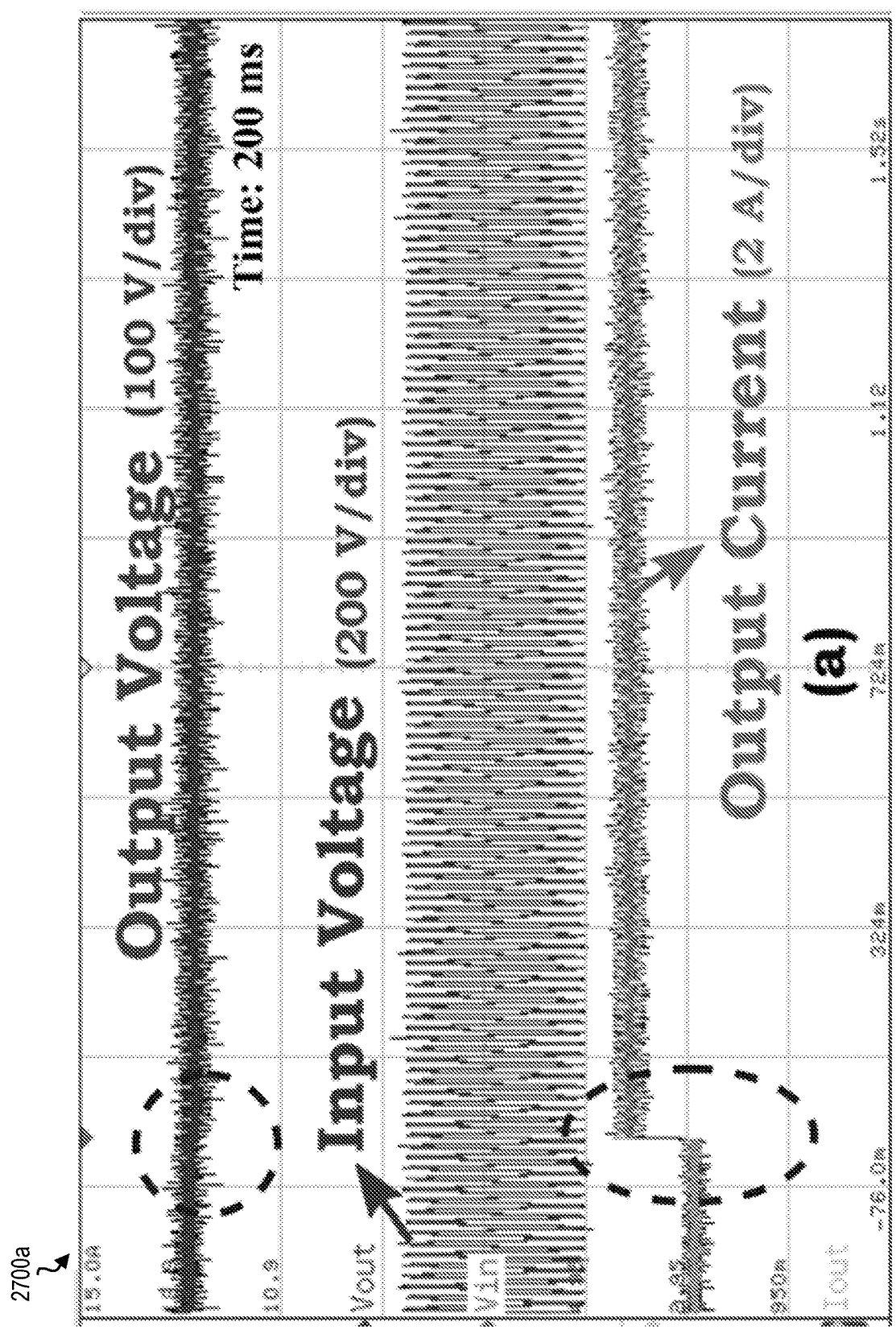
FIG. 27A is a plot showing example experimental results of a response to a sudden load change applied to a two-stage battery charger.
Figure 27B:
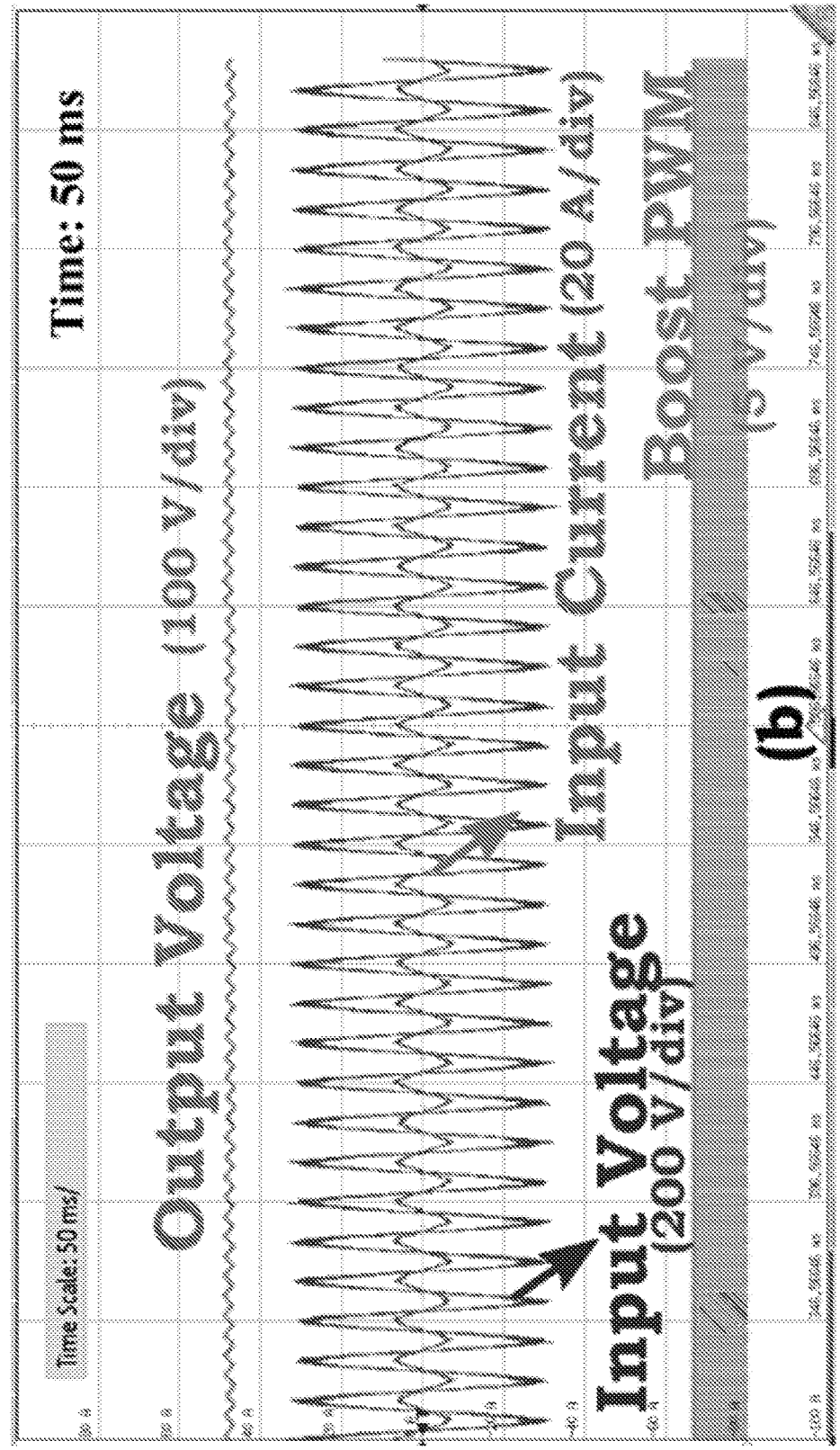
FIG. 27B is a plot showing example experimental results of a measured power quality of an example two-stage battery charger.

Referring now FIGS. 27A and 27B, there are shown plots of experimental results for the load performance of the charger 1800. In each cases, the charger 1800 is tested to operate at 30% of the rated load.

In particular, FIG. 27A shows plot 2700a which shows experimental results when a sudden change of load from 400 W to 850 W is applied to the converter 1810. As shown, the output voltage transient dies out quickly, and the steady state response of the charger 1800 is also fast. Though the outer voltage loops are slow acting, the effect on change of load from 400 W to 850 W does not reflect any disturbances on the converter operation.

FIG. 27B shows plot 2700b which shows the measured power quality of the charger 1800. As shown, the input current is aligned with input voltage resulting in high power quality. The PWM signal of the boost switch is also plotted. The charger 1800 is subjected to a sudden fall in load conditions.

Figure 27C:
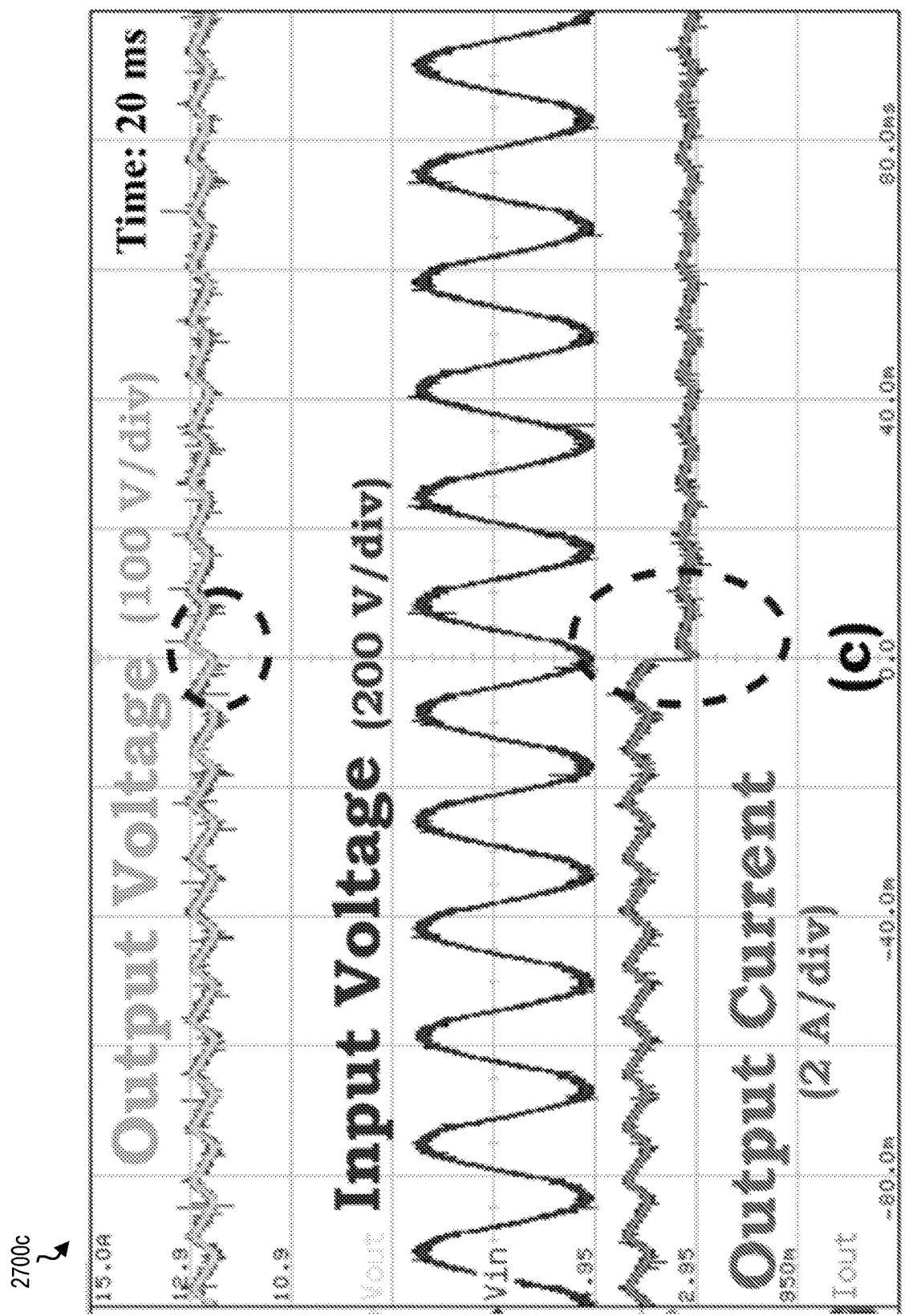
FIG. 27C is a plot showing example experimental results of a response to a load reduction in a two-stage battery charger.

FIG. 27C shows plot 2700c which shows the result of charger 1800 with load reduction from 900 W to 600 W.

In view of the foregoing, FIGS. 27A-27C show good agreement between theoretical analysis and the performed simulation results for the charger 1800. In particular, these plots show the wide variations of output voltages that are possible from charger 1800 which can charge any range of electric vehicles.

Figure 28A:
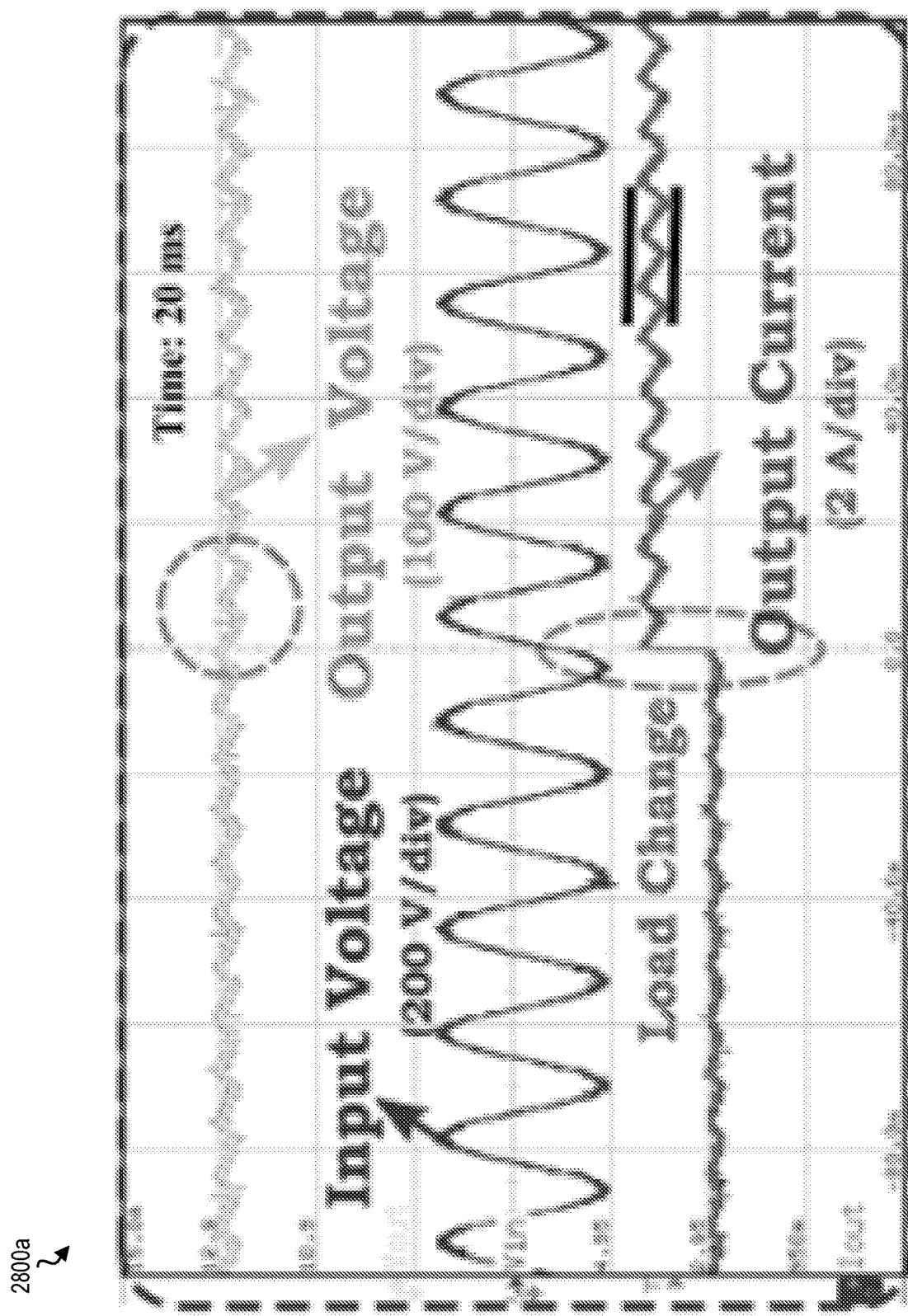
FIG. 28A is a plot showing example experimental results of a response to a load change being applied to a two-stage battery charger, according to some embodiments.
Figure 28B:
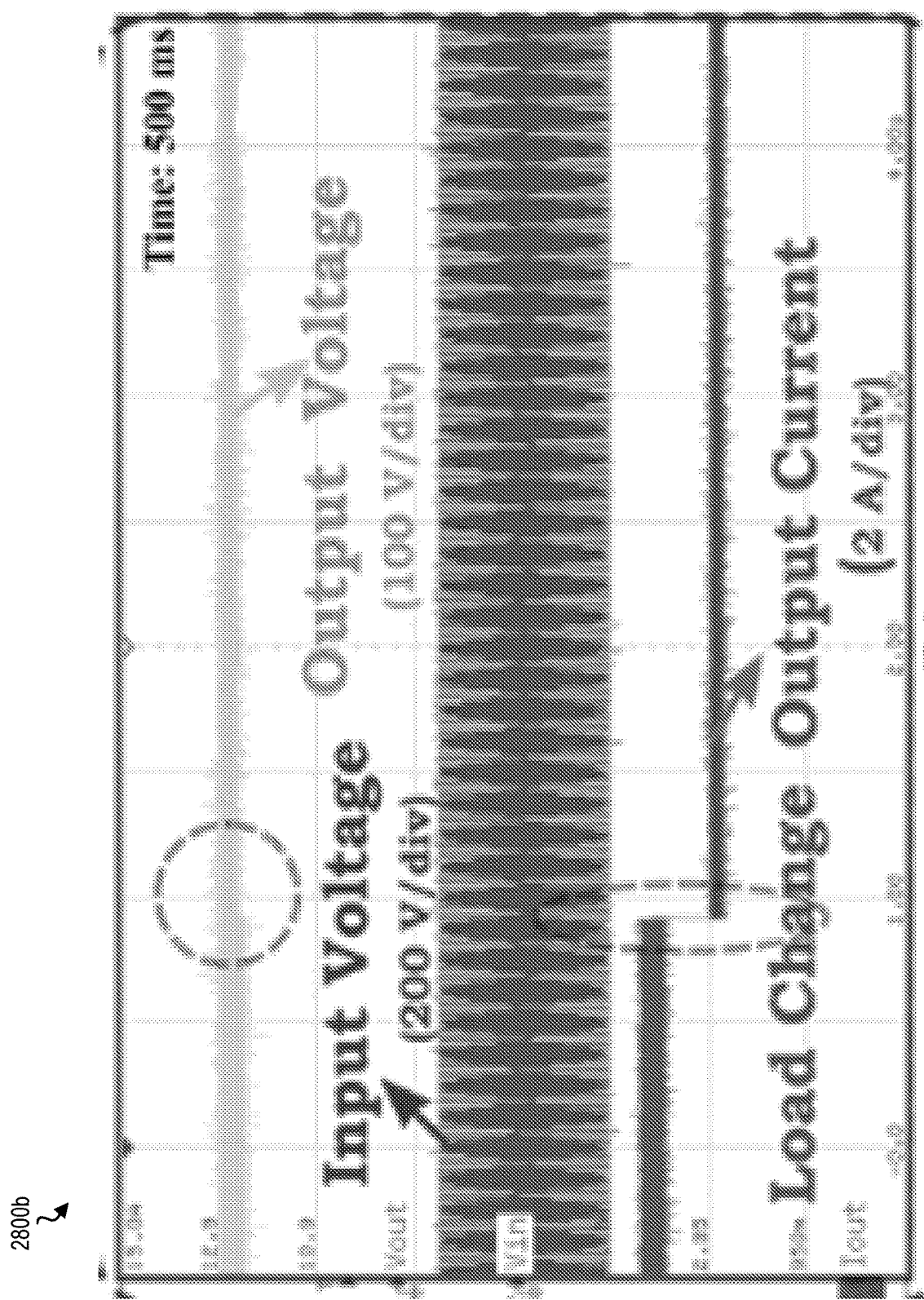
FIG. 28B is a plot showing example experimental results of a response to a load change being applied to a two-stage battery charger, according to some other embodiments.

FIG. 28A shows a further plot 2800a of experimental results for the charger 1800 subject to a sudden increase in load, and FIG. 28B shows a plot 2800b of experimental results for the charger 1800 subject to a sudden decrease in load current.

Figure 29A:
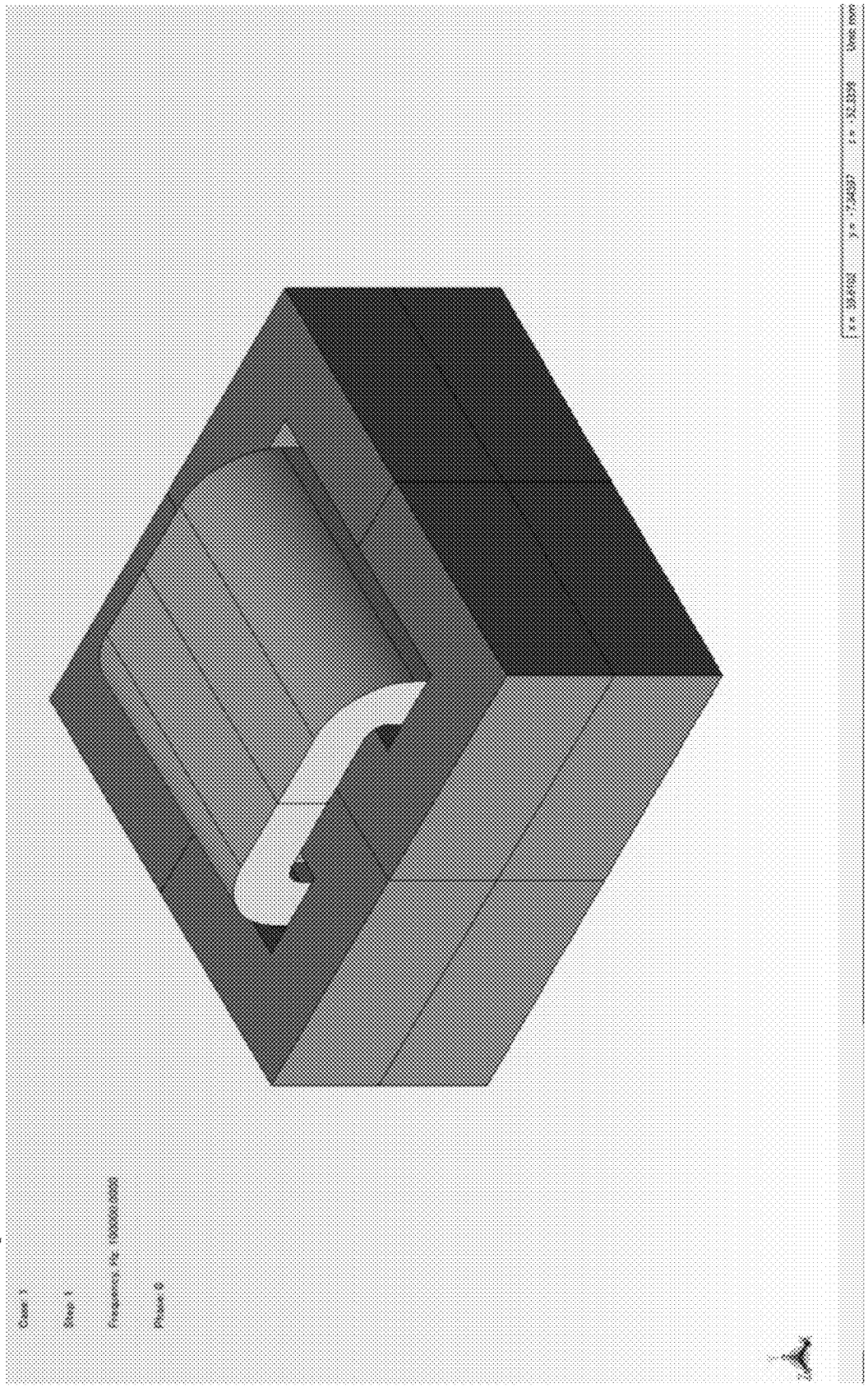
FIG. 29A is a representation of a high frequency transformer which can be used in a DC-DC converter in a two-stage battery charger.
Figure 29B:
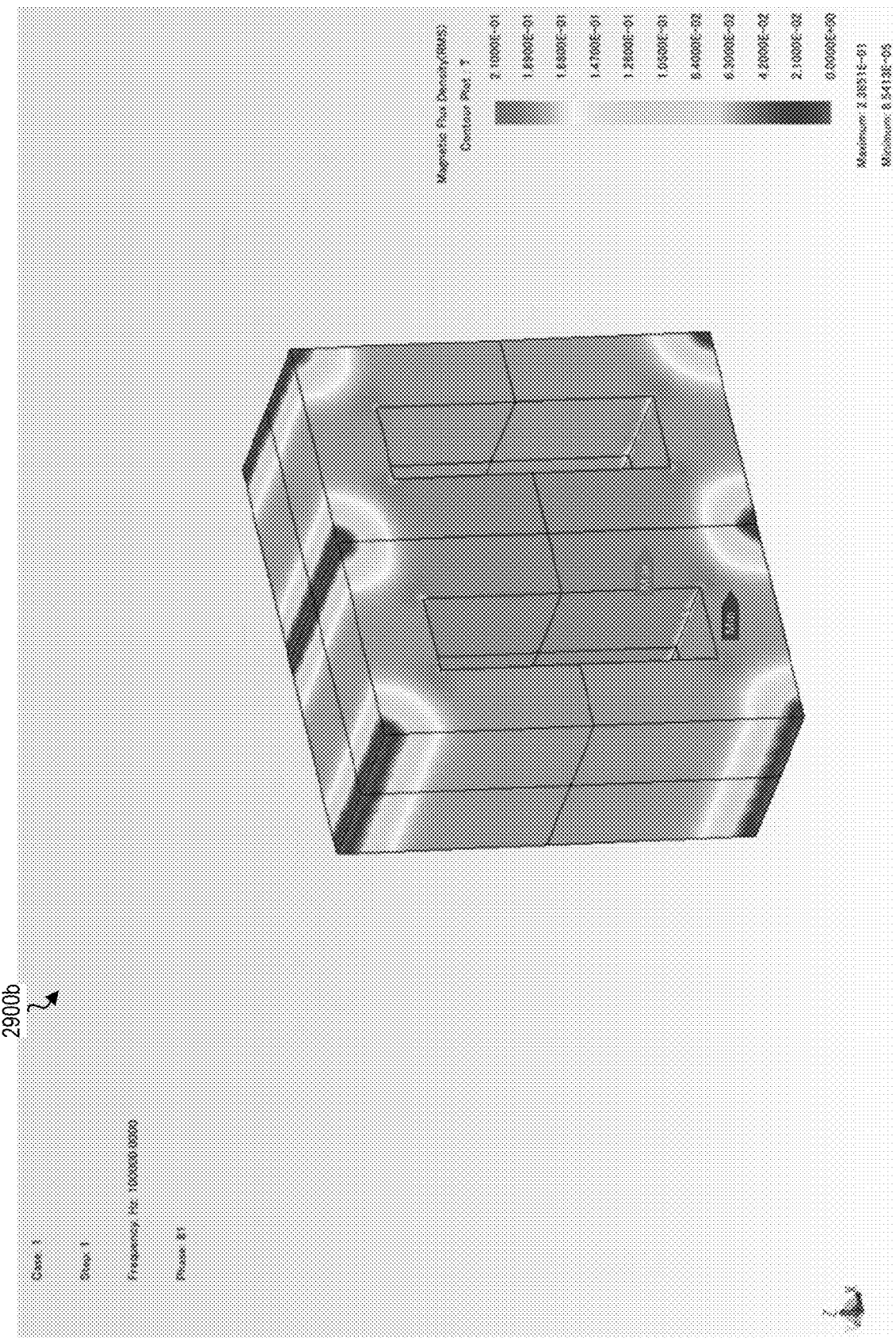
FIG. 29B is an example representation of the magnetic flux density distribution in the core of the transformer shown in FIG. 29A.

FIG. 29A shows a schematic representation 2900a of a high frequency transformer which can be used in the DC-DC converter 1810 of FIG. 18 (e.g., transformer 1810e). FIG. 29B shows a representation 2900b for the magnetic flux density distribution in the core of the transformer shown in FIG. 29A. In various cases, the transformer is designed to have a ratio of primary windings ($N_p$) to secondary windings ($N_s$) of 14:20 or 7:20.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A battery charger for providing a wide-output voltage range for charging batteries at different voltages, wherein the battery charger comprises:
a power factor correction converter configured to receive a rectified alternating-current (AC) input voltage at an input terminal and generate a direct-current (DC) output voltage at an output terminal, the rectified AC input voltage having at least one peak input value, the power factor correction converter comprising:
a boost circuit having at least one boost switch;
a buck circuit, cascaded with the boost circuit, and having a buck switch;
a controller configured to:
determine a reference output DC voltage for the power factor correction converter, wherein the reference output DC voltage is below the at least one peak input value;
determine an upper reference voltage and a lower reference voltage based on the reference output DC voltage, wherein the upper reference voltage and the lower reference voltage are each lower than the at least one peak input value, and (i) the upper reference voltage is greater than the reference output DC voltage, and (ii) the lower reference voltage is lower than reference output DC voltage;
monitor an instantaneous value of the rectified AC input voltage; and
control the at least one boost switch and the buck switch to dynamically operate the power factor correction converter between: (i) a buck mode when the instantaneous value is determined to be above the upper reference voltage, (ii) a boost mode when the instantaneous value is determined to be below the lower reference voltage, and (iii) an intermediate buck and boost mode when the instantaneous value is determined to be between the upper and lower reference voltages,
wherein, in the intermediate buck and boost mode, the output terminal is connected to the input terminal to provide for a cross-over transition between the buck and boost modes, and the buck switch is in a continuous ON state and the at least one boost switch is in a continuous OFF state; and
a DC-DC converter coupled to the output terminal of the power factor correction converter and configured to generate a battery voltage for charging a battery.

2. The battery charger of claim 1, wherein the controller comprises:
a voltage-current controller that is configured to generate a buck error signal and a boost error signal;
a boost comparator unit that is configured to generate one or more boost PWM signals by comparing the boost error signal with a leading edge ramp modulated signal having a magnitude between zero and one;
a buck comparator unit that is configured to generate a buck PWM signal by comparing the buck error signal with a trailing edge ramp modulated signal having a magnitude between zero and one; and a switch logic circuit that is configured to determine a mode of operation of the power factor correction converter, and based on the determination, to selectively apply the one or more boost PWM signals and the buck PWM signal to the at least one boost switch and the buck switch, respectively.

3. The battery charger of claim 2, wherein in the boost mode, the controller is configured to: apply the at least one boost PWM signal to the at least one boost switch, and set the buck switch to the continuous ON state.

4. The battery charger of claim 2, wherein in the buck mode, the controller is configured to: apply the buck PWM signal to the buck switch, and set the at least one boost switch to the continuous OFF state.

5. The battery charger of claim 1, wherein the reference output DC voltage is determined based on a sensed battery voltage of the battery.

6. The battery charger of claim 5, wherein the reference output DC voltage is determined to be substantially 200 volts when the sensed battery voltage is less than or equal to 200 volts.

7. The battery charger of claim 5, wherein the reference output DC voltage is determined to be substantially 250 volts when the sensed battery voltage is between 200 volts and 250 volts.

8. The battery charger of claim 5, wherein the reference output DC voltage is determined to be substantially 350 volts when the sensed battery pack voltage is between 250 volts and 350 volts.

9. The battery charger of claim 5, wherein the reference output DC voltage is determined to be substantially 400 volts when the sensed battery voltage is between 350 volts and 500 volts.

10. The battery charger of claim 1, wherein the upper reference voltage and the lower reference voltage are determined according to the formulas: $Vu=Vref+V_B$ and $Vl=Vref-V_B$, where Vu is the upper reference voltage, Vl is the lower reference voltage, Vref is the reference output DC voltage, and $V_B$ is a predetermined band voltage.

11. The battery charger of claim 10, wherein the predetermined band voltage is in a range between 1 volt and 10 volts.

12. The battery charger of claim 11, wherein the predetermined band voltage is substantially 1 volt so as to reduce input current ripple during a transition between the intermediate buck and boost mode and at least one of the buck mode and the boost mode.

13. The battery charger of claim 2, wherein:
the at least one boost switch includes a first boost switch and a second boost switch;
the boost circuit is an interleaved boost circuit, wherein the first boost switch and the second boost switch are 180 degrees out of phase; and
the at least one boost PWM signal includes a first boost PWM signal for controlling the first boost switch, and a second phase-shifted boost PWM signal for controlling the second boost switch.

14. The battery charger of claim 10, wherein the voltage-current controller includes a programmable buck current integrator and a programmable boost current integrator, wherein the programmable buck current integrator is configured to reset when it is determined that the difference between the instantaneous value of the rectified AC input voltage and the reference output DC voltage is less than the predetermined band voltage, and wherein the programmable boost current integrator is configured to reset when it is determined that the difference between the instantaneous value of the rectified AC input voltage and the reference output DC voltage is greater than the predetermined band voltage.

15. The battery charger of claim 14, wherein the boost error signal comprises clipped regions defining a lower limit of the boost error signal, wherein the clipped regions result from re-setting the boost current integrator, and wherein the buck error signal comprises clamped regions defining an upper limit of the buck error signal, wherein the clamped regions result from the re-setting of the buck current integrator.

16. A method for controlling a battery charger to provide a wide-output voltage range for charging batteries at different voltages, wherein the method comprises:
   determining a reference output direct-current (DC) voltage for a power factor correction converter of the battery charger, wherein the reference output DC voltage is below an at least one peak input value of a rectified alternating-current (AC) input voltage received at an input terminal of the power factor correction converter;
   determining an upper reference voltage and a lower reference voltage based on the reference output DC voltage, wherein the upper reference voltage and the lower reference voltage are each lower than the at least one peak input value, and (i) the upper reference voltage is greater than the reference output DC voltage, and (ii) the lower reference voltage is lower than the reference output DC voltage;
   monitoring an instantaneous value of the rectified AC input voltage;
   controlling at least one boost switch and a buck switch of the power factor correction converter to dynamically operate the power factor correction converter between: (i) a buck mode when the instantaneous value is determined to be above the upper reference voltage, (ii) a boost mode when the instantaneous value is determined to be below the lower reference voltage, and (iii) an intermediate buck and boost mode when the instantaneous value is determined to be between the upper and lower reference voltages,
      wherein in the intermediate buck and boost mode, the output terminal is connected to the input terminal to provide for a cross-over transition between the buck and boost modes, and the buck switch is in a continuous ON state and the at least one boost switch is in a continuous OFF state; and
   generating a battery voltage for charging a battery from an output voltage provided by an output terminal of the power factor correction converter.

17. The method of claim 16, further comprising:
   generating a buck error signal and a boost error signal;
   generating one or more boost PWM signals by comparing the boost error signal with a leading edge ramp modulated signal having a magnitude between zero and one;
   generating a buck PWM signal by comparing the buck error signal with a trailing edge ramp modulated signal having a magnitude between zero and one; and
   determining a mode of operation of the power factor correction converter, and based on the determination, to selectively apply the one or more boost PWM signals and the buck PWM signal to the at least one boost switch and the buck switch, respectively.

18. The method of claim 17, wherein in the boost mode, the method further comprises: applying the at least one boost PWM signal to the at least one boost switch, and setting the buck switch to a continuous ON state.

19. The method of claim 17, wherein in the buck mode, the method further comprises: applying the buck PWM signal to the buck switch, and setting the at least one boost switch to a continuous OFF state.

20. The method of claim 16, wherein the method comprises determining the reference output DC voltage based on a sensed battery voltage of the battery.

21. The method of claim 20, wherein the method comprises determining the reference output DC voltage to be substantially 200 volts when the sensed battery voltage is less than or equal to 200 volts.

22. The method of claim 20, wherein the method comprises determining the reference output DC voltage to be substantially 250 volts when the sensed battery voltage is between 200 volts and 250 volts.

23. The method of claim 20, wherein the method comprises determining the reference output DC voltage to be substantially 350 volts when the sensed battery pack voltage is between 250 volts and 350 volts.

24. The method according of claim 20, wherein the method comprises determining the reference output DC voltage to be substantially 400 volts when the sensed battery voltage is between 350 volts and 500 volts.

25. The method of claim 16, wherein the method comprises determining the upper reference voltage and the lower reference voltage according to the formulas: $Vu=Vref+V_B$ and $Vl=Vref-V_B$, where Vu is the upper reference voltage, Vl is the lower reference threshold, Vref is the reference output DC voltage, and $V_B$ is a predetermined band voltage.

26. The method of claim 25, wherein the method comprises setting the predetermined band voltage in a range between 1 volt and 10 volts.

27. The method of claim 26, wherein the method comprises setting the predetermined band voltage to be substantially 1 volt so as to reduce input current ripple during a transition between the intermediate buck and boost mode and at least one of the buck mode and the boost mode.

28. The method of claim 16, wherein the method comprises providing the at least one boost PWM signal with a first boost PWM signal for controlling a first boost switch, and a second phase-shifted boost PWM signal for controlling a second boost switch.

29. The method of claim 25, further comprising:
   resetting a programmable buck current integrator when it is determined that the difference between the instantaneous value of the rectified AC input voltage and the reference output DC voltage is less than the predetermined band voltage; and
   resetting a programmable boost current integrator when it is determined that the difference between the instantaneous value of the rectified AC input voltage and the reference output DC voltage is greater than the predetermined band voltage.

30. The method of claim 29, wherein the method comprises generating the boost error signal with clipped regions defining a lower limit of the boost error signal, wherein the clipped regions result from re-setting the boost current integrator, and generating the buck error signal with clamped regions defining an upper limit of the buck error signal, wherein the clamped regions result from the re-setting of the buck current integrator.

31. A power factor correction (PFC) converter comprising:
   an input terminal for receiving a rectified alternating-current (AC) input voltage, the rectified AC input voltage having at least one peak input value;

an output terminal for outputting a direct-current (DC) output voltage:
a boost circuit located between input and output terminals, the boost circuit comprising at least one boost switch;
a buck circuit located between input and output terminals and cascaded with the boost circuit, and the buck circuit comprising a buck switch;
a controller configured for:
  determining a reference output DC voltage, wherein the reference output DC voltage is below the at least one peak input value;
  determining an upper reference voltage and a lower reference voltage, wherein the upper and lower reference voltages are each lower than the at least one peak input value, and (i) the upper reference voltage is greater than the reference output DC voltage, and (ii) the lower reference voltage is lower than reference output DC voltage;
  monitoring an instantaneous value of the rectified AC input voltage; and
  controlling the at least one boost switch and the buck switch to dynamically operate the power factor correction converter between: (i) a buck mode when the instantaneous value is determined to be above the upper reference voltage, (ii) a boost mode when the instantaneous value is determined to be below the lower reference voltage, and (iii) an intermediate buck and boost mode when the instantaneous value is determined to be between the upper and lower reference voltages,
    wherein, in the intermediate buck and boost mode, the output terminal is connected to the input terminal to provide for a cross-over transition between the buck and boost modes, and the buck switch is in a continuous ON state and the at least one boost switch is in a continuous OFF state.

32. The PFC converter of claim 31, wherein the controller comprises:
  a voltage-current controller that is configured to generate a buck error signal and a boost error signal;
  a boost comparator unit that is configured to generate one or more boost PWM signals by comparing the boost error signal with a leading edge ramp modulated signal having a magnitude between zero and one;
  a buck comparator unit that is configured to generate a buck PWM signal by comparing the buck error signal with a trailing edge ramp modulated signal having a magnitude between zero and one; and
  a switch logic circuit that is configured to determine the mode of operation of the power factor correction converter, and based on the determination, to selectively apply the one or more boost PWM signals and the buck PWM signal to the at least one boost switch and the buck switch, respectively.

33. The PFC converter of claim 31, wherein the upper reference voltage and the lower reference voltage are determined according to the formulas: $Vref+V_B$ and $VI=Vref-V_B$, where Vu is the upper reference voltage, Vl is the lower reference voltage, Vref is the reference output DC voltage, and $V_B$ is a predetermined band voltage.

34. The PFC converter of claim 31, wherein in the boost mode, the controller is configured for applying the at least one boost PWM signal to the at least one boost switch, and setting the buck switch to the continuous ON state, and
  in the buck mode, the controller is configured for applying the buck PWM signal to the buck switch, and setting the at least one boost switch to the continuous OFF state.

* * * * *

UNITED STATES PATENT AND TRADEMARK OFFICE
CERTIFICATE OF CORRECTION

PATENT NO. : 11,518,262 B2  
APPLICATION NO. : 16/530461  
DATED : December 6, 2022  
INVENTOR(S) : Jaya Sai Praneeth Ammanamanchi Venkata et al.

Page 1 of 1

It is certified that error appears in the above-identified patent and that said Letters Patent is hereby corrected as shown below:

On the Title Page

Under Item (73) the Assignee's address "Ottawa (CA)" should read -- Oshawa (CA) --

In the Claims:

Claim 33, Column 38, Line 23, "… mined according to the formulas: Vref+VB …," should read -- mined according to the formulas: Vu= Vref +VB --

Signed and Sealed this  
Eighteenth Day of July, 2023

Katherine Kelly Vidal  
*Director of the United States Patent and Trademark Office*